(12) United States Patent
Binder

(10) Patent No.: US 7,656,904 B2
(45) Date of Patent: Feb. 2, 2010

(54) TELEPHONE SYSTEM HAVING MULTIPLE DISTINCT SOURCES AND ACCESSORIES THEREFOR

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 136 days.

(21) Appl. No.: 11/709,128

(22) Filed: Feb. 22, 2007

(65) Prior Publication Data
US 2007/0147433 A1  Jun. 28, 2007

Related U.S. Application Data

(63) Continuation of application No. 10/492,411, filed as application No. PCT/IL2004/000178 on Feb. 24, 2004.

(30) Foreign Application Priority Data

Mar. 13, 2003  (IL) .................................. 154921

(51) Int. Cl.
 H04J 1/02  (2006.01)
(52) U.S. Cl. .................... 370/493; 370/352; 370/467
(58) Field of Classification Search ............ 379/93.05, 379/100.12, 231, 397; 370/352, 464, 493, 370/496, 497
See application file for complete search history.

(56) References Cited

U.S. PATENT DOCUMENTS

| 2,032,360 | A | 3/1936 | Green |
|---|---|---|---|
| 2,264,395 | A | 12/1941 | Mitchell |
| 2,264,396 | A | 12/1941 | Moore |
| 2,510,273 | A | 6/1950 | Barstow et al. |
| 2,516,211 | A | 7/1950 | Hochgraf |
| 3,280,259 | A | 10/1966 | Cotter |
| 3,366,744 | A | 1/1968 | Miller |
| 3,369,078 | A | 2/1968 | Stradley |

(Continued)

FOREIGN PATENT DOCUMENTS

EP  0385695  5/1990

(Continued)

OTHER PUBLICATIONS

EIA-600.37 Symbol Encoding Sublayer; Revision: May 12, 1995 Copy (30 pages).

(Continued)

*Primary Examiner*—Curtis Kuntz
*Assistant Examiner*—Yosef K Laekemariam
(74) *Attorney, Agent, or Firm*—Browdy & Neimark, PLLC

(57) ABSTRACT

In conjunction with a data communication network carrying multiple telephony signals and allowing for connection of telephone sets, a system and method in which two external feeders connect to the data network at two distinct points via two distinct devices. The data network can be based on dedicated wiring or can use existing in-premises medium such as telephone, powerlines or CATV wiring. In the latter case, the wiring can still carry the original service for which it was installed. The external telephone connections can be based on the traditional PSTN, CATV network, cellular telephone network or any other telephone service provider network, using specific adapter for any medium used. In the case of connection to a POTS telephone signal, VoIP gateway (or any other converter) is required.

61 Claims, 27 Drawing Sheets

U.S. PATENT DOCUMENTS

| | | |
|---|---|---|
| 3,508,243 A | 4/1970 | Nyfeler et al. |
| 3,509,537 A | 4/1970 | Haberly |
| 3,540,030 A | 11/1970 | Hartz |
| 3,594,584 A | 7/1971 | Woods |
| 3,654,605 A | 4/1972 | Honda et al. |
| 3,656,112 A | 4/1972 | Paull |
| 3,662,366 A | 5/1972 | Neuville et al. |
| 3,683,343 A | 8/1972 | Feldman et al. |
| 3,689,886 A | 9/1972 | Durkee |
| 3,710,373 A | 1/1973 | Watanabe et al. |
| 3,714,451 A | 1/1973 | Whitney et al. |
| 3,719,928 A | 3/1973 | Oishi et al. |
| 3,721,830 A | 3/1973 | Oishi et al. |
| 3,730,980 A | 5/1973 | Kirk, Jr. |
| 3,733,586 A | 5/1973 | Lusk et al. |
| 3,810,096 A | 5/1974 | Kabat et al. |
| 3,818,481 A | 6/1974 | Dorfman et al. |
| 3,836,888 A | 9/1974 | Boenke et al. |
| 3,876,984 A | 4/1975 | Chertok |
| 3,909,618 A | 9/1975 | Fujii et al. |
| 3,911,415 A | 10/1975 | Whyte |
| 3,922,664 A | 11/1975 | Wadsworth |
| 3,924,223 A | 12/1975 | Whyte et al. |
| 3,925,728 A | 12/1975 | Whyte |
| 3,925,763 A | 12/1975 | Wadhwani et al. |
| 3,938,129 A | 2/1976 | Smither |
| 3,942,168 A | 3/1976 | Whyte |
| 3,942,170 A | 3/1976 | Whyte |
| 3,944,723 A | 3/1976 | Fong |
| 3,949,172 A | 4/1976 | Brown et al. |
| 3,964,048 A | 6/1976 | Lusk et al. |
| 3,967,264 A | 6/1976 | Whyte et al. |
| 3,973,087 A | 8/1976 | Fong |
| 3,980,954 A | 9/1976 | Whyte |
| 4,004,110 A | 1/1977 | Whyte |
| 4,008,467 A | 2/1977 | Pattantyus-Abraham et al. |
| 4,012,733 A | 3/1977 | Whyte |
| 4,012,734 A | 3/1977 | Jagoda et al. |
| 4,016,429 A | 4/1977 | Vercellotti et al. |
| 4,057,793 A | 11/1977 | Johnson et al. |
| 4,058,678 A | 11/1977 | Dunn et al. |
| 4,065,763 A | 12/1977 | Whyte et al. |
| 4,066,912 A | 1/1978 | Wetherell |
| 4,079,415 A | 3/1978 | Will |
| 4,085,678 A | 4/1978 | Heincker |
| 4,090,184 A | 5/1978 | Hamilton, II |
| 4,106,077 A | 8/1978 | Furda |
| 4,130,861 A | 12/1978 | LaForest |
| 4,139,735 A | 2/1979 | Dorfman et al. |
| 4,142,178 A | 2/1979 | Whyte et al. |
| 4,161,027 A | 7/1979 | Russell |
| 4,173,754 A | 11/1979 | Feiker |
| 4,174,517 A | 11/1979 | Mandel |
| 4,188,619 A | 2/1980 | Perkins |
| 4,199,761 A | 4/1980 | Whyte et al. |
| 4,205,360 A | 5/1980 | Drucker |
| 4,210,901 A | 7/1980 | Whyte et al. |
| 4,222,035 A | 9/1980 | Lohoff |
| 4,245,215 A | 1/1981 | O'Connor et al. |
| 4,250,489 A | 2/1981 | Dudash et al. |
| 4,254,403 A | 3/1981 | Perez-Cavero et al. |
| 4,262,171 A | 4/1981 | Schneider et al. |
| 4,300,126 A | 11/1981 | Gajjar |
| 4,303,993 A | 12/1981 | Panepinto, Jr. et al. |
| 4,307,380 A | 12/1981 | Gander |
| 4,311,964 A | 1/1982 | Boykin |
| 4,321,581 A | 3/1982 | Tappeiner et al. |
| 4,323,882 A | 4/1982 | Gajjar |
| 4,339,816 A | 7/1982 | Reed |
| 4,344,066 A | 8/1982 | Beggs |
| 4,355,303 A | 10/1982 | Phillips et al. |
| 4,357,598 A | 11/1982 | Melvin, Jr. |
| 4,367,548 A | 1/1983 | Cotten, Jr. et al. |
| 4,371,867 A | 2/1983 | Gander |
| 4,377,804 A | 3/1983 | Suzuki |
| 4,380,009 A | 4/1983 | Long et al. |
| 4,381,427 A | 4/1983 | Cheal et al. |
| 4,386,436 A | 5/1983 | Kocher et al. |
| 4,400,688 A | 8/1983 | Johnston et al. |
| 4,408,185 A | 10/1983 | Rasmussen |
| 4,408,186 A | 10/1983 | Howell |
| 4,413,229 A | 11/1983 | Grant |
| 4,419,758 A | 12/1983 | Dorey |
| 4,427,968 A | 1/1984 | York |
| 4,429,299 A | 1/1984 | Kabat et al. |
| 4,433,284 A | 2/1984 | Perkins |
| 4,433,326 A | 2/1984 | Howell |
| 4,438,519 A | 3/1984 | Bose |
| 4,442,319 A | 4/1984 | Treidl |
| 4,444,999 A | 4/1984 | Sparrevohn |
| 4,459,434 A | 7/1984 | Benning et al. |
| 4,462,113 A | 7/1984 | Iwata |
| 4,471,399 A | 9/1984 | Udren |
| 4,473,816 A | 9/1984 | Perkins |
| 4,473,817 A | 9/1984 | Perkins |
| 4,475,193 A | 10/1984 | Brown |
| 4,479,033 A | 10/1984 | Brown |
| 4,509,211 A | 4/1985 | Robbins |
| 4,514,594 A | 4/1985 | Brown et al. |
| 4,523,307 A | 6/1985 | Brown et al. |
| 4,535,447 A | 8/1985 | Rosanes et al. |
| 4,538,136 A | 8/1985 | Drabing |
| 4,551,721 A | 11/1985 | Kozlik |
| 4,556,864 A | 12/1985 | Roy |
| 4,556,865 A | 12/1985 | Fukagawa et al. |
| 4,556,866 A | 12/1985 | Gorecki |
| 4,559,520 A | 12/1985 | Johnston |
| 4,567,557 A | 1/1986 | Burns |
| 4,578,540 A | 3/1986 | Borg et al. |
| 4,597,082 A | 6/1986 | Hill et al. |
| 4,599,598 A | 7/1986 | Komoda et al. |
| 4,609,839 A | 9/1986 | Howell |
| 4,611,274 A | 9/1986 | Machino et al. |
| 4,631,367 A | 12/1986 | Coviello et al. |
| 4,633,218 A | 12/1986 | Palsgrove et al. |
| 4,636,771 A | 1/1987 | Ochs |
| 4,638,298 A | 1/1987 | Spiro |
| 4,638,299 A | 1/1987 | Campbell |
| 4,641,126 A | 2/1987 | Crowe |
| 4,641,322 A | 2/1987 | Hasegawa |
| 4,642,607 A | 2/1987 | Strom et al. |
| 4,644,321 A | 2/1987 | Kennon |
| 4,644,526 A | 2/1987 | Wu |
| 4,646,296 A | 2/1987 | Bartholet et al. |
| 4,647,725 A | 3/1987 | Dellinger et al. |
| 4,675,648 A | 6/1987 | Roth et al. |
| 4,701,945 A | 10/1987 | Pedigo |
| 4,703,499 A | 10/1987 | Fossas et al. |
| 4,714,912 A | 12/1987 | Roberts et al. |
| 4,731,821 A | 3/1988 | Jackson, III |
| 4,734,932 A | 3/1988 | Lott |
| 4,740,963 A | 4/1988 | Eckley |
| 4,745,391 A | 5/1988 | Gajjar |
| 4,745,392 A | 5/1988 | Ise et al. |
| 4,746,809 A | 5/1988 | Coleman et al. |
| 4,746,897 A | 5/1988 | Shuey |
| 4,748,656 A | 5/1988 | Gibbs et al. |
| 4,749,992 A | 6/1988 | Fitzemeyer et al. |
| 4,763,103 A | 8/1988 | Galula et al. |
| 4,766,402 A | 8/1988 | Crane |
| 4,766,414 A | 8/1988 | Shuey |
| 4,772,870 A | 9/1988 | Reyes |
| 4,776,006 A | 10/1988 | Comerford et al. |
| 4,782,322 A | 11/1988 | Lechner et al. |

| | | | | | |
|---|---|---|---|---|---|
| 4,785,448 A | 11/1988 | Reichert et al. | 5,305,312 A | 4/1994 | Fornek et al. |
| 4,800,363 A | 1/1989 | Braun et al. | 5,319,634 A | 6/1994 | Bartholomew et al. |
| 4,807,225 A | 2/1989 | Fitch | 5,341,415 A | 8/1994 | Baran |
| 4,815,106 A | 3/1989 | Propp et al. | 5,343,240 A | 8/1994 | Yu |
| 4,821,319 A | 4/1989 | Middleton et al. | 5,347,549 A | 9/1994 | Baumann et al. |
| 4,829,570 A | 5/1989 | Schotz | 5,349,644 A | 9/1994 | Massey et al. |
| 4,835,517 A | 5/1989 | van der Gracht et al. | 5,351,272 A | 9/1994 | Abraham |
| 4,843,606 A | 6/1989 | Bux et al. | 5,355,114 A | 10/1994 | Sutterlin et al. |
| 4,845,466 A | 7/1989 | Hariton et al. | 5,379,005 A | 1/1995 | Aden et al. |
| 4,847,903 A | 7/1989 | Schotz | 5,381,459 A | 1/1995 | Lappington |
| 4,864,588 A | 9/1989 | Simpson et al. | 5,404,127 A | 4/1995 | Lee et al. |
| 4,864,589 A | 9/1989 | Endo | 5,406,248 A | 4/1995 | Le Van Suu |
| 4,866,704 A | 9/1989 | Bergman | 5,406,249 A | 4/1995 | Pettus |
| 4,866,733 A | 9/1989 | Morishita | 5,410,292 A | 4/1995 | Le Van Suu |
| 4,866,757 A | 9/1989 | Nilssen | 5,412,369 A | 5/1995 | Kirchner |
| 4,885,563 A | 12/1989 | Johnson et al. | 5,418,559 A | 5/1995 | Blahut |
| 4,885,564 A | 12/1989 | Vercellotti et al. | 5,421,030 A | 5/1995 | Baran |
| 4,890,089 A | 12/1989 | Shuey | 5,440,335 A | 8/1995 | Beveridge |
| 4,891,694 A | 1/1990 | Way | 5,448,593 A | 9/1995 | Hill |
| 4,896,277 A | 1/1990 | Vercellotti et al. | 5,448,635 A | 9/1995 | Biehl et al. |
| 4,901,218 A | 2/1990 | Cornwell | 5,452,289 A | 9/1995 | Sharma et al. |
| 4,903,006 A | 2/1990 | Boomgaard | 5,452,344 A | 9/1995 | Larson |
| 4,912,553 A | 3/1990 | Pal et al. | 5,461,629 A | 10/1995 | Sutterlin et al. |
| 4,912,721 A | 3/1990 | Pidgeon, Jr. et al. | 5,467,011 A | 11/1995 | Hunt |
| 4,918,690 A | 4/1990 | Markkula, Jr. et al. | 5,471,190 A | 11/1995 | Zimmermann |
| 4,962,496 A | 10/1990 | Vercellotti et al. | 5,485,040 A | 1/1996 | Sutterlin |
| 4,963,853 A | 10/1990 | Mak | 5,489,894 A | 2/1996 | Murray |
| 4,968,970 A | 11/1990 | LaPorte | 5,497,142 A | 3/1996 | Chaffanjon |
| 4,973,940 A | 11/1990 | Sakai et al. | 5,499,241 A | 3/1996 | Thompson et al. |
| 4,979,183 A | 12/1990 | Cowart | 5,504,454 A | 4/1996 | Daggett et al. |
| 4,988,972 A | 1/1991 | Takagi | 5,530,737 A | 6/1996 | Bartholomew et al. |
| 4,996,709 A | 2/1991 | Heep et al. | 5,533,101 A | 7/1996 | Miyagawa |
| 5,010,399 A | 4/1991 | Goodman et al. | 5,539,449 A | 7/1996 | Blahut et al. |
| 5,018,138 A | 5/1991 | Twitty et al. | 5,548,592 A | 8/1996 | Komarek et al. |
| 5,022,069 A | 6/1991 | Chen | 5,554,968 A | 9/1996 | Lee |
| 5,023,868 A | 6/1991 | Davidson et al. | 5,566,233 A | 10/1996 | Liu |
| 5,027,426 A | 6/1991 | Chiocca, Jr. | 5,570,085 A | 10/1996 | Bertsch |
| 5,029,334 A | 7/1991 | Braun et al. | 5,570,355 A | 10/1996 | Dail et al. |
| 5,032,833 A | 7/1991 | Laporte | 5,579,221 A | 11/1996 | Mun |
| 5,034,882 A | 7/1991 | Eisenhard et al. | 5,581,229 A | 12/1996 | Hunt |
| 5,034,948 A | 7/1991 | Mizutani et al. | 5,581,555 A | 12/1996 | Dubberly et al. |
| 5,042,028 A | 8/1991 | Ogawa | 5,581,801 A | 12/1996 | Spriester et al. |
| 5,049,876 A | 9/1991 | Kahle et al. | 5,585,837 A | 12/1996 | Nixon |
| 5,051,720 A | 9/1991 | Kittirutsunetorn | 5,587,692 A | 12/1996 | Graham et al. |
| 5,065,133 A | 11/1991 | Howard | 5,590,173 A | 12/1996 | Beasley |
| 5,066,939 A | 11/1991 | Mansfield, Jr. | 5,592,540 A | 1/1997 | Beveridge |
| 5,068,890 A | 11/1991 | Nilssen | 5,594,726 A | 1/1997 | Thompson et al. |
| 5,070,522 A | 12/1991 | Nilssen | 5,596,631 A | 1/1997 | Chen |
| 5,090,024 A | 2/1992 | Vander Mey et al. | 5,604,737 A | 2/1997 | Iwami et al. |
| 5,090,052 A | 2/1992 | Nakajima et al. | 5,604,791 A | 2/1997 | Lee |
| 5,111,497 A | 5/1992 | Bliven et al. | 5,613,190 A | 3/1997 | Hylton |
| 5,113,498 A | 5/1992 | Evan et al. | 5,613,191 A | 3/1997 | Hylton |
| 5,127,003 A | 6/1992 | Doll, Jr. et al. | 5,619,252 A | 4/1997 | Nakano |
| 5,140,630 A | 8/1992 | Fry et al. | 5,623,537 A | 4/1997 | Ensor et al. |
| 5,142,568 A | 8/1992 | Ogata et al. | 5,625,863 A | 4/1997 | Abraham |
| 5,146,471 A | 9/1992 | Cowart | 5,627,827 A | 5/1997 | Dale et al. |
| 5,150,365 A | 9/1992 | Hirata et al. | 5,630,204 A | 5/1997 | Hylton et al. |
| 5,151,838 A | 9/1992 | Dockery | 5,668,857 A | 9/1997 | McHale |
| 5,168,510 A | 12/1992 | Hill | 5,671,220 A | 9/1997 | Tonomura |
| 5,185,591 A | 2/1993 | Shuey | 5,684,450 A | 11/1997 | Brown |
| 5,187,865 A | 2/1993 | Dolin, Jr. | 5,684,826 A | 11/1997 | Ratner |
| 5,192,231 A | 3/1993 | Dolin, Jr. | 5,696,790 A | 12/1997 | Graham et al. |
| 5,210,518 A | 5/1993 | Graham et al. | 5,705,974 A | 1/1998 | Patel et al. |
| 5,210,519 A | 5/1993 | Moore | 5,708,701 A | 1/1998 | Houvig et al. |
| 5,241,283 A | 8/1993 | Sutterlin | 5,712,614 A | 1/1998 | Patel et al. |
| 5,255,267 A | 10/1993 | Hansen et al. | 5,717,685 A | 2/1998 | Abraham |
| 5,257,006 A | 10/1993 | Graham et al. | 5,719,872 A | 2/1998 | Dubberly et al. |
| 5,262,755 A | 11/1993 | Mak et al. | 5,726,980 A | 3/1998 | Rickard |
| 5,263,046 A | 11/1993 | Vander Mey | 5,727,004 A | 3/1998 | Propp et al. |
| 5,268,666 A | 12/1993 | Michel et al. | 5,729,824 A | 3/1998 | O'Neill et al. |
| 5,274,631 A | 12/1993 | Bhardwaj | 5,737,333 A | 4/1998 | Civanlar et al. |
| 5,278,862 A | 1/1994 | Vander Mey | 5,742,596 A | 4/1998 | Baratz et al. |
| 5,289,476 A | 2/1994 | Johnson et al. | 5,748,104 A | 5/1998 | Argyroudis et al. |

| Patent No. | Date | Inventor(s) |
|---|---|---|
| 5,754,539 A | 5/1998 | Metz et al. |
| 5,757,936 A | 5/1998 | Lee |
| 5,760,822 A | 6/1998 | Coutinho |
| 5,764,743 A | 6/1998 | Goedken et al. |
| 5,767,895 A | 6/1998 | Yashiro et al. |
| 5,774,526 A | 6/1998 | Propp et al. |
| 5,777,544 A | 7/1998 | Vander Mey et al. |
| 5,777,545 A | 7/1998 | Patel et al. |
| 5,777,769 A | 7/1998 | Coutinho |
| 5,787,115 A | 7/1998 | Turnbull et al. |
| 5,793,413 A | 8/1998 | Hylton et al. |
| 5,796,739 A | 8/1998 | Kim et al. |
| 5,802,173 A | 9/1998 | Hamilton-Piercy et al. |
| 5,802,177 A | 9/1998 | Daniel et al. |
| 5,805,053 A | 9/1998 | Patel et al. |
| 5,805,591 A | 9/1998 | Naboulsi et al. |
| 5,805,806 A | 9/1998 | McAuthur |
| 5,809,431 A | 9/1998 | Bustamante et al. |
| 5,812,786 A | 9/1998 | Seazholtz et al. |
| 5,818,710 A | 10/1998 | LeVan Suu |
| 5,818,821 A | 10/1998 | Schurig |
| 5,822,677 A | 10/1998 | Peyrovian |
| 5,822,678 A | 10/1998 | Evanyk |
| 5,826,196 A | 10/1998 | Cuthrell |
| 5,835,005 A | 11/1998 | Furukawa et al. |
| 5,838,777 A | 11/1998 | Chang et al. |
| 5,841,360 A | 11/1998 | Binder |
| 5,841,841 A | 11/1998 | Dodds et al. |
| 5,842,111 A | 11/1998 | Byers |
| 5,845,190 A | 12/1998 | Bushue et al. |
| 5,848,150 A | 12/1998 | Bingel |
| 5,870,016 A | 2/1999 | Shrestha |
| 5,878,047 A | 3/1999 | Ganek et al. |
| 5,881,142 A | 3/1999 | Frankel et al. |
| 5,886,732 A | 3/1999 | Humpleman |
| 5,889,765 A | 3/1999 | Gibbs |
| 5,889,856 A | 3/1999 | O'Toole et al. |
| 5,892,430 A | 4/1999 | Wiesman et al. |
| 5,892,764 A | 4/1999 | Riemann et al. |
| 5,892,795 A | 4/1999 | Paret |
| 5,896,443 A | 4/1999 | Dichter |
| 5,896,556 A | 4/1999 | Moreland et al. |
| 5,898,347 A | 4/1999 | Harford |
| 5,903,213 A | 5/1999 | Hodge et al. |
| 5,903,572 A | 5/1999 | Wright et al. |
| 5,903,594 A | 5/1999 | Saulnier et al. |
| 5,903,643 A | 5/1999 | Bruhnke |
| 5,905,781 A | 5/1999 | McHale et al. |
| 5,905,786 A | 5/1999 | Hoopes |
| 5,911,119 A | 6/1999 | Bartholomew et al. |
| 5,911,123 A | 6/1999 | Shaffer et al. |
| 5,917,624 A | 6/1999 | Wagner |
| 5,922,047 A | 7/1999 | Newlin et al. |
| 5,926,479 A | 7/1999 | Baran |
| 5,929,748 A | 7/1999 | Odinak |
| 5,930,340 A | 7/1999 | Bell |
| 5,936,952 A | 8/1999 | Lecomte |
| 5,937,055 A | 8/1999 | Kaplan |
| 5,940,479 A | 8/1999 | Guy et al. |
| 5,943,404 A | 8/1999 | Sansom et al. |
| 5,949,327 A | 9/1999 | Brown |
| 5,952,914 A | 9/1999 | Wynn |
| 5,953,344 A | 9/1999 | Dail et al. |
| 5,960,066 A | 9/1999 | Hartmann et al. |
| 5,963,539 A | 10/1999 | Webber, Jr. et al. |
| 5,963,595 A | 10/1999 | Graham et al. |
| 5,963,620 A | 10/1999 | Frankel et al. |
| 5,963,844 A | 10/1999 | Dail |
| 5,968,118 A | 10/1999 | Sutton, Jr. |
| 5,970,127 A | 10/1999 | Smith et al. |
| 5,982,276 A | 11/1999 | Stewart |
| 5,982,854 A | 11/1999 | Ehreth |
| 5,991,311 A | 11/1999 | Long et al. |
| 5,999,612 A | 12/1999 | Dunn et al. |
| 6,009,041 A | 12/1999 | Rolandi et al. |
| 6,009,465 A | 12/1999 | Docker et al. |
| 6,014,386 A | 1/2000 | Abraham |
| 6,018,690 A | 1/2000 | Saito et al. |
| 6,026,150 A | 2/2000 | Frank et al. |
| 6,028,860 A | 2/2000 | Laubach et al. |
| 6,029,047 A | 2/2000 | Ishida et al. |
| 6,032,057 A | 2/2000 | Kiiski |
| 6,038,425 A | 3/2000 | Jeffrey |
| 6,040,759 A | 3/2000 | Sanderson |
| 6,047,055 A | 4/2000 | Carkner et al. |
| 6,049,531 A | 4/2000 | Roy |
| 6,055,242 A | 4/2000 | Doshi et al. |
| 6,055,435 A | 4/2000 | Smith et al. |
| 6,061,357 A | 5/2000 | Olshansky et al. |
| 6,064,422 A | 5/2000 | Goolcharan et al. |
| 6,069,588 A | 5/2000 | O'Neil, Jr. |
| 6,069,890 A | 5/2000 | White et al. |
| 6,069,899 A | 5/2000 | Foley |
| 6,075,784 A | 6/2000 | Frankel et al. |
| 6,075,787 A | 6/2000 | Bobeck et al. |
| 6,081,519 A | 6/2000 | Petler |
| 6,081,533 A | 6/2000 | Laubach et al. |
| 6,084,758 A | 7/2000 | Clarey et al. |
| 6,087,860 A | 7/2000 | Liu et al. |
| 6,088,569 A | 7/2000 | Bach et al. |
| 6,091,932 A | 7/2000 | Langlais |
| 6,097,801 A | 8/2000 | Williams et al. |
| 6,101,228 A | 8/2000 | Hebron et al. |
| 6,101,341 A | 8/2000 | Manabe |
| 6,107,912 A | 8/2000 | Bullock et al. |
| 6,115,429 A | 9/2000 | Huang |
| 6,128,471 A | 10/2000 | Quelch et al. |
| 6,130,893 A | 10/2000 | Whittaker et al. |
| 6,130,896 A | 10/2000 | Lueker et al. |
| 6,134,235 A | 10/2000 | Goldman et al. |
| 6,134,308 A | 10/2000 | Fallon et al. |
| 6,137,865 A | 10/2000 | Ripy et al. |
| 6,141,356 A | 10/2000 | Gorman |
| 6,144,292 A | 11/2000 | Brown |
| 6,144,399 A | 11/2000 | Manchester et al. |
| 6,151,330 A | 11/2000 | Liberman |
| 6,151,480 A | 11/2000 | Fischer et al. |
| 6,154,465 A | 11/2000 | Pickett |
| 6,154,488 A | 11/2000 | Hunt |
| 6,157,292 A | 12/2000 | Piercy et al. |
| 6,157,645 A | 12/2000 | Shobatake |
| 6,160,795 A | 12/2000 | Hosemann |
| 6,160,880 A | 12/2000 | Allen |
| 6,161,134 A | 12/2000 | Wang et al. |
| 6,167,043 A | 12/2000 | Frantz |
| 6,167,120 A | 12/2000 | Kikinis |
| 6,169,795 B1 | 1/2001 | Dunn et al. |
| 6,175,860 B1 | 1/2001 | Gaucher |
| 6,181,715 B1 | 1/2001 | Phillips et al. |
| 6,188,557 B1 | 2/2001 | Chaudhry |
| 6,192,399 B1 | 2/2001 | Goodman |
| 6,202,211 B1 | 3/2001 | Williams, Jr. |
| 6,208,637 B1 | 3/2001 | Eames |
| 6,215,789 B1 | 4/2001 | Keenan et al. |
| 6,215,799 B1 | 4/2001 | Mitchell et al. |
| 6,216,160 B1 | 4/2001 | Dichter |
| 6,218,931 B1 | 4/2001 | Asghar et al. |
| 6,219,409 B1 | 4/2001 | Smith et al. |
| 6,236,653 B1 | 5/2001 | Dalton et al. |
| 6,240,166 B1 | 5/2001 | Collin et al. |
| 6,243,413 B1 | 6/2001 | Beukema |
| 6,243,571 B1 | 6/2001 | Bullock et al. |
| 6,246,868 B1 | 6/2001 | Bullock et al. |
| 6,259,775 B1 | 7/2001 | Alpert et al. |
| 6,272,209 B1 | 8/2001 | Bridger et al. |
| 6,272,551 B1 | 8/2001 | Martin et al. |

| | | |
|---|---|---|
| 6,275,144 B1 | 8/2001 | Rumbaugh |
| 6,282,238 B1 | 8/2001 | Landry |
| 6,282,277 B1 | 8/2001 | DeBalko |
| 6,282,405 B1 | 8/2001 | Brown |
| 6,288,632 B1 | 9/2001 | Hoctor et al. |
| 6,292,517 B1 | 9/2001 | Jeffress et al. |
| 6,300,881 B1 | 10/2001 | Yee et al. |
| 6,307,862 B1 | 10/2001 | Silverman |
| 6,310,894 B1 | 10/2001 | Counterman |
| 6,310,940 B1 | 10/2001 | Ratz |
| 6,317,884 B1 | 11/2001 | Eames et al. |
| 6,320,900 B1 | 11/2001 | Liu |
| 6,331,814 B1 | 12/2001 | Albano et al. |
| 6,334,219 B1 | 12/2001 | Hill et al. |
| 6,339,594 B1 | 1/2002 | Civanlar et al. |
| 6,345,047 B1 | 2/2002 | Regnier |
| 6,346,875 B1 | 2/2002 | Puckette et al. |
| 6,348,875 B1 | 2/2002 | Odinak et al. |
| 6,349,098 B1 | 2/2002 | Parruck et al. |
| 6,349,133 B1 | 2/2002 | Matthews et al. |
| 6,370,149 B1 | 4/2002 | Gorman et al. |
| 6,373,377 B1 | 4/2002 | Sacca et al. |
| 6,393,050 B1 | 5/2002 | Liu |
| 6,396,391 B1 | 5/2002 | Binder |
| 6,396,392 B1 | 5/2002 | Abraham |
| 6,396,393 B2 | 5/2002 | Yuasa |
| 6,400,815 B1 | 6/2002 | Gilboy et al. |
| 6,404,773 B1 | 6/2002 | Williams et al. |
| 6,405,027 B1 | 6/2002 | Bell |
| 6,407,987 B1 | 6/2002 | Abraham |
| 6,418,149 B1 | 7/2002 | Swisher et al. |
| 6,426,942 B1 | 7/2002 | Sienel et al. |
| 6,427,237 B1 | 7/2002 | Aranguren et al. |
| 6,430,199 B1 | 8/2002 | Kerpez |
| 6,433,672 B1 | 8/2002 | Shirmard |
| 6,445,087 B1 | 9/2002 | Wang et al. |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,453,473 B1 | 9/2002 | Watson, Jr. |
| 6,459,692 B1 | 10/2002 | Ben-Michael et al. |
| 6,466,572 B1 | 10/2002 | Ethridge et al. |
| 6,470,053 B1 | 10/2002 | Liu |
| 6,481,013 B1 | 11/2002 | Dinwiddie et al. |
| 6,483,902 B1 | 11/2002 | Stewart et al. |
| 6,493,325 B1 | 12/2002 | Hjalmtysson et al. |
| 6,493,875 B1 | 12/2002 | Eames et al. |
| 6,507,647 B1 | 1/2003 | Mandalia |
| 6,522,662 B1 | 2/2003 | Liu |
| 6,522,728 B1 | 2/2003 | Willer |
| 6,526,581 B1 | 2/2003 | Edson |
| 6,532,280 B1 | 3/2003 | McDonald |
| 6,535,587 B1 | 3/2003 | Kobayashi |
| 6,539,011 B1 | 3/2003 | Keenan et al. |
| 6,546,098 B1 | 4/2003 | Henderson |
| 6,549,120 B1 | 4/2003 | de Buda |
| 6,556,564 B2 | 4/2003 | Rogers |
| 6,556,581 B1 | 4/2003 | He et al. |
| 6,560,225 B1 | 5/2003 | Czajkowski et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,580,710 B1 | 6/2003 | Bowen et al. |
| 6,584,122 B1 | 6/2003 | Matthews et al. |
| 6,584,148 B1 | 6/2003 | Zitting et al. |
| 6,587,454 B1 | 7/2003 | Lamb |
| 6,587,739 B1 | 7/2003 | Abrams et al. |
| 6,600,734 B1 | 7/2003 | Gernert et al. |
| 6,608,894 B1 | 8/2003 | Armenta |
| 6,611,537 B1 | 8/2003 | Edens et al. |
| 6,622,304 B1 | 9/2003 | Carhart |
| 6,624,532 B1 | 9/2003 | Davidow et al. |
| 6,637,030 B1 | 10/2003 | Klein |
| 6,657,994 B1 | 12/2003 | Rajakarunanayake |
| 6,665,384 B2 | 12/2003 | Daum et al. |
| 6,671,501 B1 | 12/2003 | Dalichau |
| 6,678,321 B1 | 1/2004 | Graham et al. |
| 6,686,832 B2 | 2/2004 | Abraham |
| 6,690,677 B1 | 2/2004 | Binder |
| 6,697,358 B2 | 2/2004 | Bernstein |
| 6,700,970 B1 | 3/2004 | Aronson et al. |
| 6,701,406 B1 | 3/2004 | Chang et al. |
| 6,704,414 B2 | 3/2004 | Murakoshi |
| 6,711,138 B1 | 3/2004 | Pai et al. |
| 6,721,365 B1 | 4/2004 | Yin et al. |
| 6,721,790 B1 | 4/2004 | Chen |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,741,162 B1 | 5/2004 | Sacca et al. |
| 6,747,995 B1 | 6/2004 | Brown et al. |
| 6,751,212 B1 | 6/2004 | Kaji et al. |
| 6,759,946 B1 | 7/2004 | Sahinoglu et al. |
| 6,760,384 B1 | 7/2004 | Garreau et al. |
| 6,763,097 B1 | 7/2004 | Vitenberg |
| 6,771,774 B1 | 8/2004 | Phan et al. |
| 6,773,632 B1 | 8/2004 | Marshall et al. |
| 6,775,269 B1 | 8/2004 | Kaczmarczyk et al. |
| 6,778,549 B1 | 8/2004 | Keller |
| 6,778,646 B1 | 8/2004 | Sun |
| 6,778,817 B1 | 8/2004 | Bullock et al. |
| 6,785,532 B1 | 8/2004 | Rickard |
| 6,788,782 B1 | 9/2004 | Fotsch et al. |
| 6,792,323 B2 | 9/2004 | Krzyzanowski et al. |
| 6,798,767 B1 | 9/2004 | Alexande et al. |
| 6,807,463 B1 | 10/2004 | Cunningham et al. |
| 6,819,682 B1 | 11/2004 | Rabenko et al. |
| 6,819,760 B1 | 11/2004 | Nayler |
| 6,823,047 B1 | 11/2004 | Cruickshank |
| 6,826,174 B1 | 11/2004 | Erekson et al. |
| 6,834,057 B1 | 12/2004 | Rabenko et al. |
| 6,836,546 B1 | 12/2004 | Willer |
| 6,842,459 B1 | 1/2005 | Binder |
| 6,847,718 B1 | 1/2005 | Hiraoka |
| 6,856,616 B1 | 2/2005 | Schuster et al. |
| 6,862,353 B2 | 3/2005 | Rabenko et al. |
| 6,865,193 B2 | 3/2005 | Terk |
| 6,868,072 B1 | 3/2005 | Lin et al. |
| 6,868,081 B1 | 3/2005 | Akram et al. |
| 6,868,265 B2 | 3/2005 | Zodnik |
| 6,876,648 B1 | 4/2005 | Lee |
| 6,882,714 B2 | 4/2005 | Mansfield |
| 6,898,413 B2 | 5/2005 | Yip et al. |
| 6,904,134 B2 | 6/2005 | Jeon et al. |
| 6,912,209 B1 | 6/2005 | Thi et al. |
| 6,922,135 B2 | 7/2005 | Abraham |
| 6,922,407 B2 | 7/2005 | Wu |
| 6,925,089 B2 | 8/2005 | Chow et al. |
| 6,927,340 B1 | 8/2005 | Binder |
| 6,933,835 B2 | 8/2005 | Kline |
| 6,934,754 B2 | 8/2005 | West et al. |
| 6,937,056 B2 | 8/2005 | Binder |
| 6,941,364 B2 | 9/2005 | Kim et al. |
| 6,941,576 B2 | 9/2005 | Amit |
| 6,947,409 B2 | 9/2005 | Iwamura |
| 6,947,736 B2 | 9/2005 | Shaver et al. |

| | | | | | | |
|---|---|---|---|---|---|---|
| 6,950,567 | B2 | 9/2005 | Kline | 2002/0006137 A1 | 1/2002 | Rabenko et al. |
| 6,956,826 | B1 | 10/2005 | Binder | 2002/0021465 A1 | 2/2002 | Moore, Jr. et al. |
| 6,958,680 | B2 | 10/2005 | Kline | 2002/0031114 A1 | 3/2002 | Terry et al. |
| 6,961,303 | B1 | 11/2005 | Binder | 2002/0037004 A1 | 3/2002 | Bossemeyer et al. |
| 6,963,559 | B2 | 11/2005 | Elo | 2002/0059634 A1 | 5/2002 | Terry et al. |
| 6,965,302 | B2 | 11/2005 | Mollenkopf et al. | 2002/0061012 A1 | 5/2002 | Thi et al. |
| 6,965,303 | B2 | 11/2005 | Mollenkopf | 2002/0063924 A1 | 5/2002 | Kimbrough et al. |
| 6,975,713 | B1 | 12/2005 | Smith et al. | 2002/0069417 A1 | 6/2002 | Kliger et al. |
| 6,977,578 | B2 | 12/2005 | Kline | 2002/0111077 A1 | 8/2002 | Keenum |
| 6,980,089 | B1 | 12/2005 | Kline | 2002/0116720 A1 | 8/2002 | Terry et al. |
| 6,980,090 | B2 | 12/2005 | Mollenkopf | 2002/0128009 A1 | 9/2002 | Boch et al. |
| 6,980,091 | B2 | 12/2005 | White, II et al. | 2002/0131422 A1 | 9/2002 | Chu et al. |
| 6,980,638 | B1 | 12/2005 | Smith et al. | 2002/0150155 A1 | 10/2002 | Florentin et al. |
| 6,981,892 | B1 | 1/2006 | Kostelnik | 2002/0159512 A1 | 10/2002 | Matsumoto |
| 6,982,611 | B2 | 1/2006 | Cope | 2002/0166124 A1 | 11/2002 | Gurantz et al. |
| 6,985,714 | B2 | 1/2006 | Akiyama et al. | 2002/0174423 A1 | 11/2002 | Fifield et al. |
| 6,989,733 | B2 | 1/2006 | Simonsen et al. | 2002/0176567 A1 | 11/2002 | Chen et al. |
| 6,995,657 | B2 | 2/2006 | Zalitzky et al. | 2002/0194383 A1 | 12/2002 | Cohen et al. |
| 6,996,134 | B1 | 2/2006 | Renucci et al. | 2002/0194605 A1 | 12/2002 | Cohen et al. |
| 6,996,729 | B2 | 2/2006 | Volkening et al. | 2003/0066082 A1 | 4/2003 | Kliger et al. |
| 6,998,962 | B2 | 2/2006 | Cope et al. | 2003/0067910 A1 | 4/2003 | Razazian et al. |
| 6,998,964 | B2 | 2/2006 | Lomax, Jr. et al. | 2003/0088706 A1 | 5/2003 | Chan et al. |
| 7,002,898 | B1 | 2/2006 | Lou | 2003/0099228 A1 | 5/2003 | Alcock |
| 7,003,102 | B2 | 2/2006 | Kiko | 2003/0151695 A1 | 8/2003 | Sahlin et al. |
| 7,009,946 | B1 | 3/2006 | Kardach | 2003/0204393 A1 | 10/2003 | Czerwiec et al. |
| 7,010,002 | B2 | 3/2006 | Chow et al. | 2004/0006484 A1 | 1/2004 | Manis et al. |
| 7,012,922 | B1 | 3/2006 | Unitt et al. | 2004/0037317 A1 | 2/2004 | Zalitzky et al. |
| 7,016,377 | B1 | 3/2006 | Chun et al. | 2004/0083262 A1 | 4/2004 | Trantow |
| 7,020,130 | B2 | 3/2006 | Krause et al. | 2004/0090984 A1 | 5/2004 | Saint-Hilaire et al. |
| 7,027,566 | B2 | 4/2006 | Bossemeyer, Jr. et al. | 2004/0107299 A1 | 6/2004 | Lee et al. |
| 7,031,394 | B2 | 4/2006 | Vitenberg | 2004/0136373 A1 | 7/2004 | Bareis |
| 7,035,270 | B2 | 4/2006 | Moore, Jr. et al. | 2004/0147232 A1 | 7/2004 | Zodnik |
| 7,046,124 | B2 | 5/2006 | Cope et al. | 2004/0156513 A1 | 8/2004 | Kaylor et al. |
| 7,046,882 | B2 | 5/2006 | Kline | 2004/0158649 A1 | 8/2004 | Ophir et al. |
| 7,049,939 | B2 | 5/2006 | Ikeda et al. | 2004/0170262 A1 | 9/2004 | Ohno |
| 7,053,756 | B2 | 5/2006 | Mollenkopf et al. | 2004/0172658 A1* | 9/2004 | Rakib et al. ................. 725/120 |
| 7,054,303 | B2 | 5/2006 | Miyazaki et al. | 2004/0177167 A1 | 9/2004 | Iwamura et al. |
| 7,058,174 | B2 | 6/2006 | Posthuma | 2004/0177381 A1 | 9/2004 | Kliger et al. |
| 7,064,654 | B2 | 6/2006 | Berkman et al. | 2004/0178888 A1 | 9/2004 | Hales et al. |
| 7,068,668 | B2 | 6/2006 | Feuer | 2004/0180573 A1 | 9/2004 | Chen |
| 7,072,408 | B2 | 7/2006 | Gehlot et al. | 2004/0187156 A1 | 9/2004 | Palm et al. |
| 7,082,141 | B2 | 7/2006 | Sharma et al. | 2004/0198236 A1 | 10/2004 | Paine et al. |
| 7,092,518 | B2 | 8/2006 | Eckel et al. | 2004/0204040 A1 | 10/2004 | Heijnen |
| 7,095,849 | B2 | 8/2006 | Smith et al. | 2004/0208167 A1 | 10/2004 | Kishida |
| 7,099,368 | B2 | 8/2006 | Santhoff et al. | 2004/0255332 A1 | 12/2004 | Bertonis et al. |
| 7,106,721 | B1 | 9/2006 | Binder | 2004/0268160 A1 | 12/2004 | Atkinson et al. |
| 7,117,520 | B2 | 10/2006 | Stewart | 2005/0015805 A1 | 1/2005 | Iwamura |
| 7,133,278 | B2 | 11/2006 | Amdahl et al. | 2005/0018766 A1 | 1/2005 | Iwamura |
| 7,142,094 | B1 | 11/2006 | Davidow | 2005/0034159 A1 | 2/2005 | Ophir et al. |
| 7,142,560 | B2 | 11/2006 | Mansfield | 2005/0047431 A1 | 3/2005 | Binder |
| 7,142,934 | B2 | 11/2006 | Janik | 2005/0076149 A1 | 4/2005 | McKown et al. |
| 7,149,182 | B1 | 12/2006 | Renucci et al. | 2005/0086694 A1 | 4/2005 | Hicks et al. |
| 7,149,474 | B1 | 12/2006 | Mikhak | 2005/0114325 A1 | 5/2005 | Liu et al. |
| 7,162,013 | B2 | 1/2007 | Gavette et al. | 2005/0150100 A1 | 7/2005 | Merdan et al. |
| 7,164,346 | B2 | 1/2007 | Hunt et al. | 2005/0152337 A1 | 7/2005 | Wurtzel et al. |
| 7,164,690 | B2 | 1/2007 | Limb et al. | 2005/0226200 A1 | 10/2005 | Askildsen et al. |
| 7,170,405 | B2 | 1/2007 | Daum et al. | 2005/0235333 A1 | 10/2005 | Bertonis et al. |
| 7,171,506 | B2 | 1/2007 | Iwamura | 2006/0140178 A1 | 6/2006 | Cheng et al. |
| 7,199,706 | B2 | 4/2007 | Dawson et al. | 2006/0148321 A1 | 7/2006 | Macor |
| 7,206,322 | B1 | 4/2007 | Garg et al. | 2006/0153169 A1 | 7/2006 | Koifman et al. |
| 7,206,417 | B2 | 4/2007 | Nathan | 2006/0193310 A1 | 8/2006 | Landry et al. |
| 7,209,719 | B2 | 4/2007 | Liebenow | 2006/0193313 A1 | 8/2006 | Landry et al. |
| 7,239,628 | B1 | 7/2007 | Pendleton et al. | 2006/0193336 A1 | 8/2006 | Landry et al. |
| 7,257,106 | B2 | 8/2007 | Chen et al. | 2006/0251094 A1 | 11/2006 | Van Vleck et al. |
| 7,263,362 | B1* | 8/2007 | Young et al. ................. 455/450 | 2006/0251159 A1 | 11/2006 | Huotari et al. |
| 7,274,669 | B2 | 9/2007 | Czerwiec et al. | 2007/0198748 A1 | 8/2007 | Ametsitsi et al. |
| 7,301,940 | B1 | 11/2007 | Bernstein | 2008/0140565 A1 | 6/2008 | DeBenedetti et al. |
| 7,317,793 | B2 | 1/2008 | Binder | 2008/0153415 A1 | 6/2008 | Block et al. |
| 7,346,071 | B2 | 3/2008 | Bareis | | | |
| 7,382,786 | B2 | 6/2008 | Chen et al. | | | |
| 2001/0030950 | A1 | 10/2001 | Chen et al. | | | |
| 2001/0038635 | A1 | 11/2001 | Rogers | | | |
| 2001/0039660 | A1 | 11/2001 | Vasilevsky et al. | | | |

FOREIGN PATENT DOCUMENTS

| | | | |
|---|---|---|---|
| WO | | 9623377 A1 | 8/1996 |
| WO | WO 97/19533 | A1 | 5/1997 |

| WO | WO 98/27748 A2 | 6/1998 |
| WO | WO 98/31133 A2 | 7/1998 |
| WO | WO 99/12330 A1 | 3/1999 |
| WO | WO 99/35753 A2 | 7/1999 |
| WO | WO 00/07322 A2 | 2/2000 |
| WO | WO 00/28689 A2 | 5/2000 |
| WO | WO 01/28215 A1 | 4/2001 |
| WO | WO 0128215 | 4/2001 |
| WO | WO 01/71980 A1 | 9/2001 |
| WO | WO 01/80030 A1 | 10/2001 |
| WO | WO 01/80595 A1 | 10/2001 |
| WO | WO-01/82530 A | 11/2001 |
| WO | WO 02/19623 A2 | 3/2002 |
| WO | WO 02/065229 A2 | 8/2002 |
| WO | WO 03/005691 A1 | 1/2003 |
| WO | WO-2005/032158 | 4/2005 |
| WO | WO2007069241 A2 | 6/2007 |

OTHER PUBLICATIONS

EIA-600.38 Power Line / RF Symbol Encoding Sublayer; Revision May 12, 1995 Draft Copy (64 pages).
Draft IS-60.04 Node Communications Protocol Part 6: Application Layer Specification; Revision Apr. 18, 1996 Draft Copy (129 pages).
EIA 600.42 Node Medium Access Control Sublayer; Revision IS-60 Feb. 22, 1996 (54 pages).
EIA 600.41 Description of the Data Link Layer; Revision IS-60 Jan. 31, 1996 (60 pages).
Home Automation Buses: Protocols Really Hit Home; EDN Apr. 13, 1995 (9 pages).
EIA-600.10 Introduction to the CEBus Standard; Revision Feb. 5, 1995 Draft Copy (19 pages).
Compaq to Ride The CEBus; By Mark Hachman, EBN Jan. 22, 1996 (1 page).
Banish Those "Wall-Warts" With Power Over Ethernet; by Jacob Herbold and Dave Dwelley, Electronic Design Oct. 27, 2003 (8 pages).
Echelon Customer Support Alert Re: RTR-10 Core Module and RTR-10 Motherboard Changes; Jan. 1996 (2 pages).
CEBus Router Testing; IEEE Transactions on Consumer Electronics Nov. 1991, vol. 37 No. 4 (8 pages).
LAN Operates Over Existing Power Lines; by David J. Bak, Design News Jan. 23, 1989 (3 pages).
A Power LAN for Telecommunication Power Supply Equipment; Proceedings TENCON '93 1993 IEEE Region 10 Conference on "Computer, Communication, Control and Power Engineering", pp. 24-27, vol. 3 of 5, Oct. 19-21, 1993 (6 pages).
A Distributed Experimental Communications System; IEEE Journal on Selected Areas in Communications, vol. Sac-1, No. 6 pp. 1070-1075, Dec. 1983 (6 pages).
Fieldbus Standard for Use in Industrial Control Systems, Part 2: Physical Layer Specification and Service Definition; ANSI/ISA-S50. 02-1992, Approved May 17, 1994 (106 pages).
AN192 Powerline Network Communications Module; Adaptive Networks Printed Nov. 1988 (2 pages).
NE5050 Power Line Modem Product Specification; Philips Semiconductors, Apr. 15, 1992 (6 pages).
RCA Wireless Phone Jack for DirecTV from Amazon Web-site (5 pages), "submitted on Feb. 22, 2007".
Power Line Modems and Networks; by R. Broadbridge Second IEE National Conference on Telecommunications Apr. 2-5, 1989 pp. 294-296 (6 pages).
Now This is Plug and Play; Business Week Updated Jun. 14, 1997 (2 pages).
Cheap, Reliable Powerful Net Connections May Be As Close As An Electrical Socket; by Bob Metcalfe InfoWorld Feb. 10, 1997 vol. 19 Issue 6 (4 pages).
Communications System Uses Standard Powerlines; Computer Design Nov. 1995 (3 pages).
Telecommunication Over the Power Distribution Grid—Possibilities and Limitations; by Klaus M. Dostert, Proceedings 1997 International Symposium on Power-Line Communications and Its Applications, Apr. 2-4, 1997 (10 pages).
Intelogis Simplifies Networking. (Passport Plug-In Network); Jul. 20, 1998 (1 page).
Chip Set Puts 100 Kbit/s of Data on Noisy Power Lines; Electronic Design Mar. 18, 1996 (9 pages).
Socket To Me: Networks Limited By Electrical Lines; Mass High Tech Jan. 20-26, 1997 (1 page).
Spread-Spectrum Data Leap Through AC Power Wiring; IEEE Spectrum Nov. 1996 (5 pages).
The Use of Reliable Communications In Telemanagement Trials; by Dr. Michael Propp, Proceedings 1997 International Symposium on Power-Line Communications and Its Applications, 2nd Edition, Apr. 2-4, 1997 (9 pages).
A Novel High-Speed PLC Communication Modem; IEEE Transaction on Power Delivery, vol. 7 No. 4 Oct. 1992 (8 pages).
Data Transmission Without Wires; Material Handling Engineering 1993 (1 page).
High Cost Of Wiring Sparks Wireless LAN Alternatives; Computer Technology Review vol. XIV No. 3, Mar. 1994 (8 pages).
Videohub Cuts Costs, Opens Options; Data Communications Feb. 1992 (4 pages).
LTS-10 SLTA Core Module Model 65200; Echelon 1993 (12 pages).
A Token Passing Network for Powerline Communications; by Adaptive networks, IEEE Transactions on Consumer Electronics vol. 37 No. 2, May 1991 (6 pages).
Carrier Current Audio Transmitter; Radio-Electronics, Jan. 1989 (5 pages).
Carrier Current Receiver; Radio-Electronics, Feb. 1989 (vol. 60 No. 2) (6 pages).
Line Carrier Modems—1: Build a Pair of Line-Carrier Modems (Part 1); Radio Electronics, Jul. 1988, pp. 87-91 by Keith Nichols (7 pages).
Line Carrier Modems—2: Build a Pair of Line-Carrier Modems (Part 2); Radio Electronics, Aug. 1988, pp. 88-96 by Keith Nichols (5 pages).
"Simple, High-Speed Ethernet Technology for the Home, A White Paper" The Home Phoneline Networking Alliance, Online! (Jun. 1998) pp. 1-11.
Abraham, K.C. et al; A Novel High-Speed PLC Communication Modem; IEEE Transaction on Power Delivery, vol. 7, No. 4, Oct. 1992, 8 pages.
Abraham, Richard, "Socket to me: networks linked by electrical lines"; Mass High Tech, 1997, one page.
Bak, David; "LAN Operates Over Existing Power Lines"; Design News, Jan. 23, 1989, 3 pages.
Broadbridge, R.; "Power Line Modems and Networks"; Second IEE National Conference on Telecommunications, Apr. 2-5, 1989; pp. 294-296, 6 pages.
Detreville, John et al; "A Distributed Experimental Communications System"; IEEE Journal on Selected Areas in Communications, vol. Sac-1, No. 6, pp. 1070-1075, Dec. 1983, 6 pages.
Dostert, Klaus; "Telecommunications Over the Power Distribution Grid—Possibilities and Limitations"; Proceedings, 1997 Int'l Symposium on Power-Line communications and its Applications, Apr. 2-4, 1997, 10 pages.
Gershon, Ron et al; "A Token Passing Network for Powerline Communications" by Adaptive Networks, IEEE Transactions on Consumer Electronics, vol. 37, No. 2, 1991, 6 pages.
Goodenough, Frank; Chip Set Puts 100 Kbit/s of Data on Noisy Power Lines; Electronic Design, Mar. 18, 1996, 9 pages.
Hachman, Mark; Compaq to Ride The CEBus; EBN, Jan. 22, 1996, one page.
Herbold, Jacob et al; "Banish Those 'Wall-Warts' with power over Ethernet"; Electronic Design, Oct. 27, 2003, 8 pages.
Hoffman, J.; "Cable, Television, and the Consumer Electronic Bus"; Panasonic Technologies, Inc., pp. 165-173, "submitted on Feb. 22, 2007".
Johnson, Johna Till; "Videohub Cuts Costs, Opens Options"; Data Communications, Feb. 1992; 4 pages.
Markwalter, Brian et al; CEBUs Router Testing; IEEE Transactions on Consumer Electronics, Nov. 1991, vol. 37, No. 4, 8 pages.
Metcalfe, Bob; "Cheap, Reliable Powerful Net Connections May Be as Close as an Electrical Socket"; InfoWorld, Feb. 10, 1997, vol. 19, issue 6 (4 pages).

Nichols, Keith; "Line-Carrier Modems (Part 1)", CRC Electronics, Jul. 1988, pp. 87-91.
Nichols, Keith; "Line-Carrier Modems (Part 2)", CRC Electronics, Aug. 1988, pp. 88-96.
Propp, Michael, Dr.; "The Use of Reliable Communications in Telemanagement Trials"; Proceedings, 1997, International Symposium on Power-Line Communications and its Applications, $2^{nd}$ Ed., 9 pages.
Radford, Denny; "Spread-spectrum Data Leap Through AC Power Wiring"; IEEE Spectrum, Nov. 1996. pp. 48-53.
Sheets, William et al' "Carrier Current Audio Transmitter"; Radio Electronics, Jan. 1989, 5 pages.
Sheets, William et al' "Carrier Current Receiver"; Radio Electronics, Feb. 1989, vol. 60, No. 2), 6 pages.
Strassberg, Dan; Home Automation Buses: Protocols Really Hit Home; EDN Design Feature, Apr. 13, 1995.
Trowbridge, Dave; "High Cost of Wiring Sparks Wireless LAN Alternatives"; Computer Technology Review, vol. XIV, No. 3, Mar. 1994, 8 pages.
Vun, Nicholas, et al; "A Power LAN for Telecommunication Power Supply Equipment; IEEE Region 10 Conference on" Computer, Communication, Control and Power Engineering, 1993, pp. 24-27, vol. 3 of 5.
Wildstrom, Stephen; "Now This is Plug and Play"; Business Week, Updated Jun. 14, 1997, 2 pages.
Communications System Uses Standard Powerlines; Computer Design, Nov. 1995 (3 pages).
Intelogis Simplifies Networking (Passport Plug-In Network); Jul. 20, 1998, 1 page.
"Spread Spectrum Carrier Technology Enabling Reliable Communications Over Noisy Media"; Intellon, 8 pages, "submitted on Feb. 22, 2007".
LTS-10 SLTA Core Module Model 65200; Echelon, 1993, 12 pages.
"Powerline Network Communications Module"; Adaptive Networks Printed 11-88 (2 pages), "submitted on Feb. 22, 2007".
"Data Transmission Without Wires"; Material Handling Engineering, 1993, 1 page.
Powerhouse Wireless Remote Controls; http://web.archive.org/web/19970209054822.x10remo.htm. 3 pages, "submitted on Feb. 22, 2007".
Powerhouse Wireless Wall Switches; http://web.archive.org/web/19970209054911/x10.com/x10wws.htm. 3 pages, "submitted on Feb. 22, 2007".
RCA Wireless Phone Jack for DirecTV from Amazon.com website. 5 pages, "submitted on Feb. 22, 2007".
Echelon Customer Support Alter Re: RTR-10 Core Module and RTR-10 Motherboard Changes, Jan. 1996, 2 pages.
NE5050 Power line modem product specification; Philips semiconductors, Apr. 15, 1992.
EIA-600.31—PL Physical Layer & Medium Specification; pp. 1-24, "submitted on Feb. 22, 2007".
EIA-600.37—Symbol Encoding Sublayer; Revision: May 12, 1995, 30 pages.
EIA-600.38—Power Line/RF Symbol Encoding Sublayer, Revision May 12, 1995; 64 pages.
IS-60.04; Node Communications Protocol Part 6: Application Layer Specification; Revision Apr. 18, 1996; 129 pages.
EIA-600.42—Node Medium Access Control Sub-layer; Revision IS-60 Feb. 22, 1996; 54 pages.
EIA-600.41 Description of the Data Link Layer; Revision Jan. 31, 1996; 60 pages.
EIA-600.10—Introduction to the CEBus Standard; Revision Feb. 5, 1995; 19 pages.
Fieldbus Standard for use in Industrial Control Systems, Part 2: Physical Layer Specification and Service Definition; ANSI/ISA-S50. 02-1992 Approved May 17, 1994; 106 pages.
Evans, Grayson; The CEBus Standard User's Guide; 1st edition, 1996; 317 pages.
Tanaka, M., "Transmission Characteristics of a Power Line Used for Data Communications at High Frequencies," IEEE Transactions on Consumer Electronics, Feb. 1989, vol. 35, No. 1, pp. 37-42.

E.F. Hasler, et al., "Communication Systems Using Bundle Conductor Overhead Power Lines," IEEE Transactions on Power Apparatus and Systems, Mar./Apr. 1975, vol. PAS-94, No. 2, pp. 344-349.
IEEE Guide for Power-Line Carrier Applications, ANSI/IEEE Std 643-1980, .COPYRGT. 1980 by The Institute of Electrical and Electronics Engineers, Inc., pp. 1-80.
M. Hatori, et al., "Home Information and Standardization of Home Bus," IEEE Transactions on Consumer Electronics, Aug. 1986, vol. CE-32, No. 3, pp. 542-549.
J. M. Hunt, et al., "Electrical Energy Monitoring and Control System for the Home," IEEE Transactions on Consumer Electronics, Aug. 1986, vol. CE-32, No. 3, pp. 578-583.
F.W. Gutzwiller, et al., "Homenet: A Control Network for Consumer Applications," IEEE Transactions on Consumer Electronics, Aug. 1983, vol. CE-29, No. 3, pp. 297-304.
P. Burrascano, et al., "Digital Signal Transmission on Power Line Carrier Channels: An Introduction," IEEE Transactions on Power Delivery, Jan. 1987, vol. PWRD-2, No. 1, pp. 50-56.
Burr, A.G. Burr, et al., "Effect of HF Broadcast Interference on PowerLine Telecommunications Above 1 MHZ". COPYRGT.1998 IEEE, pp. 2870-2875.
J. Onunga, et al., "Distribution Line Communications Using CSMA Access Control with Priority Acknowledgements," IEEE Transactions on Power Delivery, Apr. 1989, vol. 4, No. 2, pp. 878-886.
Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321-326.
H. Meng et al., "A Transmission Line Model for High-Frequency Power Line Communication Channel,". COPYRGT.2002 IEEE, pp. 1290-1295.
P. Burrascano, et al., "Performance Evaluation of Digital Signal Transmission Channels on Coronating Power Lines," .COPYRGT. 1988 IEEE, pp. 365-368.
D.A. Diclementi, et al., "Electrical Distribution System Power Line Characterization," .COPYRGT.1996 IEEE, pp. 271-276.
M. Yoshitoshi et al., "Proposed Interface Specifications For Home Bus," IEEE Transactions on Consumer Electronics, Aug. 1986, vol. CE-32, No. 3, pp. 550-557.
J.B. Oneal, Jr., "The Residential Power Circuit as a Communication Medium," IEEE Transactions on Consumer Electronics, Aug. 1986, vol. CE-32, No. 3, pp. 567-577.
K. Dostert, "EMC Aspects of High Speed Powerline Communications," Proceedings of the 15.sup.th International Wroclaw Symposium and Exhibition on Electromagnetic Capability, Jun. 27-30, 2000; Wroclaw, Poland, pp. 98-102.
R.A. Piety, "Intrabuilding Data Transmission Using Power-Line Wiring," Hewlett-Packard Journal, May 1987, pp. 35-40.
K. Dostert, Powerline Communications, Ch. 5, pp. 286, 288-292, Prentice Hall PTR, Upper Saddle River, NJ . COPYRGT.2001.
E. Liu, et al., "Broadband Characterization of Indoor Powerline Channel," Communications Laboratory, Helsinki University of Technology, Finland [presented at the 2004 International Symposium on PowerLine Communications and its Applications, Zaragoza, Spain Mar. 31-Apr. 2, 2004] 6 pages.
LonWorks LPI-10 Link Power Interface Module User's Guide; Echelon Corporation, 1995 (37 pages).
LonWorks LPT-10 Link Power Transceiver User's Guide Version 2.1; Echelon Corporation, 1995 (60 pages).
LonWorks Router User's Guide Revision 3; Echelon Corporation, 1995 (68 pages).
Using the LonWorks PLT-22 Power Line Transceiver in European Utility Application, Version 1; Echelon Corporation, 1996-1999 (118 pages).
PL3120 / PL3150 Power Line Smart Transceiver Data Book, Version 2; Echelon Corporation, 1996-2005 (251 pages).
PL DSK 2.1 Power Line Smart Transceiver Development Support Kit User's Guide; Echelon Corporation, 2005-2006 (18 pages).
Introduction to Pyxos FT Platform; Echelon Corporation, 2007 (34 pages).
LTM-10A User's Guide, Revision 4; Echelon Corporation, 1995-2001 (46 pages).

LonWorks Twisted Pair Control Module, User's Guide Version 2; Echelon Corporation, 1992-1996 (50 pages).

AN1000EVK Evaluation Unit Manual, Draft 1.0; Adaptive Networks Inc., Document No. 04-3170-01-B Aug. 1996 (31 pages).

AN1000 Powerline Network Communications Chip Set, Adaptive Networks, Inc., 1995 (56 pages).

From the Ether—Bob Metcalfe, 'Cheap, reliable, powerful net connections may be as close as an electrical socket'; by Bob Metcalfe InfoWorld Feb. 10, 1997 vol. 19 Issue 6 (4 pages).

LonWorks Custom Node Development, LonWorks Engineering Bulletin; Echelon Corporation, Jan. 1995 (16 pages).

Building a LonTalk-to-PLC Gateway, LonWorks Engineering Bulletin; Echelon Corporation, May 1994 (62 pages).

LonWorks 78kbps Self-Healing Ring Architecture, LonWorks Marketing Bulletin; Echelon Corporation, Aug. 1993 (6 pages).

Centralized Commercial Building Applications with the LonWorks PLT-21 Power Line Transceiver, LonWorks Engineering Bulletin; Echelon Corporation, Apr. 1997 (22 pages).

LonWorks for Audio Computer Control Network Applications; Echelon Corporation, Jan. 1995 (30 pages).

Demand Side Management with LonWorks Power Line Transceivers, LonWorks Engineering Bulletin; Echelon Corporation, Dec. 1995 (36 pages).

Intelogis to Present on State at Internet Showcase 1998; PR Newswire Jan. 28, 1998 (1 page).

The CeBus Standard User's Guide, May 1996, pp. 1-317.

Claim Chart presented in request for reexamination of U.S. Patent No. 6,480,510, request filed Jun. 10, 2009.

Claim Chart presented in request for reexamination of U.S. Patent No. 5,841,360, request filed May 26, 2009.

Sheets and Graf, "Build This Carrier Current Audio Transmitter", Radio Electronics, pp. 55-64, 1989.

Sheets and Graf, "Build This Carrier Current Receiver", Radio Electronics, pp. 54-94, 1989.

M. Inoue, et al., "The MELON Home Automation Housekeeping System", Mitsubishi Denki Giho, vol. 63, No. 2, 1989, pp. 36-41.

C. Dougligeris, et al., "Communications and Control For A Home Automation System", Conference: IEEE Proceedings of the Southeastcon 1991, vol. 1, pp. 171-175.

D.G.J. Fanshawe, "Architures for Home Systems," Conference: IEEE Colloquium on Home Systems--Information, Entertainment and Control, Oct. 1, 1990, London, United Kingdom, pp. 3/1-3/3.

"CEBus: US Households Are Being Networked," Funkschau, No. 9, Apr. 1989, pp. 45-47.

Hoe-Young Noh, "Home Automation," Korea Information Science Society Review, Apr. 1989, vol. 7 No. 2, pp. 40-44, Republic of Korea. (Translation Provided).

"White Paper on Medium Voltage Powerline Communication (PLC) Networks", CIGRE SC D2 WG 14, Broadband PLC, (Mar. 2005), pp. 1-58.

"White Paper on Medium Voltage Powerline Communication (PLC) Networks Annexes", CIGRE SC D2 WG 14, Broadband PLC, (Apr. 2005), 1-15.

Patent Abstracts of Japan, Japanese Publication No. 10200544 A2, Published Jul. 31, 1998, (Matsushita Electric Works, LTD).

Tohoku Electric Power, Co., Inc., "Tohoku Electric Develops High-Speed Communications System Using Power Distribution Lines," Tohoku Currents, Spring 1998, 8(1), 2 pages (http://www.tohoku-epco.co.jp/profil/kurozu/c.sub.-vol. 8.sub.--1/art04.ht- m).

Power Line Communications Conference Entitled, "PLC, A New Competitor in Broadband Internet Access," Dec. 11-12, 2001, Washington, D.C., 60 pages.

Rivkin, S. R., "Co-Evolution of Electric & Telecommunications Networks", The Electricity Journal, May 1998, pp. 71-76.

Marketing Assessment Presentation Entitled "Powerline Telecommunications", The Shpigler Group for CITI PLT, Jul. 16, 2002, 9 pages.

C. Campbell, Presentation Entitled "Building a Business Case for PLC: Lessons Learned From the Communication Industry Trenches", KPMG Consulting, Jul. 16, 2002, 5 pages.

"Embedded Power Line Carrier Modem," Archnet Electronic Technology, http://www.archnetco.com/english/product/ATL90.htm, .COPYRGT. 2001, 3 pages.

"Archnet: Automatic Meter Reading System Power Line Carrier Communication", www.archnetco.com/english/product/product.sub.--sl.htm, .COPYRGT. 2001,3 pages.

"Power Line Communications Solutions", www.echelon.com/products/oem/transceivers/powerline/default.htm, . COPYRGT. 2002, 2 pages.

"Texas Instruments: System Block Diagrams; Power Line Communication (Generic)", http://focus.ti.com/docs/apps/catalog/resources/blockdiagram.jhtml?bdId=6- 38, COPYRGT. 1995-2002. 1 page.

N. A. Feduschak, "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", CLC SC 105A (Secretariat) May 1992, 62, pp. 1-11.

"Intellon Corporation Test Summary for Transformerless Coupler Study", Intellon No News Wires, Dec. 24, 1998, DOT/NHTSA Order No. DTNH22-98-P-07632, pp. 1-18.

EMETCON Automated Distribution System, ABB Power T & D Company, Inc., Jan. 1990, Raleigh, North Carolina, No. B-919A, 14 pages.

"Dedicated Passive Backbone for Power Line Communications", IBM Technical Disclosure Bulletin, Jul. 1997, 40 (7), pp. 183-185.

"Centralized Commercial Building Applications with the Lonworks .RTM. PLT-21 Power Line Transceiver", Lonworks Engineering Bulletin, Echelon, Apr. 1997, pp. 1-22.

Plexeon Logistics, Inc., "Power Line Communications", www.plexeon.com/power.html, .COPYRGT. 1998-2003, 2 pages.

"EMETCON Automated Distribution System: Communications Guide", Westinghouse ABB Power T & D Company Technical Manual 42-6001A, Sep. 1989, 55 pages.

K.C. Abraham, et al., "A Novel High-Speed PLC Communication Modem", IEEE Transactions on Power Delivery, 1992, 7(4), pp. 1760-1768.

J.M. Barstow, "A Carrier Telephone System for Rural Service", AIEE Transactions, 1947, 66, 301-307.

S.S.L. Chang, "Power-Line Carrier", Fundamentals Handbook of Electrical and Computer Engineering, vol. II-Communication, Control, Devices and Systems, John Wiley & Sons, New York, 1983, pp. 617-627.

Y.F. Chen, et al. "Baseband Transceiever Design of a 128-Kbps Power-Line Modem for Household Applications", IEEE Transactions on Power Delivery, 2002, 17 (2), pp. 338-344.

N.G. Coakley, et al., "Real-Time Control of a Servosystem Using the Inverter-Fed Power Lines to Communicate Sensor Feedback", IEEE Transactions on Industrial Electronics, 1999,46 (2), 360-369.

T. Esmailian, et al., "A Discrete Multitone Power Line Communication System", Department of Electrical and Computer Engineering, University of Toronto, Ontario Canada, 2000 IEEE, pp. 2953-2956.

Kawamura, A. et al., "Autonomous Decentralized Manufacturing System Using High-speed Network with Inductive Transmission of Data and Power", IEEE, 1996, pp. 940-945.

Kilbourne, B. "EEI Electric Perspectives: The Final Connection", www.eei.org/ep/editorial/Jul-01/0701conenct.htm, Jul./Aug. 2001, 7 pages.

W.O. Kim, et al., "A Control Network Architecture Based on EIA-709.1 Protocol for Power Line Data Communications", IEEE Transactions on Consumer Electronics, 2002, 48 (3), pp. 650-655.

C.K. Lim, et al., "Development of a Test Bed for High-Speed Power Line Communications", School of Electrical and Electronic Engineering, Nanyang Technological University, Singapore, IEEE, 2000, pp. 451-456. —.

G. Lokken, et al., "The Proposed Wisconsin Electric Power Company Load Management System Using Power Line Carrier Over Distribution Lines", 1976 National Telecommunications Conference, IEEE, 1976, 2.2-12.2-3.

E. Marthe, et al., "Indoor Radiated Emission Associated with Power Line Communication Systems", Swiss Federal Institute of Technology Power Systems Laboratory IEEE, 2001, pp. 517-520.

Naredo, J.L. et al., "Design of Power Line Carrier Systems on Multitransposed Delta Transmission Lines", IEEE Transactions on Power Delivery, 1991, 6 (3), pp. 952-958.

H. Okazaki, et al., "A Transmitting, and Receiving Method for CDMA Communications Over Indoor Electrical Power Lines", IEEE, 1998, pp. VI-522-VI-528.

B. Don Russell, "Communication Alternatives for Distribution Metering and Load Management", IEEE Transactions on Power Apparatus and Systems, 1980, vol. PAS-99 (4), pp. 1448-1455.

W.N. Sado, et al., "Personal Communication on Residential Power Lines-Assessment of Channel Parameters", Nov. 6-10, 1995, IEEE, pp. 532-537.

Lonworks Engineering Bulletin, "Demand Side Management with Lonworks.RTM. Power Line Transceivers", Dec. 1996, 36 pages.

HomePlug.TM.Powerline Alliance, HomePlug Initial Draft Medium Interface Specification, May 19, 2000, 109 pages.

HomePlug.TM.Powerline Alliance, HomePlug 0.5 Draft Medium Interface Specification, Nov. 28, 2000, 133 pages.

HomePlug.TM.Powerline Alliance, HomePlug Initial Draft Medium Interface Specification, Jul. 27, 2000, 109 pages.

HomePlug.TM.Powerline Alliance, HomePlug 1.01 Specification, Dec. 1, 2001, 139 pages.

Summary of an IEEE Guide for Power-Line Carrier Applications, A Report by the Power System Communications Committee, IEEE Transactions on Power Apparatus and Systems, vol. PAS-99, No. 6, Nov./Dec. 1980, pp. 2334-2337.

Communication Link on the LV Power Supplies for Utility Services: Field Tests in Belgium, Apr. 3-5, 1990, Sixth International Conference on , Manchester, UK. pp. 168-172.

* cited by examiner

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

Figure 7 (Prior-Art)

Figure 8 (Prior-Art)

Figure 9 (Prior-Art)

TELEPHONE SYSTEM HAVING MULTIPLE DISTINCT SOURCES AND ACCESSORIES THEREFOR

CROSS REFERENCE TO RELATED APPLICATION

This is a continuation of U.S. application Ser. No. 10/492,411, which is a U.S. National-Phase Application of PCT/IL2004/000178, filed on Feb. 24, 2004, the disclosure of which is incorporated herein by reference.

BACKGROUND OF THE INVENTION

The present invention relates to the field of telephony systems within a house, used for home, office, enterprise or factory applications, connected to a network.

Telephony, Definitions and Background

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well designed and well-engineered for the transmission and switching of voice signals in the 3-4 KHz portion (or "voice-band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Telco operated Public Switched Telephone Network ("PSTN"), including apparatus for both analog and digital telephony, non-limiting examples of which are analog telephones, digital telephones, facsimile ("fax") machines, automatic telephone answering machines, voice modems, and data modems.

The term "network" herein denotes any system that allows multiple devices to send and receive information of any kind, wherein each device may be uniquely identified for purposes of sending and receiving information. Networks include, but are not limited to, data networks, control networks, cable networks, and telephone networks. A network according to the present invention can be a local area network (LAN) or part of a wide-area network, including the Internet.

Telephone System

FIG. 1 shows a typical telephone system installation in a house. The Figure shows a network 10 for a residence or other building, wired with a telephone line 14, which has a single wire pair that connects to a junction-box (not shown), which in turn connects to a Public Switched Telephone Network (PSTN) 11 via a cable ('local loop') 15a, terminating in a public switch, which establishes and enables telephony from one telephone to another. A plurality of telephones 13a and 13b may connect to telephone lines 14 via a plurality of telephone outlets 12a and 12b. Each outlet has a connector (often referred to as a "jack"), commonly being in the form of RJ-11 connectors in North-America. Each outlet may be connected to a telephone unit via a compatible "plug" connector that inserts into the jack.

Wiring 14 is normally based on a serial or "daisy-chained" topology, wherein the wiring is connected from one outlet to the next in a linear manner; but other topologies such as star, tree, or any arbitrary topology may also be used. Regardless of the topology, however, the telephone wiring system within a residence always uses wired medium: two or four copper wires terminating in one or more outlets which provide direct access to these wires for connecting to telephone sets.

Outlets

The term "outlet" herein denotes an electro-mechanical device that facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall. Non-limiting examples of common outlets include: telephone outlets for connecting telephones and related devices; outlets used as part of 'structured wiring' infrastructure (e.g. for Ethernet based network), telephone outlets for connecting telephone sets to the PSTN, CATV outlets for connecting television sets, VCR's, and the like; and electrical outlets for connecting power to electrical appliances. An outlet as used herein, can also be a device composed of a part that has a fixed connection to the wiring and is mechanically attached to, or mounted in, a wall, and a part that is removably mechanically attached and electrically connected to the first-mentioned part, i.e. a device in which the first part is a jack or connector used for both electrical connection and mechanical attachment. The term "wall" herein denotes any interior or exterior surface of a building, including, but not limited to, ceilings and floors, in addition to vertical walls.

Telephone installation in recently built residential houses and common in offices is shown in FIG. 2, allowing for external multi-telephone lines connection and for various switching functionalities (e.g. intercom). The installation 20 is based on 'star' topology and employing PBX 12, having multiple telephone ports. Telephones 17a, 17b, 17c and 17d are each distinctly connected to a different PBX 12 ports via connections 21a, 21b, 21c and 21d respectively. The PBX 12 also provides three ports for incoming telephone lines 15a, 15b and 15c originated in the PSTN 11.

POTS Multiplexer

Typically each POTS telephone connection requires an independent wire pair. In the case wherein multiple telephone lines are carried between two points, many wire pairs are thus required. In order to allow for carrying multiple telephone services over several copper pairs, a POTS multiplexer system is commonly used (also known as DLC—digital Loop Carrier). Basically, the telephony signals are carried in digitized and multiplexed form over a cable comprising one or two wire pairs. Such a system is shown in FIG. 3, describing POTS multiplexer system 30 based on exchange side mux/demux 33 and customer side mux/demux 34, connected by two wires 32a and 32b. Telephone lines 31a, 31b, 31c and 31d from the PSTN 11 are connected to the exchange side mux/demux 33, wherein the incoming signals are digitized and multiplexed (commonly time multiplexed TDM, such as E1 or T1 systems), and transmitted over the wire pair 32 to the customer side mux/demux 34. The digitized telephony signals are demultiplexed and restored as analog POTS form, and fed to the respective telephone sets 17a, 17b, 17c and 17d via links 35a, 35b, 35c and 35d respectively, connected to the appropriate customer side mux/demux 34. The process is simultaneously applied in the telephone sets to PSTN direction, hence supporting full telephone service. WO 97/19533 to Depue teaches an example of such POTS multiplexer. Commonly, such prior art systems do not provide any switching functionality, and are mainly used for carrying multiple telephone signals from one point to another remote point. As such, cabling 35 is required from each telephone set 17 to the relevant port of customer side unit 34. Similarly, WO 01/28215 to Bullock et al. teaches a POTS multiplexer over power-lines.

WO 01/80595 to the same inventor of this application teaches a system allowing for reduced cabling requirements. The system 40 shown in FIG. 4 is based on 'distributed' customer side mux/demux 34. A PBX/MUX 12 connects to the PSTN 11 for multiple incoming telephone lines 15*a*, 15*b* and 15*c*, similar to the function of the exchange side mux/demux 33 of system 30. However, as a substitute to the single customer side mux/demux 34 multiple mux units 41 are provided. Telephone sets 17*a*, 17*b* and 17*c* are respectively coupled to mux units 41*a*, 41*b* and 41*c*. The mux units 41*a*, 41*b*, 41*c* and PBX/MUX 12 digitally communicate with each other, allowing each telephone set to connect to any of the incoming lines 15 or to another telephone set for intercom function. In such a way, there is no need to route new cable from each telephone set to a central place, but rather to a nearby mux unit 41.

Voice Over Internet Protocol (VoIP)

Recently, a solution for combining both telephony and data communications into a single network is offered by the Voice-over-Internet-Protocol (VoIP) approach. In this technique, telephone signals are digitized and carried as data across the LAN. Such systems are known in the art, and an example of such a system 50 is shown in FIG. 5. The system 50 is based on a Local Area Network (LAN) 53 environment, commonly using Ethernet IEEE802.3 standard interfaces and structure. The LAN can be used to interconnect computers (not shown) as well as other end-units, as well as IP telephone sets 54*a*, 54*b* and 54*c* shown. An example of IP telephone set 54 is Voice Service IP-Phone model DPH-100M/H from D-Link Systems, Inc. of Irvine, Calif., USA. IP-PBX unit 52 is also connected to the LAN and manages the voice data routing in the system. Many routing protocols are available, such as IETF RFC 3261SIP (Session Initiation Protocol), ITU-T H.323 and IETF RFC 2705 MGCP (Media Gateway Control Protocol). Examples of such a SIP based IP-PBX 52 is ICP (integrated Communication Platform) Model 3050 from Mitel Networks of Ottawa, Ontario Canada. Connection to the PSTN 11 is made via VoIP Gateway 55*a*, operative to convert an incoming analog POTS telephone signal to a digital and IP packet based protocol used over the LAN. An example of such VoIP Gateway 55 supporting four PSTN lines is MediaPack™ Series MP-104/FXO of AudioCodes Ltd. In Yehud, Israel. Such a system 50 allows for full telephone connectivity similar to performance of POTS PBX-based system (such as in FIG. 2). In most cases, such a network allows also for data networking (non-voice traffic), such as computers and peripherals, and connection to the Internet.

A VoIP MTA (Multimedia Terminal Adapter) is also known in the art, operative to convert IP protocol carrying telephony signals into POTS telephone set interface. Examples of such a VoIP MTA supporting four POTS telephone sets are MediaPack™ Series MP-104/FXS of Audio-Codes Ltd. In Yehud, Israel and two-ports Voice Service Gateway model DVG-1120 from D-Link® Systems, Inc. of Irvine, Calif., USA. A system 60 shown in FIG. 6 demonstrates the use of such VoIP MTAs 64. The system 60 is identical to system 50, except for replacing the IP phones 54*b* and 54*c* with POTS telephone sets 17*a* and 17*b*. In order to enable the usage of these telephone sets 17*a* and 17*b*, respective VoIP MTAs 64*a* and 64*b* are added as the mediation devices between the analog telephony and the IP telephony.

The addition of MTAs 64 allows for the same basic system functionality, although POTS telephones 17 are used rather than IP telephones 54. The combination of telephone set 17 connected to VoIP MTA 64 allows connection to an IP network, in the same manner that the IP telephone 54 is connected thereto, and providing similar functionality. EP 0824298 to Harper teaches an example a network conforming to such a system.

An example of the system 60 based on IP/Ethernet (IEEE802.3) LAN as internal network 53 is shown in FIG. 7 as system 70. The LAN comprises a switch 71 as a multi-port concentrating device in a 'star' topology wiring structure. It is understood that any type of device having multiple network interfaces and supporting a suitable connectivity can be used, non-limiting examples of which include a shared hub, switch (switched hub), router, and gateway. Hence, the term "switch" used herein denotes any such device. An example of the switch 71 is DSS-8+Dual-Speed 8-Port Desktop Switch from D-Link Systems, Inc. of Irvine, Calif., USA, having 8 ports. The network 70 comprises a dedicated cabling 73, such as Category 5 'Structured Wiring'. Such a network commonly uses 10BaseT or 100BaseTX Ethernet IEEE802.3 interfaces and topology. In such a network, outlets 72*a*, 72*b* and 72*c* are connected to the switch 71 via respective cables 73*a*, 73*b* and 73*c*. POTS Telephone sets 17*a* and 17*b* are connected via respective VoIP MTAs 64*a* and 64*b* to the respective outlets 72*a* and 72*b*, using connections 74*a* and 74*b* respectively. IP Telephone 54*a* connects directly (without VoIP MTA) via a connection 74*c* to the outlet 72*c*, which connects to a port in the switch 71 via cable 73*c*. The internal network connects to PSTN 11 via VoIP gateway 55*a* connected to another port of the switch 71, and IP-PBX 52 connects to another port of switch 71. Such a network allows for the telephones 17*a*, 17*b* and 54*a* to interconnect and also to connect to the external PSTN 11.

Home Networks

Implementing a network 70 in existing buildings typically requires installation of new wiring infrastructure 73. Such installation of new wiring may be impractical, expensive and hassle-oriented. As a result, many technologies (referred to as "no new wires" technologies) have been proposed in order to facilitate a LAN in a building without adding new wiring. Some of these techniques use existing wiring used also for other purposes such as telephone, electricity, cable television, and so forth. Doing so offers the advantage of being able to install such systems and networks without the additional and often substantial cost of installing separate wiring within the building. In order to facilitate multiple use of wiring within a building, specialized outlets are sometimes installed, which allow access to the wiring for multiple purposes. An example of home networking over coaxial cables using outlets is described in WO 02/065229 published 22 Aug. 2002 entitled: 'Cableran Networking over Coaxial Cables' to Cohen et al.

Other 'no new wire' technologies employ non-wired media. Some use Infrared as the communication medium, while others use radio frequency communication, such as IEEE802.11 and BlueTooth.

An example of a network 60 in a house based on using powerline-based home network implementing network 53 is shown as network 80 in FIG. 8. The medium for networking is the in-house power lines 81, which are used for carrying both the mains power and the data communication signals. For the sake of simplicity, the power related functions are not shown in the Figure. A PLC modem 82 converts data communication interface (such as Ethernet IEEE802.3) to a signal which can be carried over the power lines, without affecting and being affected by the power signal available over those wires. An example of such PLC modem 82 is HomePlug1.0 based Ethernet-to-Powerline Bridge model DHP-100 from D-Link Systems, Inc. of Irvine, Calif., USA. D-Link is a registered trademark of D-Link Systems, Inc. PLCs 82*a*, 82*b*, 82*c*, 82*d* and 82*e* are all connected to the powerline 81 via the respective power outlets 88*a*, 88*b*, 88*c*, 88*d* and 88*e*, forming a local area network over the powerline allowing for data networking for the units connected thereto. The connection is commonly effected by a cord connected to a power outlet being part of the power line medium 81. Such a network 80 allows for the IP-PBX 52, PSTN 11 via VoIP gateway 55*a*, telephones 17*a* and 17*b* via the respective VoIP MTAs 64*a* and 64*b* and IP telephone 54*a* to communicate with each other, as well as to share external connection to the PSTN 11, as was offered by network 70. However, no additional and dedicated wiring is required.

Another home network medium may be the telephone wiring. It is often desirable to use existing telephone wiring simultaneously for both telephony and data networking. In this way, establishing a new local area network in a home or other building is simplified, because there is no need to install additional wiring.

The PLC modem 82 uses the well-known technique of frequency domain/division multiplexing (FDM), and provides means for splitting the bandwidth carried by a wire into a low-frequency band capable of carrying an analog telephony signal and a high-frequency band capable of carrying data communication or other signals. Examples of relevant prior-art in this field are the technology commonly known as HomePNA (Home Phoneline Networking Alliance), WO 99/12330 to Foley and as disclosed in U.S. Pat. No. 5,896,443 to Dichter (hereinafter referred to as "Dichter"). Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal and the ADSL signals, and a high-frequency band capable of carrying home network communication signals. In such a mechanism, telephony and ADSL are not affected, while a home networking communication capability is provided over existing telephone wiring within a house.

WO 01/71980 published Sep. 27, 2001 entitled "Telephone Outlet and System for a Local Area Network Over Telephone Lines" and WO 03/005691 published Jan. 16, 2003 entitled "Telephone outlet with packet telephony adapter, and a network using same" both in the name the present inventor and assigned to the present assignee, and which are incorporated by reference for all purposes as if fully set forth herein, describe home networking over telephone wiring, based on outlets, which allows for conducting of digital telephony data as well as POTS and ADSL signals over in-house telephone wiring. Similarly, U.S. Pat. No. 6,130,893 to Whittaker et al. teaches an IP-based telephony network based on telephone wiring.

Many of the above figures and networks involve external connection to the PSTN to provide telephony services over telephone-dedicated wiring and owned by a telephone company. However, there are today multiple technologies for connecting premises to external telephone services, both terrestrial and via the air:

1. Cable television cabling, mostly coaxial cable based, used for delivering video channels, as well as broadband data and telephony to the house.

2. Satellite communication.

3. Power lines communication, wherein the power lines carrying power to the house are also used for data communication.

4. Wireless communications using radio frequency such as cellular, LMDS and many other wireless technologies.

5. Fiber, such as Fiber-To-The-Home (FTTH) or other similar technologies.

The availability of plural telephone service providers, each using a different access medium, allows for a house dweller, for example, to have multiple telephone lines from different providers. For example, a telephone line may be available from the CATV provider, added to the traditional telco oriented telephone line.

Common to all above prior art systems, the incoming telephone lines into the house are connected to a single unit: PBX 12 of system 20 in FIG. 2, exchange side mux/demux 33 of system 30 in FIG. 3, PBX/MUX 12 of system 40 in FIG. 4 and VoIP gateway 55*a* of systems 50 and 60 in FIGS. 5 and 6, respectively. However, the additional telephone line, for example from the CATV provider, may be available in a distinctly different place. An example of system 20 modified to support both telco (PSTN) and CATV originated telephone lines is shown as system 90 in FIG. 9. In addition to connections to the PSTN 11, an incoming telephone line from CATV network 91 via VoIP gateway 55*b* is shown. Typically the VoIP gateway is integrated into a cable-modem or set-top-box, and connects to the CATV network 91 via a CATV outlet, connecting to the coaxial cable wiring installation. Since in most cases the VoIP gateway 55*b* is not located near the PBX 12, there is a need to install new cable 92 from the VoIP gateway 55*b* to a port in the PBX 12. Such installation is expensive, time consuming and not aesthetic.

There is thus a widely recognized need for, and it would be highly advantageous to have, a method and system for allowing easy and minimum cabling structure for sharing the telephony service from multiple sources or being fed at distinct locations. This goal is met by the present invention.

BRIEF SUMMARY OF THE INVENTION

The invention discloses a data communication network carrying digitized telephone signals, such as VoIP based network. Digital telephones (such as IP telephones in VoIP environment) can be coupled to the network, as well as POTS telephone sets via respective adapters (e.g. VoIP MTA). The network is coupled to multiple telephone services, each connected to a distinct point in the network. For example, in case of wired network, the services may be coupled to different places of the wiring medium. Similarly, the services can be coupled to different devices in the network. The telephone service signal is either of digital type and thus directly connected to the data network, or of POTS analog type, requiring respective adapter (e.g. VoIP gateway). A routing means (e.g. IP-PBX) provides the required routing of the digitized telephone signal between all telephone related equipment connected to the network: telephone sets and telephone services.

The data network may use either dedicated wiring (such as in Ethernet 'structured wiring' systems) or wiring used for other services, such as telephone, CATV or power carrying pair. The network comprises modems for communicating over the wiring medium. The access to the network wiring may use outlets. The telephone services may use different media such as PSTN, CATV, wireless or cellular telephone networks.

The invention further describes an apparatus for coupling a telephone service to the data network. Such apparatus comprises a modem for data communication over the network medium. In the case of coupling to analog based telephone service, the apparatus may also comprise a VoIP gateway for converting the analog telephone service signal to digital. The apparatus may also comprise a multi port connectivity device allowing for data unit (or digital telephone) to access the network by sharing the same modem. The apparatus may further comprise an adapter for connecting POTS telephone set to the network via the apparatus. In another embodiment the apparatus comprises a routing means. In the case wherein the network medium also carries another service (such as POTS telephony, CATV or power), the apparatus may comprise a service dedicated means to separate the service signal from the data communication signal, and to provide access (e.g. via the standard service connector) to the service.

The apparatus may be integrated into an outlet. The outlet may be telephone outlet, CATV outlet or power outlet relating to using the respective telephone, CATV and power wiring as the network medium.

The telephone service may be a mobile telephone service, such as wireless or cellular telephone network. In such a case, an associated adapter is required to access the telephone service. In one embodiment, a mobile or cellular telephone set is used to communicate with the respective mobile or cellular telephone network. The mobile (or cellular) telephone set can be a detachable device, allowing the user the option to use it as a mobile unit or as access to the disclosed system.

BRIEF DESCRIPTION OF THE DRAWINGS

The invention is herein described, by way of non-limiting example only, with reference to the accompanying drawings, wherein.

DETAILED DESCRIPTION OF THE INVENTION

Figure 1:
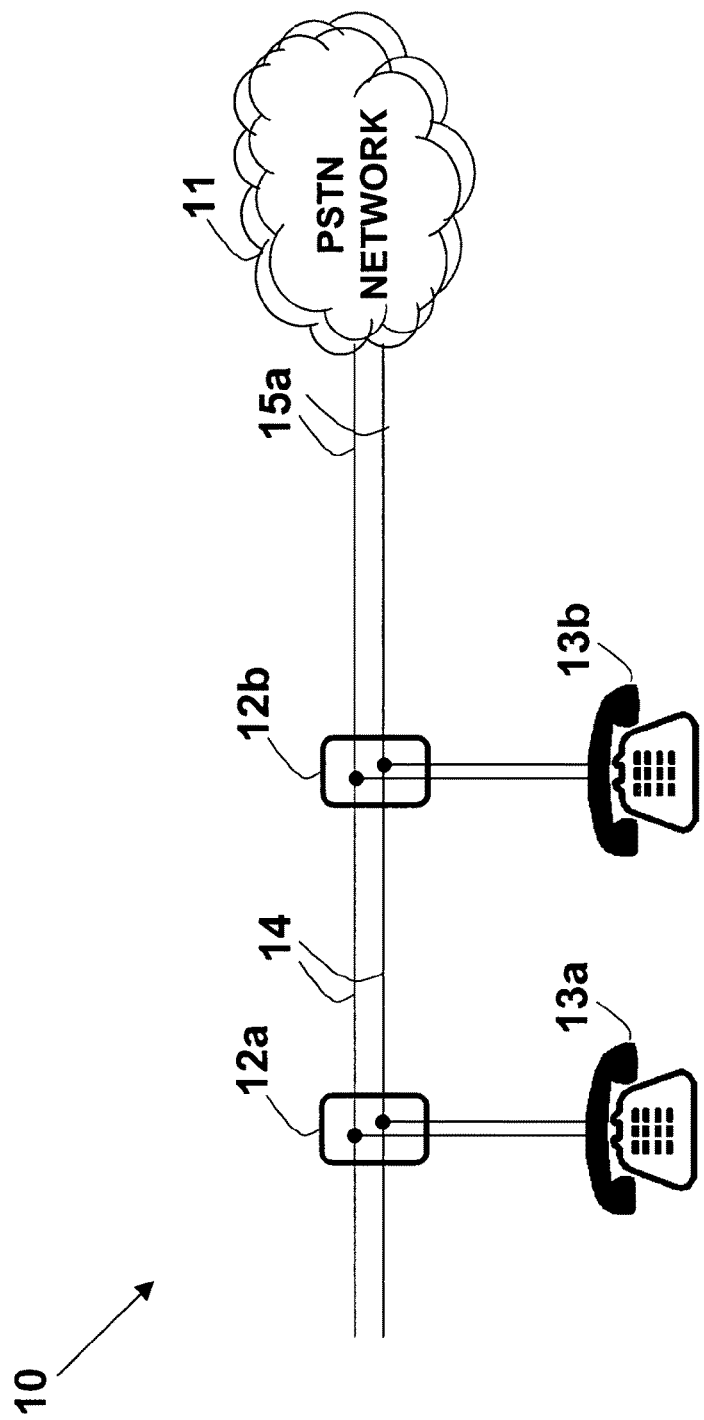
FIG. 1 shows a prior art in-house telephone installation having daisy-chain topology.
Figure 2:
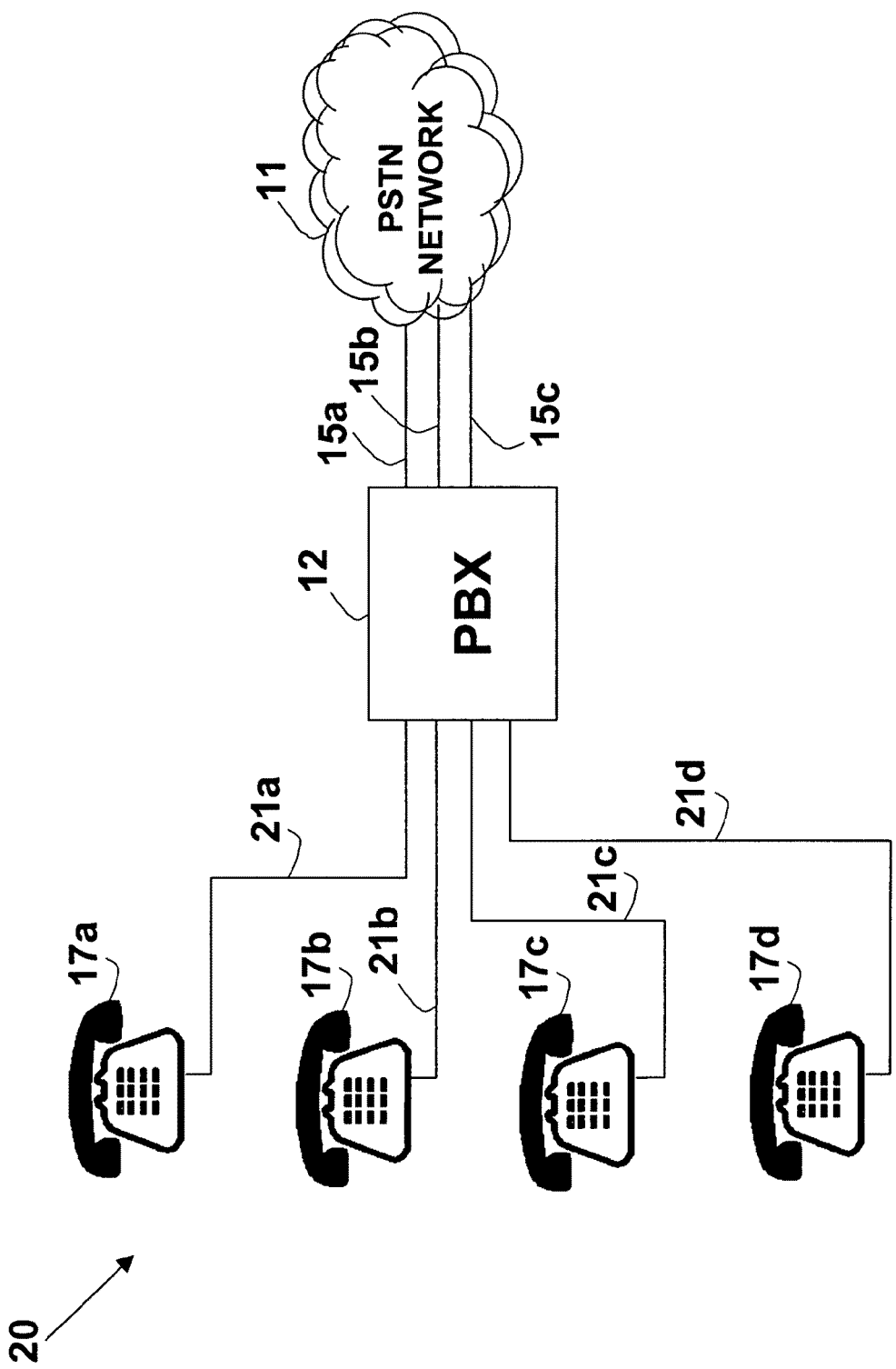
FIG. 2 shows a prior art in-house PBX-based telephone installation.
Figure 3:
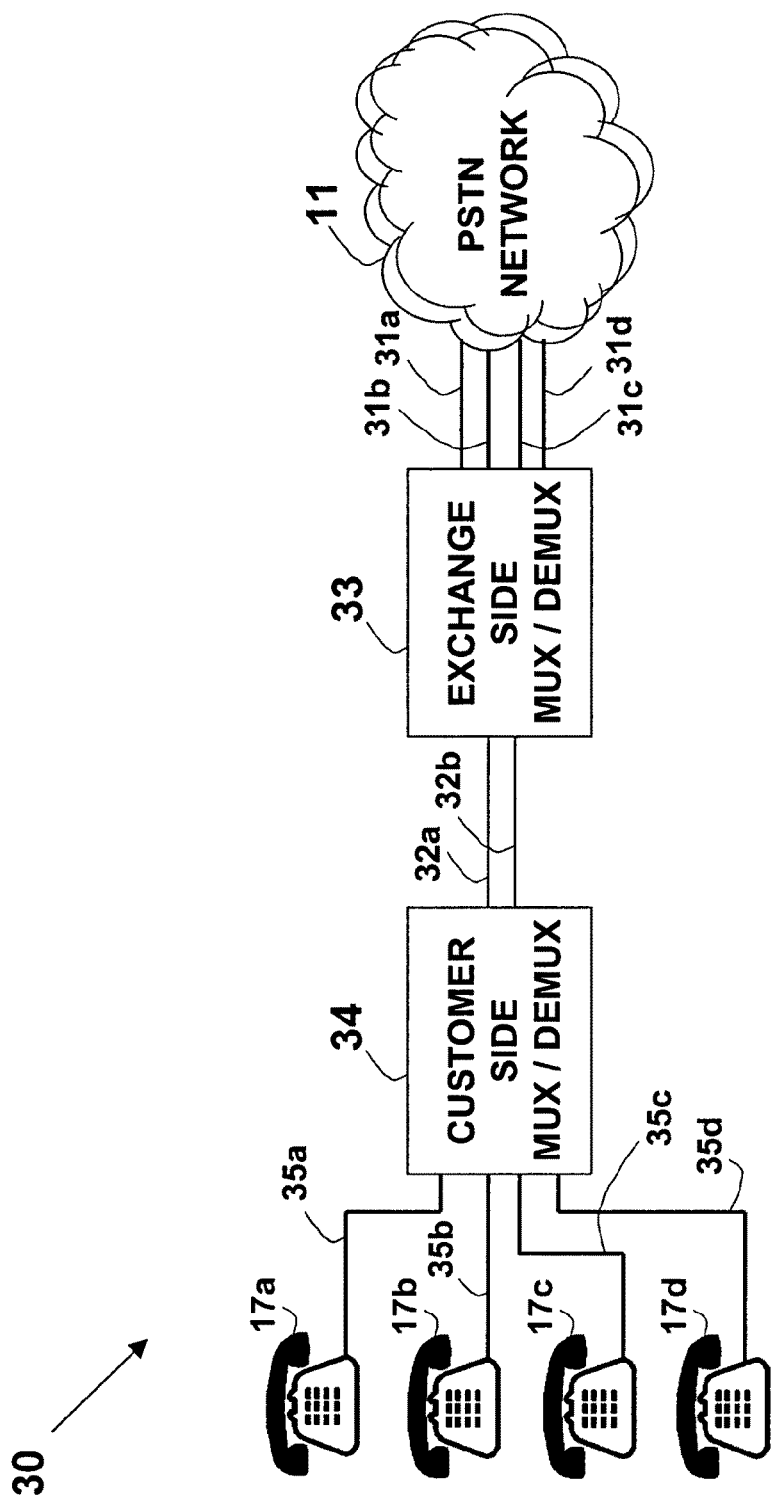
FIG. 3 shows a prior art POTS multiplexer (DLC) system.
Figure 4:
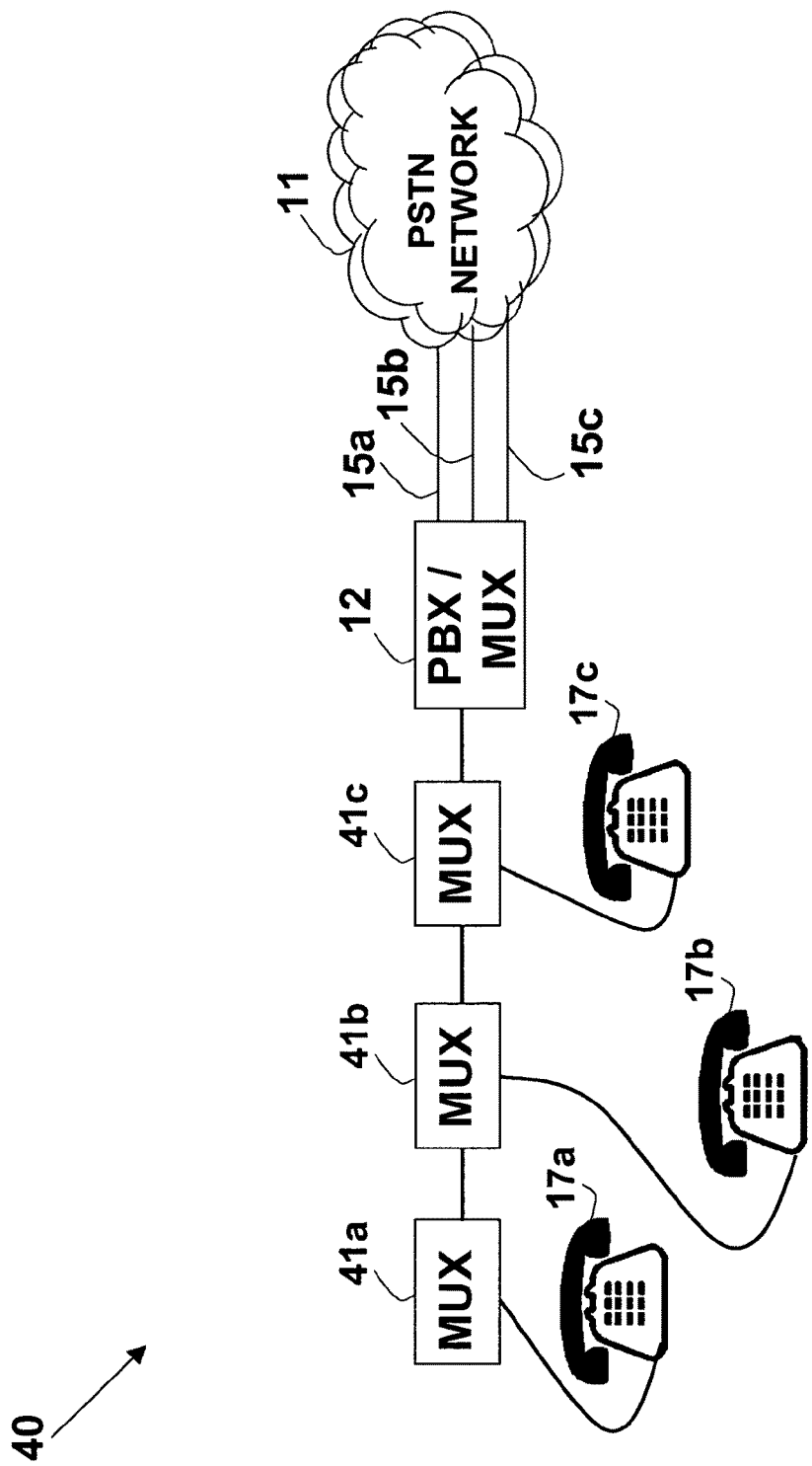
FIG. 4 shows a prior art telephone system allowing for distributing multiple telephone lines to multiple telephone sets using minimum cables.
Figure 5:
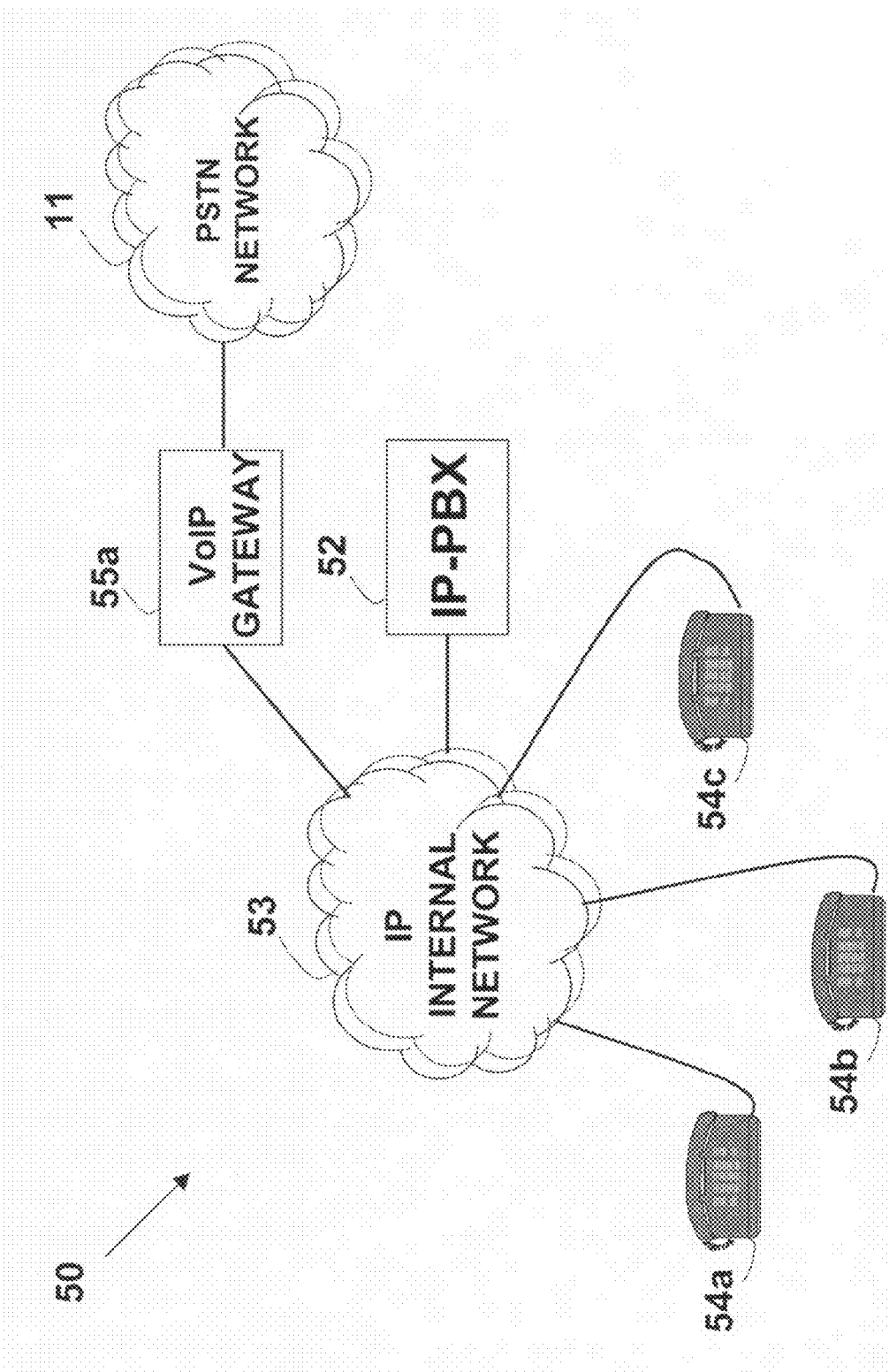
FIG. 5 shows a general prior-art VoIP network connected to a PSTN.
Figure 6:
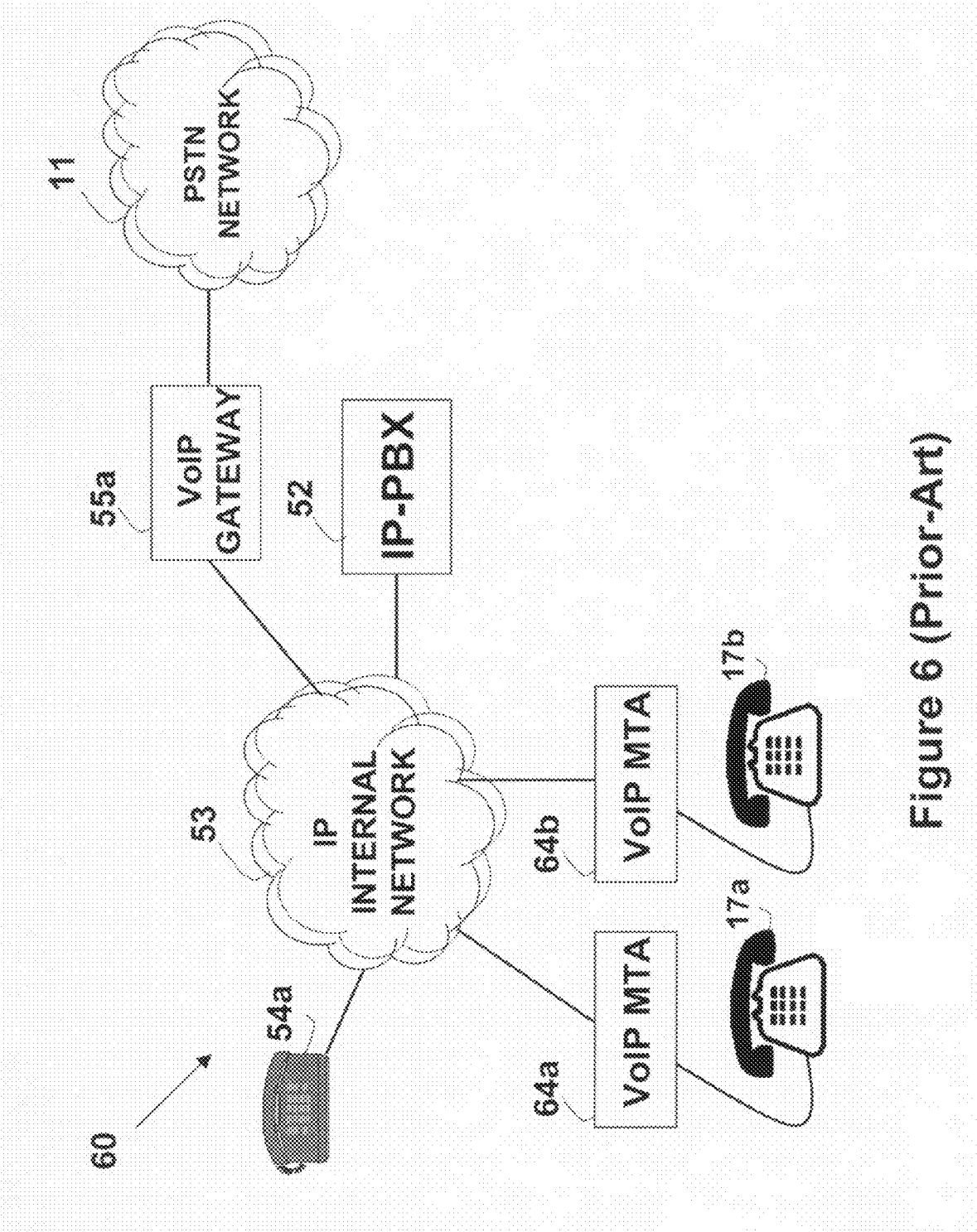
FIG. 6 shows a general prior-art VoIP network connected to a PSTN and using POTS telephone sets.
Figure 7:
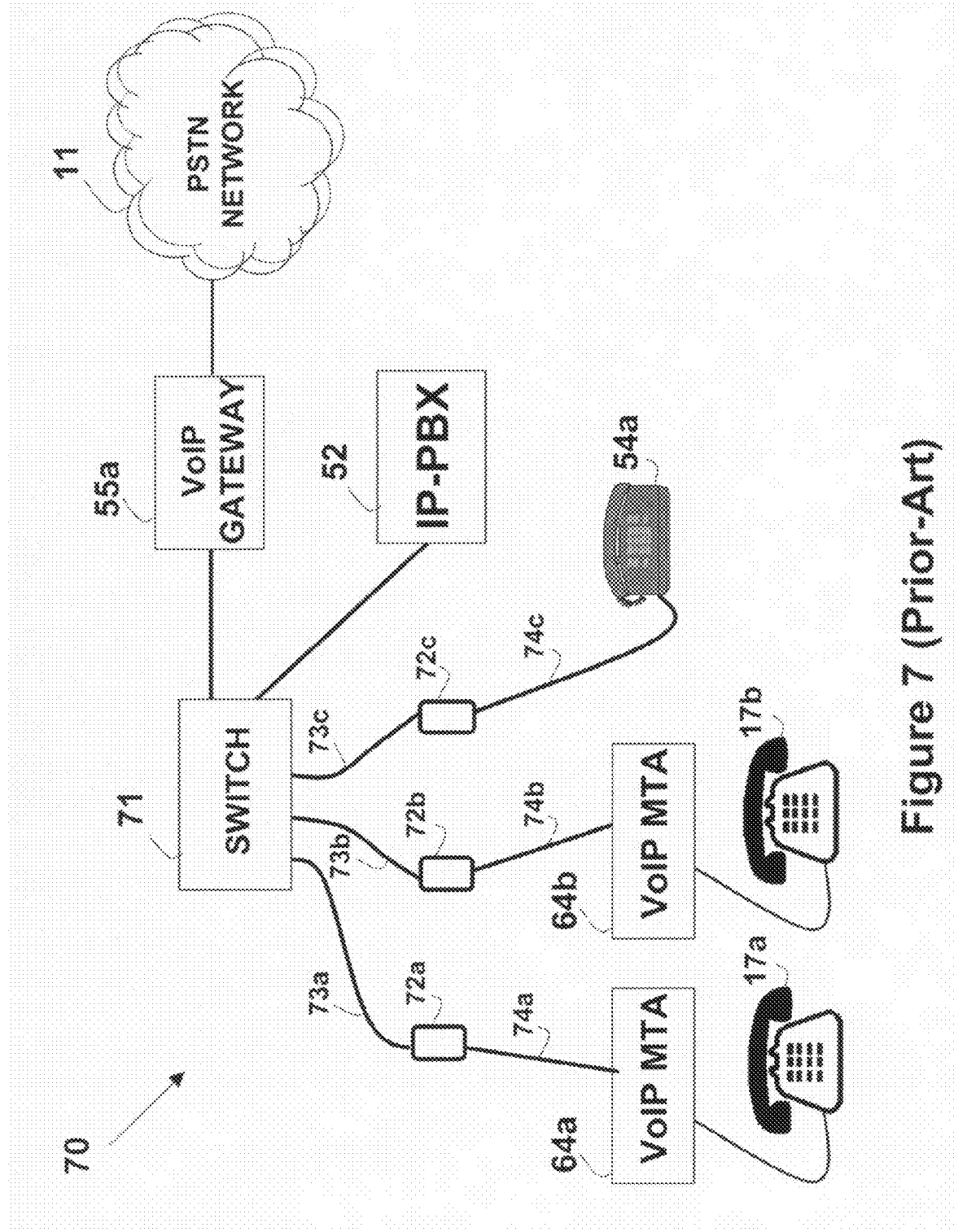
FIG. 7 shows a general prior-art structure-wiring Ethernet based VoIP network connected to a PSTN and using POTS telephone sets.
Figure 8:
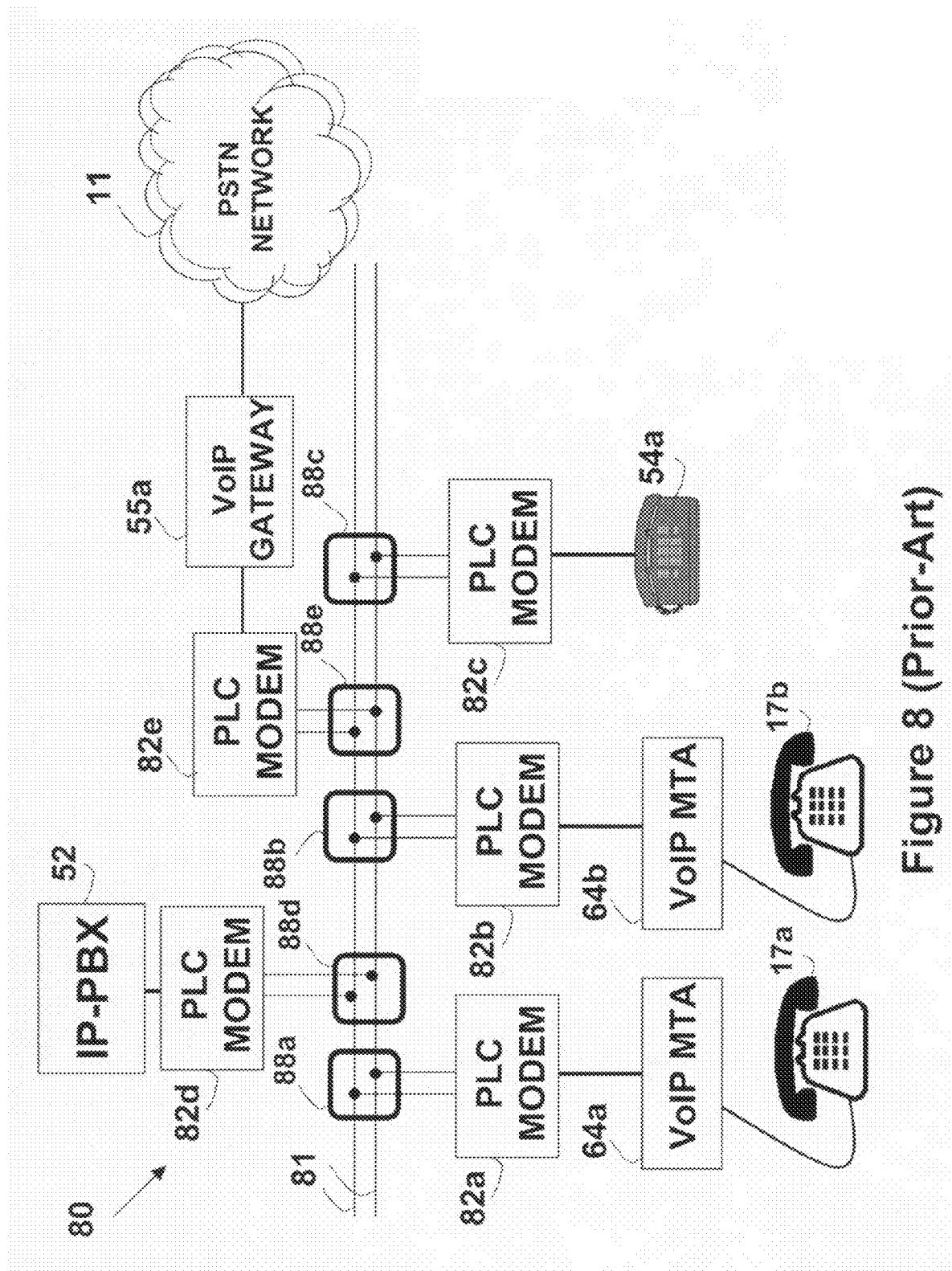
FIG. 8 shows a prior-art power lines based VoIP network connected to a PSTN and using POTS telephone sets.
Figure 9:
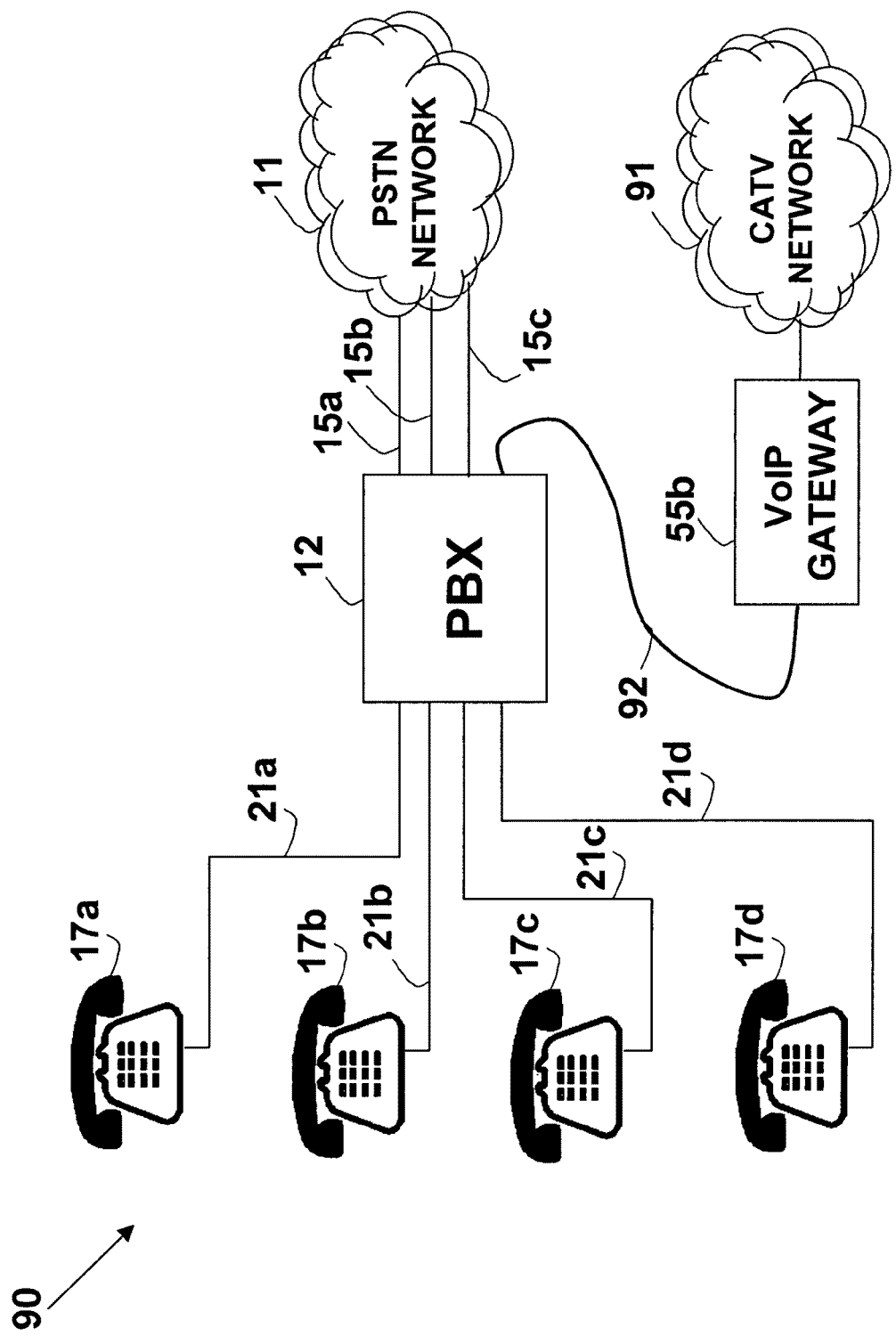
FIG. 9 shows a prior art in-house PBX-based telephone installation connected to both PSTN and CATV network.

The principles and operation of a network and system according to the present invention may be understood with reference to the drawings and the accompanying description. Many of the systems that are described below are based on the networks described above with reference to FIGS. 1 to 9 of the drawings, which in some cases show systems comprising more than one interconnected network. In the following description the term "system" is used to denote a composite network based on the interconnection of more than one network. In such a system, the component networks can themselves be composite networks. To this extent, the terms "network" and "system" are used interchangeably. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 10:
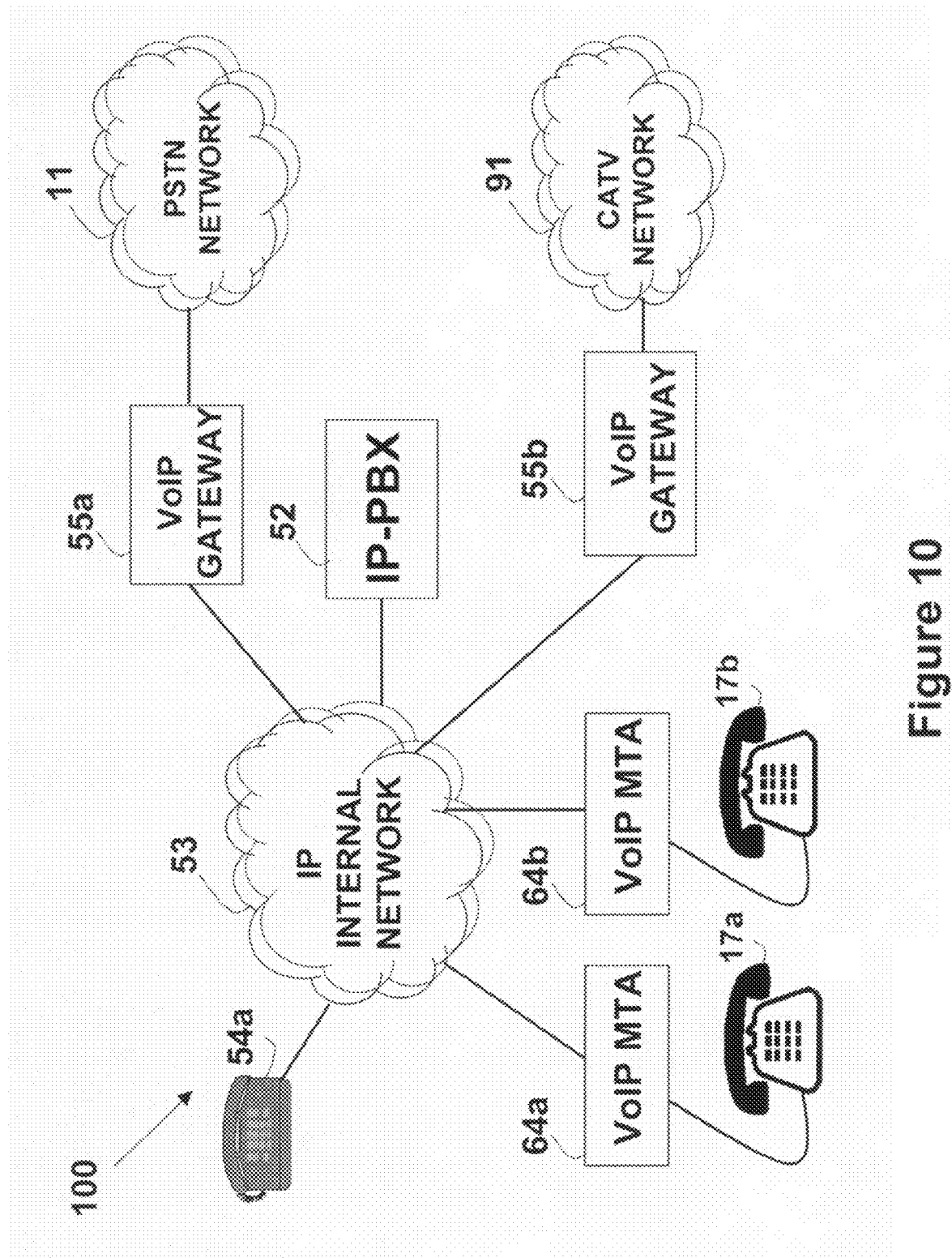
FIG. 10 shows a general VoIP network according to the present invention connected to PSTN and CATV networks.

The principle of the invention is shown as system 100 in FIG. 10. System 100 shown is based on the network 60 in FIG. 6. The network 60 is modified to include an additional incoming telephone line from a CATV network 91 via a VoIP gateway 55b. It should be noted that the incoming telephone line from the VoIP gateway 55a and the data signal representing the incoming telephone line from the VoIP gateway 55b are connected to the network at distinct and different points, and each of the above-mentioned incoming telephone lines connects to a distinct and different device in the network. The telephone associated packets in the network are routed and managed by the IP-PBX 52 to allow full voice connectivity, allowing for incoming telephone calls from the PSTN 11 and CATV network 91 to be routed to any of the telephone sets 17*a*, 17*b* and 54*a* as required, as well as forwarding outgoing calls from the telephone sets to the two external networks as required.

Figure 11:
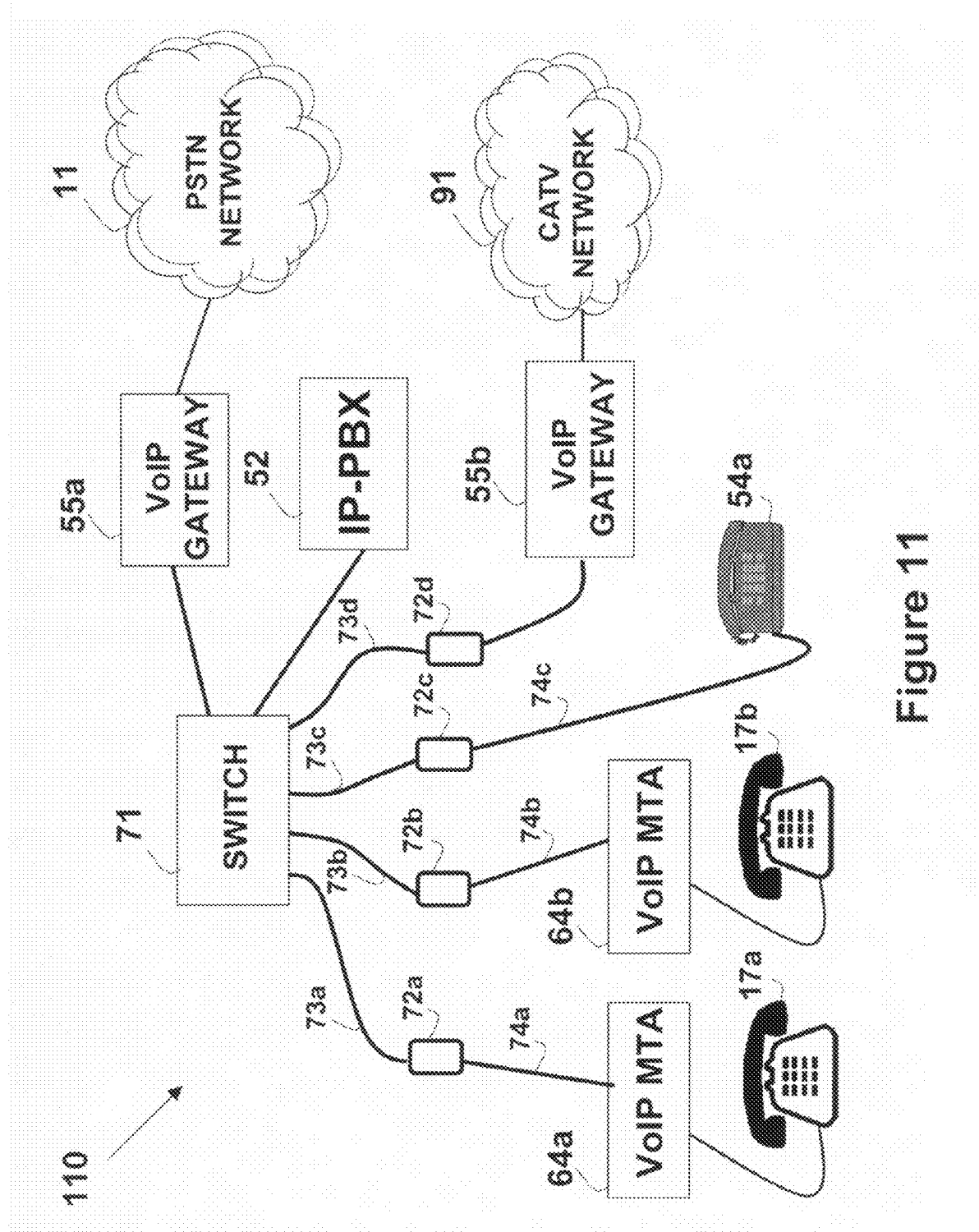
FIG. 11 shows a structure-wiring Ethernet based VoIP network according to the present invention.

A system according to a first embodiment of the invention is shown in FIG. 11. The system 110 is basically similar to the prior-art network 70. However, CATV network 91 is added providing an additional telephone line, whose signal is converted to a digital form by a VoIP gateway 55*b*. The VoIP gateway 55*b* connects to the network by outlet 72*d*, which in turn connects to the switch 71 via cable 73*d*. The IP-PBX 52 serves as a router for routing telephone calls between the PSTN 11, CATV network 91, IP Telephone 54*a* and POTS sets 17*a* and 17*b*. It should be noted that CATV network 91, via its respective VoIP gateway 55*b*, connects additional external telephone lines to the network 110, and connects to the network via outlet 72*d*, being a distinct and different point of connection from the PSTN 11. Furthermore, each of the above external networks: PSTN 11 and CATV network 91 each is connected to a distinct respective VoIP gateway device 55*a* or 55*b*.

As can be demonstrated in FIG. 11, while the PSTN 11 is coupled to switch 71 via VoIP gateway 55*a*, the CATV network 91 is coupled to the network wiring 73*d* via outlet 72*d*, being distinct and different point of the network medium. Furthermore, while PSTN 11 connects to VoIP gateway 55*a*, the CATV network 91 connects to VoIP Gateway 55*b*, which may be a distinct and different device.

Figure 12:
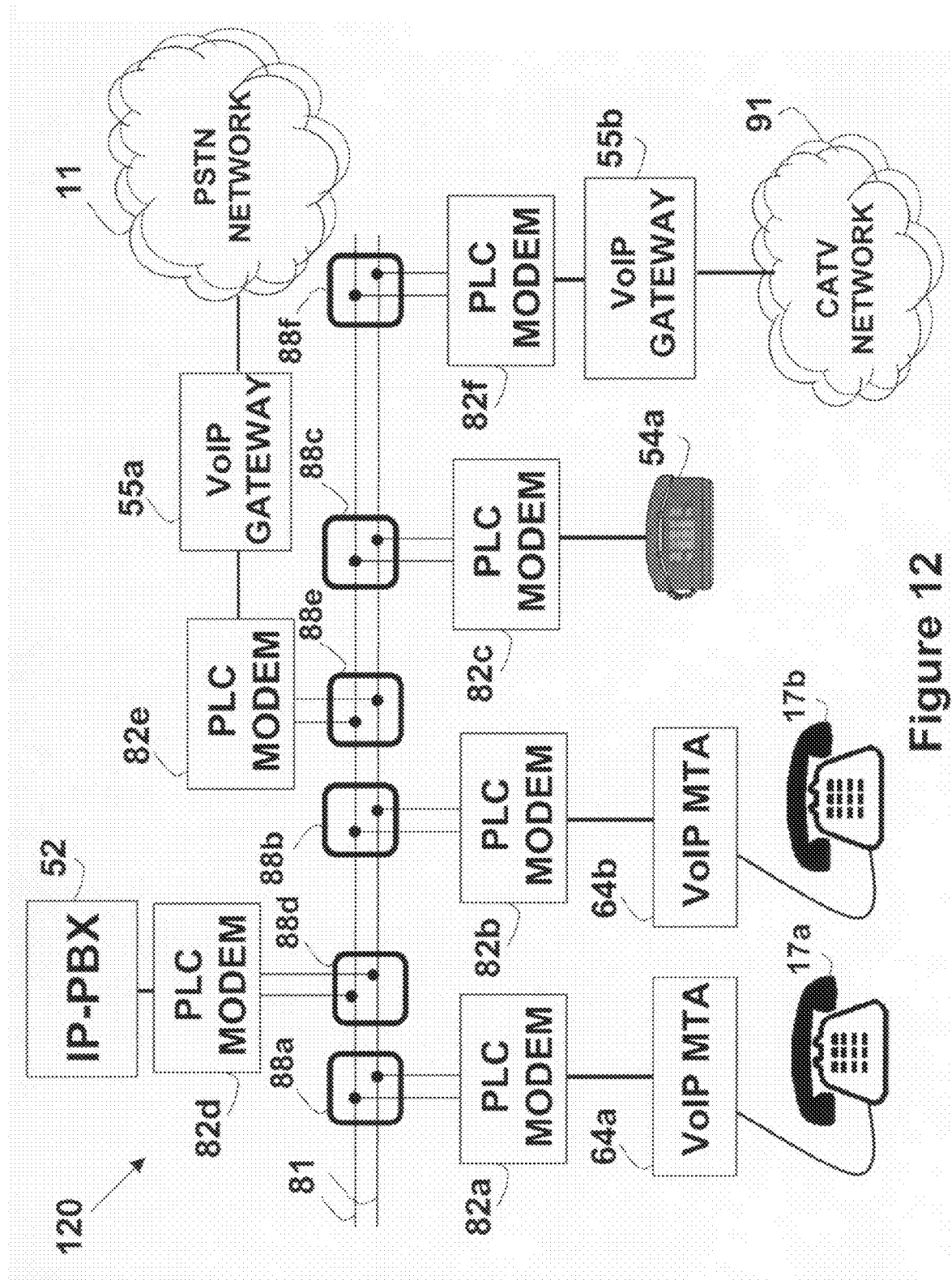
FIG. 12 shows a power lines based VoIP network according to the present invention.

While system 110 is based on dedicated wiring as the networking medium, the invention can be equally applied to home networking using existing in-house wiring. Such a network 120 is shown in FIG. 12 and is based on the powerline-based network 80 of FIG. 8. While network 80 connects solely to the external PSTN 11, system 120 allows for the addition of the CATV network 91 as a source for an external telephone line. VoIP Gateway 55*b* converts the telephone signal carried by the CATV network 91 to digital IP based signal, which in turn connects to the powerline medium 81 via PLC modem 82*f*. In this case, the IP network 53 of system 100 is implemented by the powerline medium 81 together with the multiple PLC modems 82 connected thereto.

As can be seen in FIG. 12, while the PSTN 11 is coupled to the network medium 81 outlet 88*e* via PLC modem 82*e* and VoIP gateway 55*a*, the CATV network 91 is coupled to the network wiring 81 via outlet 88*f*, constituting a distinct and different point of the network medium. Furthermore, while PSTN 11 connects to VoIP gateway 55*a*, the CATV network 91 connects to VoIP Gateway 55*b* and PLC modem 82*f*, which may be distinct and different devices.

Figure 13:
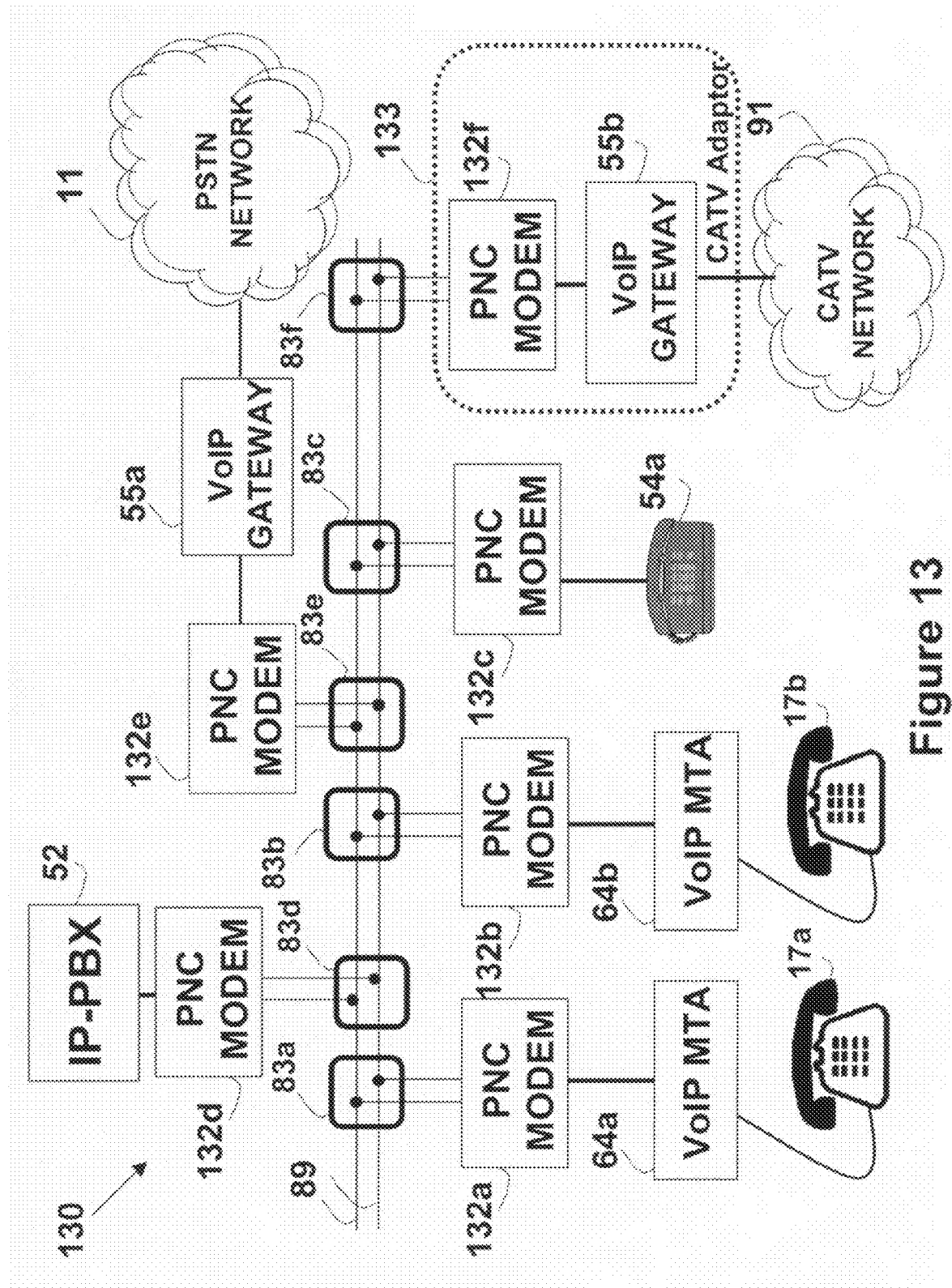
FIG. 13 shows a phone lines based VoIP network according to the present invention.

An additional embodiment of the invention over an in-house wiring IP network is shown as system 130 in FIG. 13. While the system 130 shown is similar in its configuration to system 120, system 130 uses telephone wiring 89 (rather than powerlines 81) as the communication medium. In order to allow such networking all PLC modems 82 of system 120 are substituted with PNC (PhoNe wiring Communication) modems 132. Examples of PNC 132 are model TH102-A 10+ Mbps Home Phoneline to Ethernet Converter from Compex Inc, of Anaheim, Calif. USA and based on HomePNA2.0 and Model HG-101B Ethernet to 1 Mbps HomePNA Converter from Netronix Inc. of HsinChu, Taiwan. Such modems are known in the art to carry data communication signals over the telephone line without interfering with the POTS telephone signal carried over the same wires using the lower spectrum. The telephone wiring 89 can be configured in three distinct options:

Not carrying any POTS signals. In this configuration, the telephone wiring used for the data networking is not used for carrying any analog POTS signal. This can be the case wherein multiple pairs are available, and one is selected solely for the data communication purpose.

Figure 14:
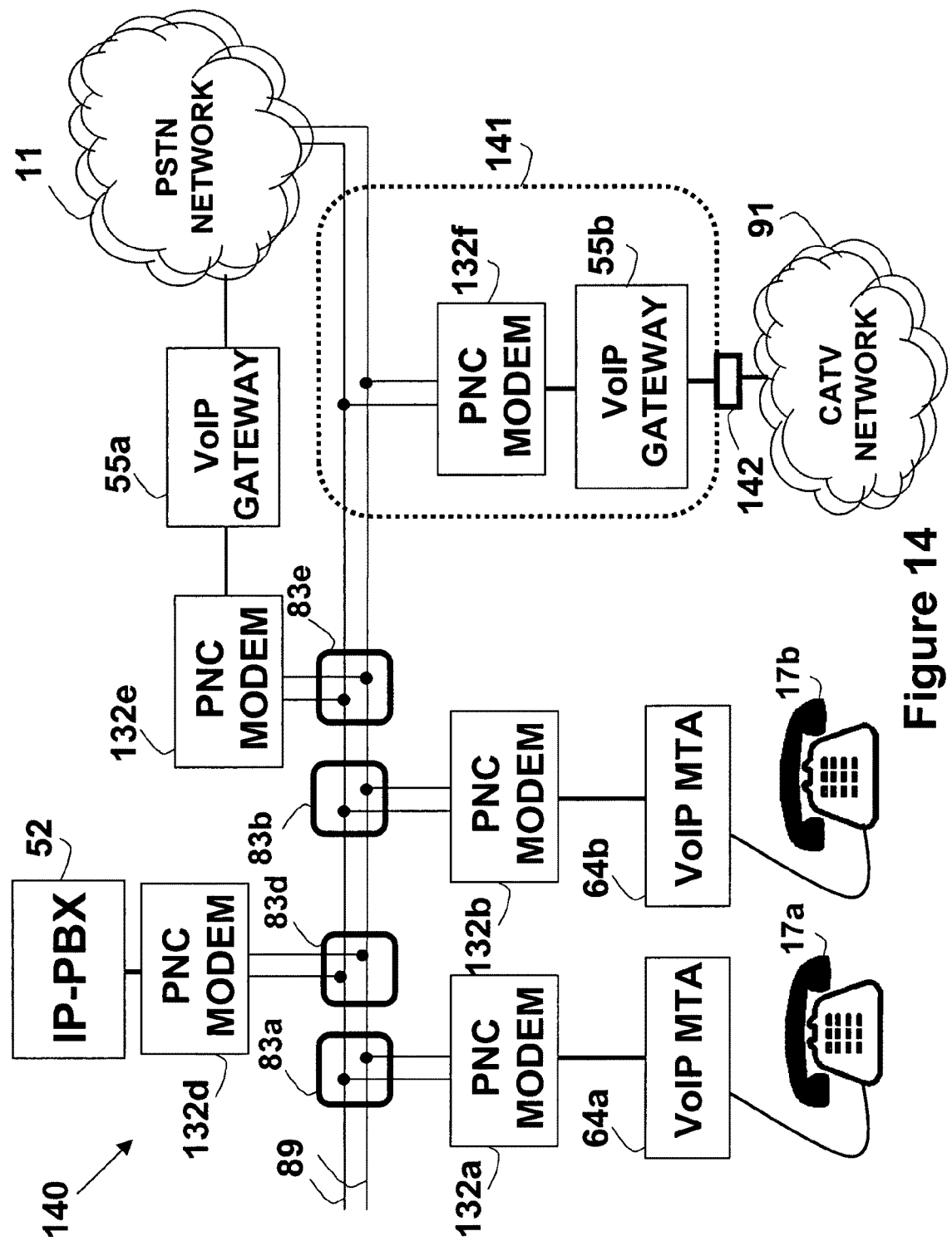
FIG. 14 shows an outlet and phone lines based VoIP network according to the present invention.

Carrying PSTN originated POTS signal. In this installation, the telephone pair 89 is used to also carry PSTN 11 originated POTS telephony signal as shown in FIG. 14. The same telephone line can also be connected to the VoIP gateway 55*a* to be carried in a digital form within the network. This configuration can support 'life-line' functionality, wherein the basic telephone service is required to exist even in the case of power outage.

Figure 15:
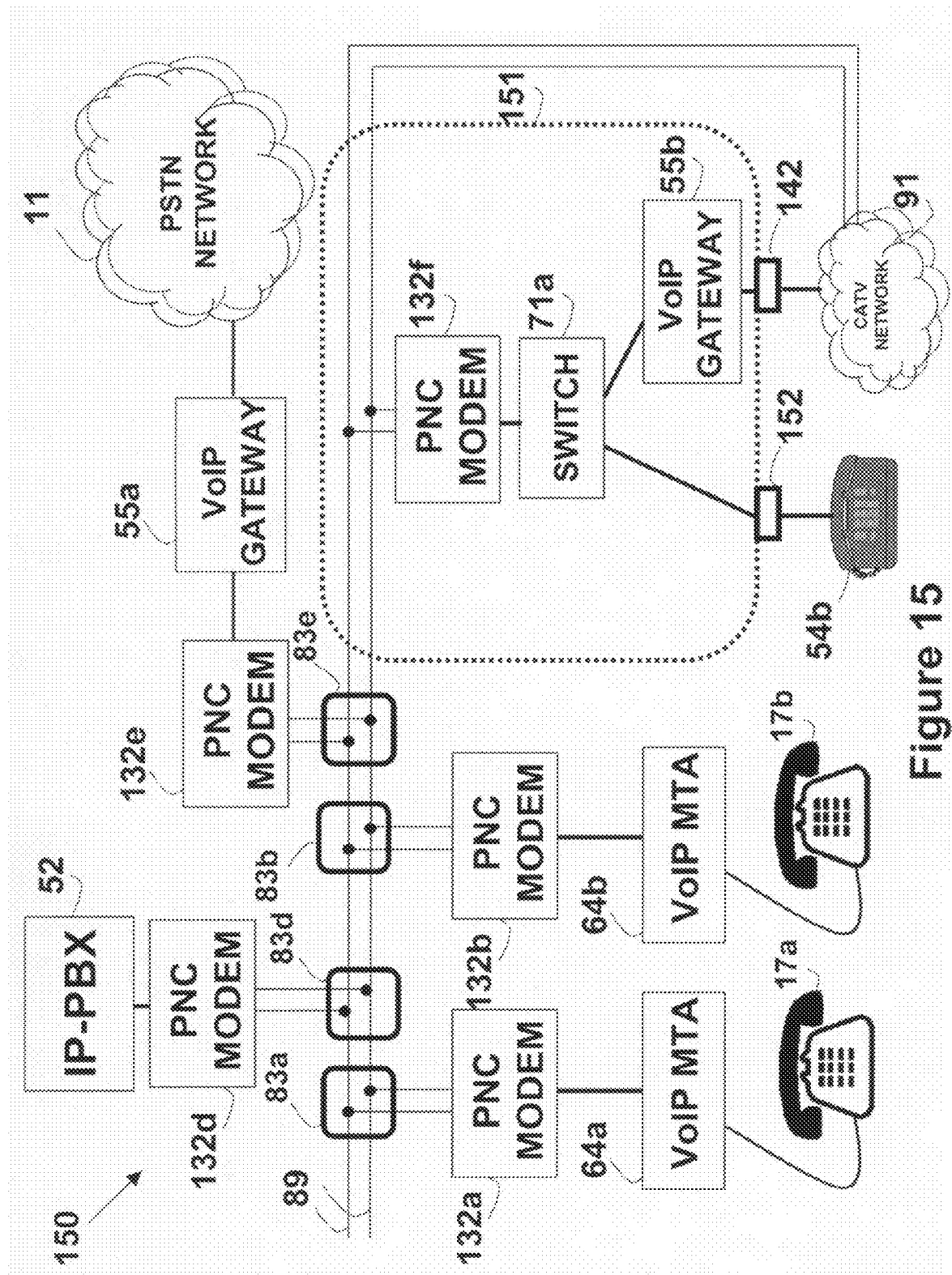
FIG. 15 shows an outlet and phone lines based VoIP network according to the present invention, wherein the outlet further allows for IP telephone connection.

Carrying non-PSTN originated POTS signal. Similar to (b), POTS signal is also carried over the telephone pair 89. However, such telephone service is originated from a source other than the PSTN 11. Any POTS telephone line can use the pair 89, and in particular the POTS line originated by CATV network 91, as shown in FIG. 15.

As can be seen in FIG. 13, while the PSTN 11 is coupled to the network medium 89 outlet 83*e* via PNC modem 132*e* and VoIP gateway 55*a*, the CATV network 91 is coupled to the network wiring 89 via outlet 83*f*, being a distinct and different point of the network medium. Furthermore, while PSTN 11 connects to VoIP gateway 55*a*, the CATV network 91 connects to VoIP Gateway 55*b* and PNC modem 132*f*, which may be distinct and different devices.

While systems 120 and 130 in FIGS. 12 and 13, respectively describe powerline and phone line based home networks respectively, it should be appreciated that the invention can be equally applied to any other type of home network, such as CATV coaxial based and non-wired systems. For example, in the case of using CATV coaxial cable as the communication medium, the powerline 81 will be replaced with the coaxial cable, and the PLC modems 82 will be substituted with equivalent coaxial cable modems. Similarly, for the case of wireless home network, the PLC modems 82 will be substituted with Radio Frequency transceivers. As such, any reference to a PNC modem 132 and telephone wire pair 89 hereinafter will be understood to represent any other networking technology and medium.

Outlet

In order to save space, cost and to allow easy installation and operation it is commonly advised to integrate multiple functions into a single device. Specifically relating to system 130, the VoIP Gateway 55*b* and the PNC modem 132*f* may be integrated into a device designated as CATV adapter 133 shown in FIG. 13. Such an adapter 133 supports one port for connection to a telephone line originated in the CATV network 91, and the other port connects to the telephone wire pair 89 via outlet 83*f*. Further savings in space, cost and complexity can be achieved by integrating functions into a telephone outlet. Such a structure is illustrated in system 140 of FIG. 14, wherein the CATV adapter 133 is integrated to compose telephone outlet 141. The outlet 141 connects to the telephone wiring 89 in a way similar to connecting any outlet to the wiring, and has a port 142 for connection to CATV network 91, preferably on the faceplate of the outlet. Outlet 141 supports single external port 142, and hence offers limited functionality.

Figure 16:
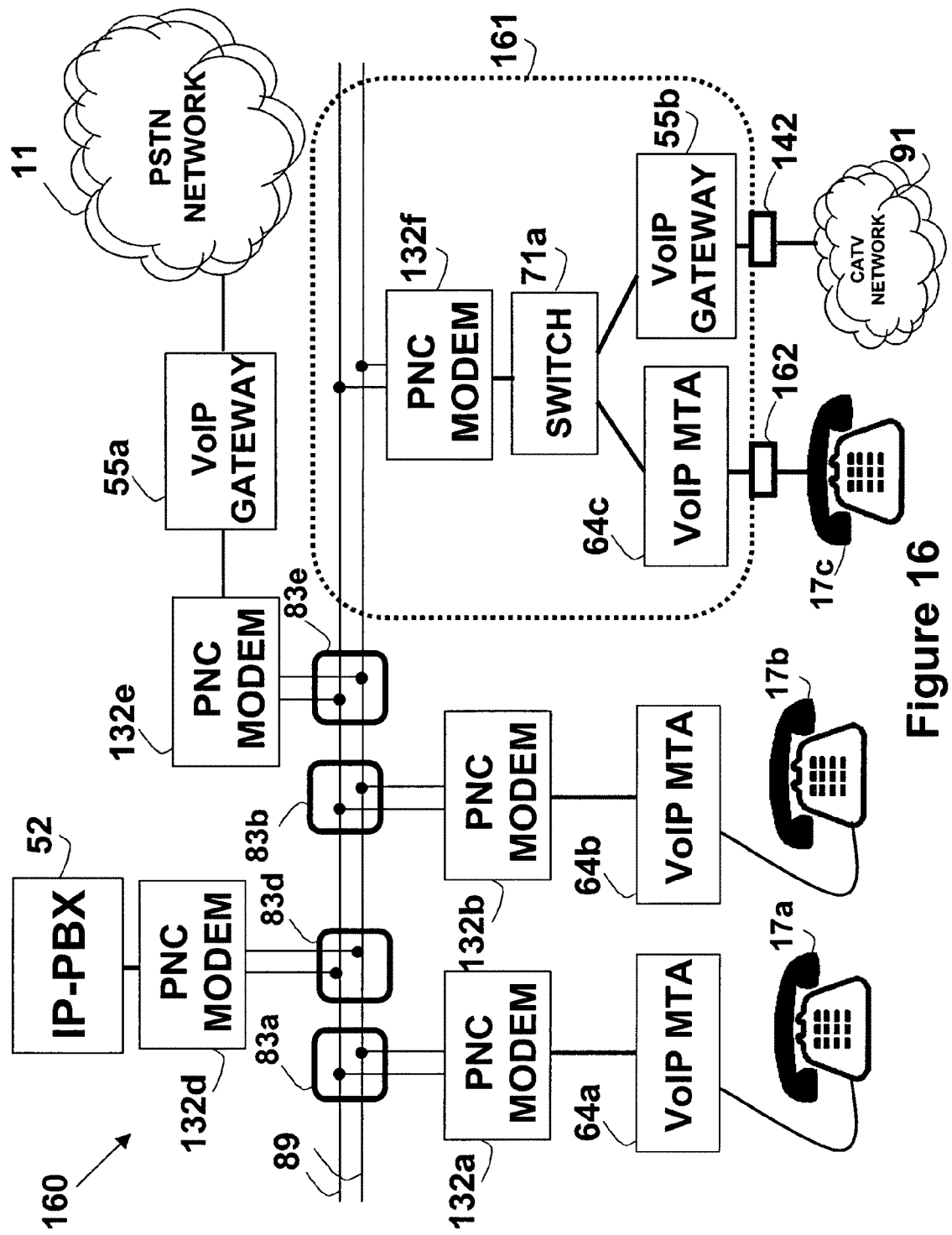
FIG. 16 shows an outlet and phone lines based VoIP network according to the present invention, wherein the outlet further allows for POTS telephone connection.
Figure 17:
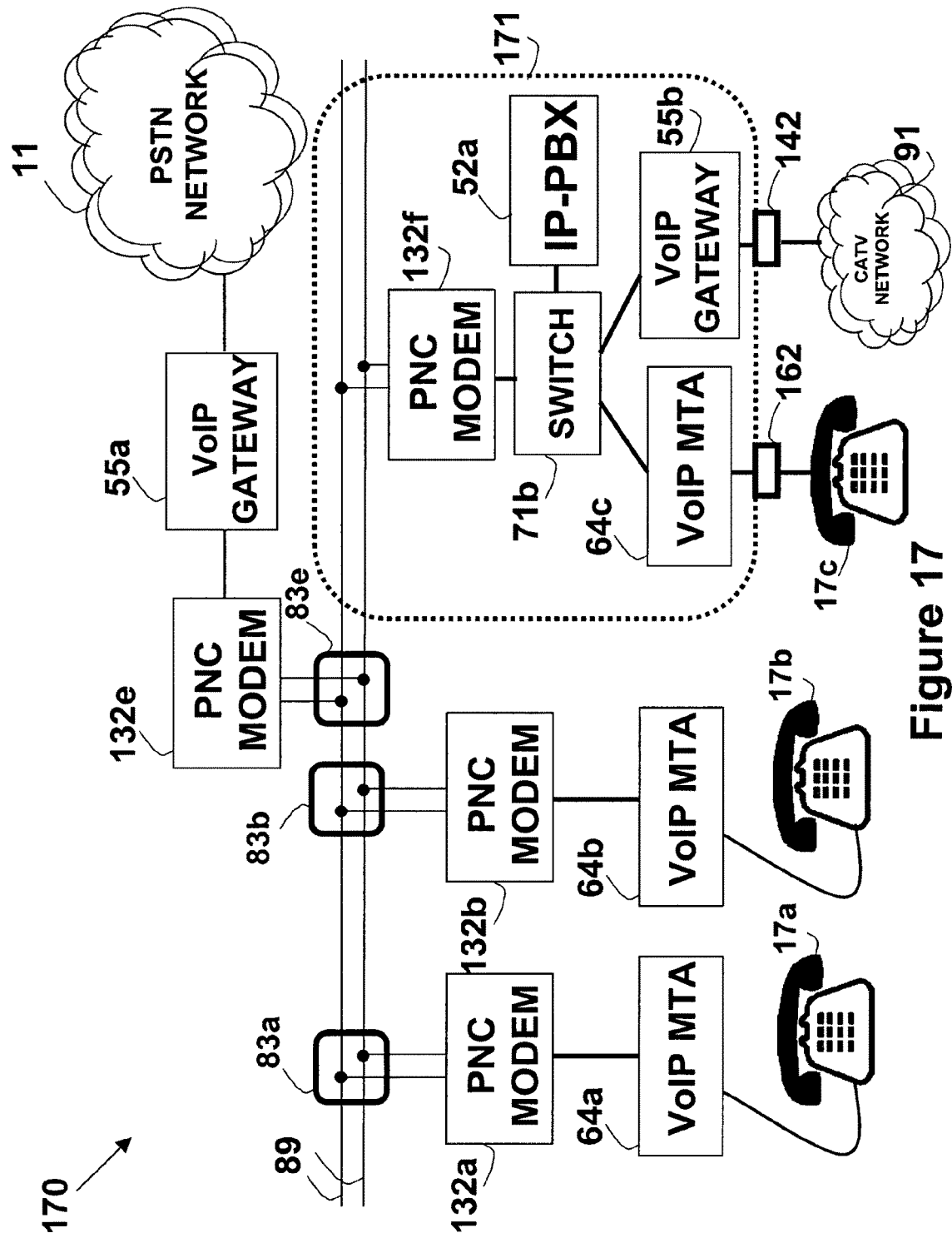
FIG. 17 shows an outlet and phone lines based VoIP network according to the present invention, wherein the outlet further allows for POTS telephone connection and includes IP-PBX functionality.

An improved outlet 151, supporting dual functions, is illustrated in FIG. 15 as part of system 150. Rather than direct connection between the VoIP gateway 55*b* and the PNC modem 132*f* of outlet 141, outlet 151 provides a switch unit 71*a* in between the gateway 55*b* and the modem 132*f*. The switch 71*a* represents any multi-port networking unit, such as a hub, switched hub or router. Two of the ports are used to allow for connection of the gateway 55b to the PNC modem 132f, thus preserving the functionality of outlet 141. However, additional port is used for connecting external units to the network via connection 152. In system 150, the port 152 is used to connect an IP telephone 54b to the IP network, in addition to its role of connectivity to CATV network 91. Similarly, outlet 161, shown as part of system 160 in FIG. 16, supports connection of a POTS telephone set 17c rather than IP telephone set 54b of outlet 151. A VoIP MTA 64c is added between a dedicated port 162 and the switch 71a, allowing for connection of the analog set 17c to the IP network. In another embodiment according to the invention, an outlet 171 shown as part of system 170 in FIG. 17 also comprises IP-PBX 52a functionality, obviating the need for a distinct device 52 (along with its associated PNC modem 132d). As such, outlet 180 provide four distinct functionalities: incoming telephone line connection 142, POTS telephone set connection 162, IP telephone set connection 152 and IP-PBX function 52a. According to the present invention, any one or more of the above four functions can be implemented in an outlet.

Figure 18:
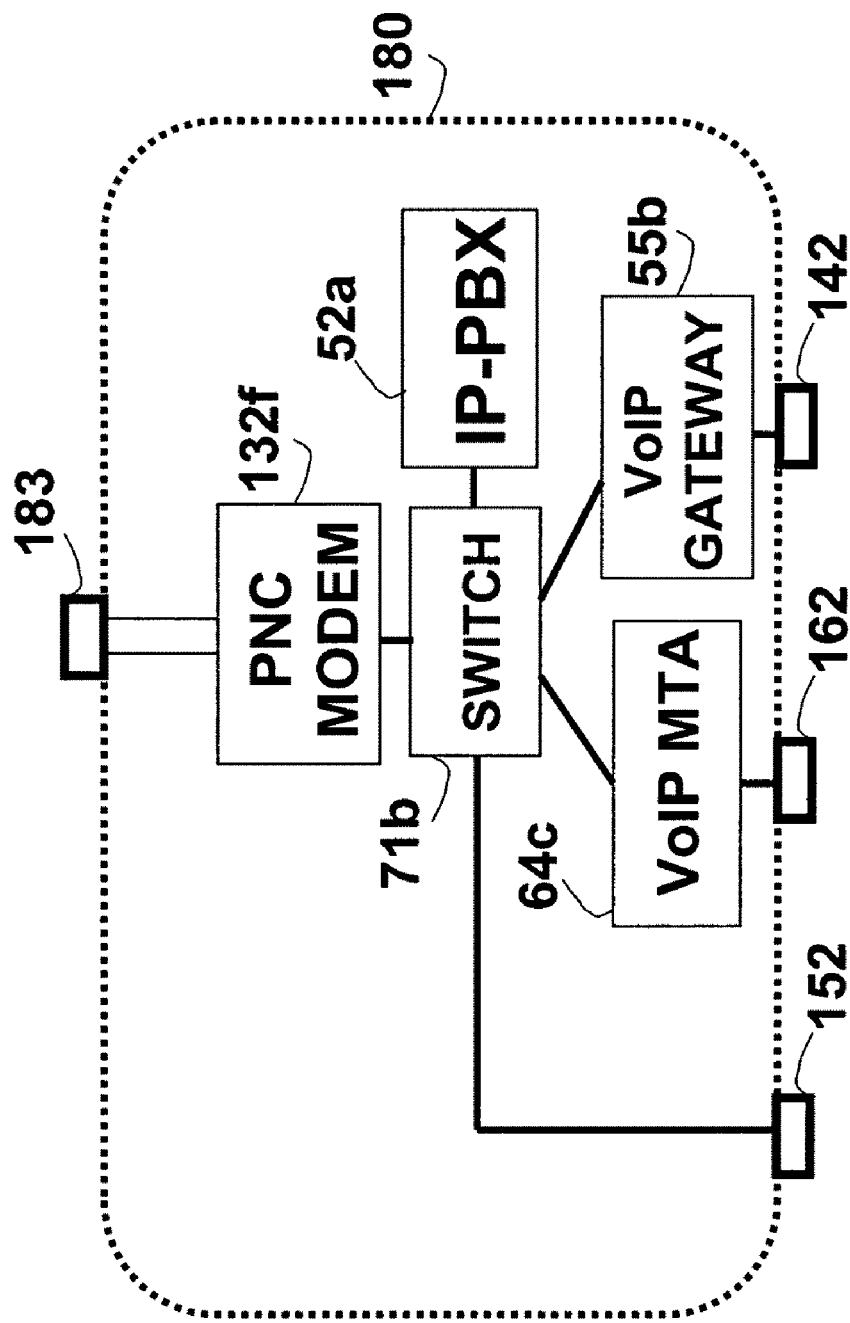
FIG. 18 shows a telephone outlet according to the present invention.

An outlet 180 comprising all above outlet functionalities is shown in FIG. 18. The outlet is coupled to the telephone wiring via connector 183, which connects to the switch 71b via PNC modem 132f. The outlet 180 provides three distinct ports. Port 142 serves for connection to incoming POTS telephone service, preferably via the CATV network 91, and is coupled to the switch 71b via VoIP gateway 55b. Port 162 serves for connection to a POTS telephone set 17, and is coupled to the switch 71b via VoIP MTA 64c. Port 152 constitutes a data connector that is directly connected to the switch 71b and allows for connection of an IP telephone 54. In addition, the outlet 180 comprises an IP-PBX functionality 52a.

Figure 18A:
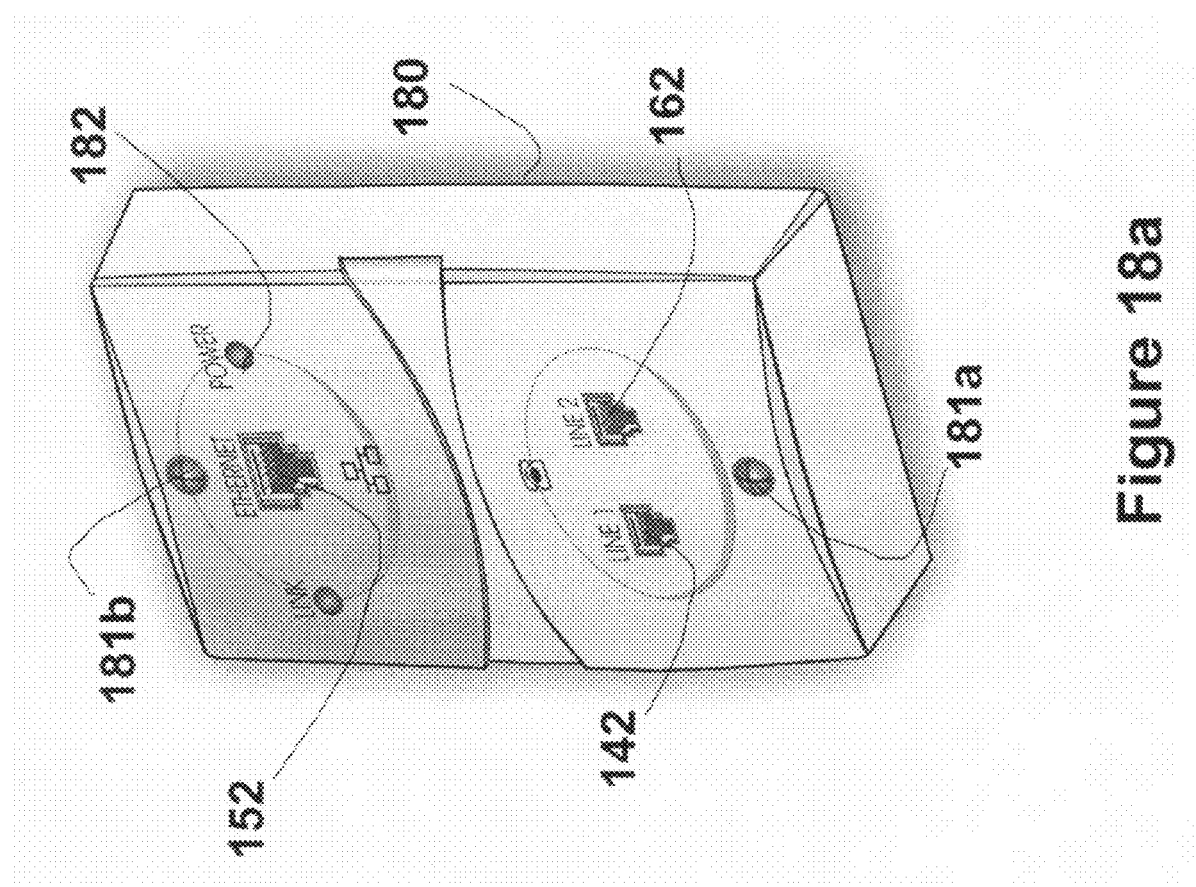
FIG. 18a shows a pictorial view of an outlet according to the present invention.

A pictorial view of a telephone outlet 180 is shown in FIG. 18a. The general shape of the outlet fits as a substitute for existing telephone outlets in North-America, and uses screws 181a and 181b to fasten the outlet to a wall fixture. A RJ-45 connector, commonly used for 10/100BaseT IEEE802.3 interfaces, is used as port 152, and RJ-11 jacks, commonly used for POTS telephony, are used for ports 142 and 162.

Figure 19:
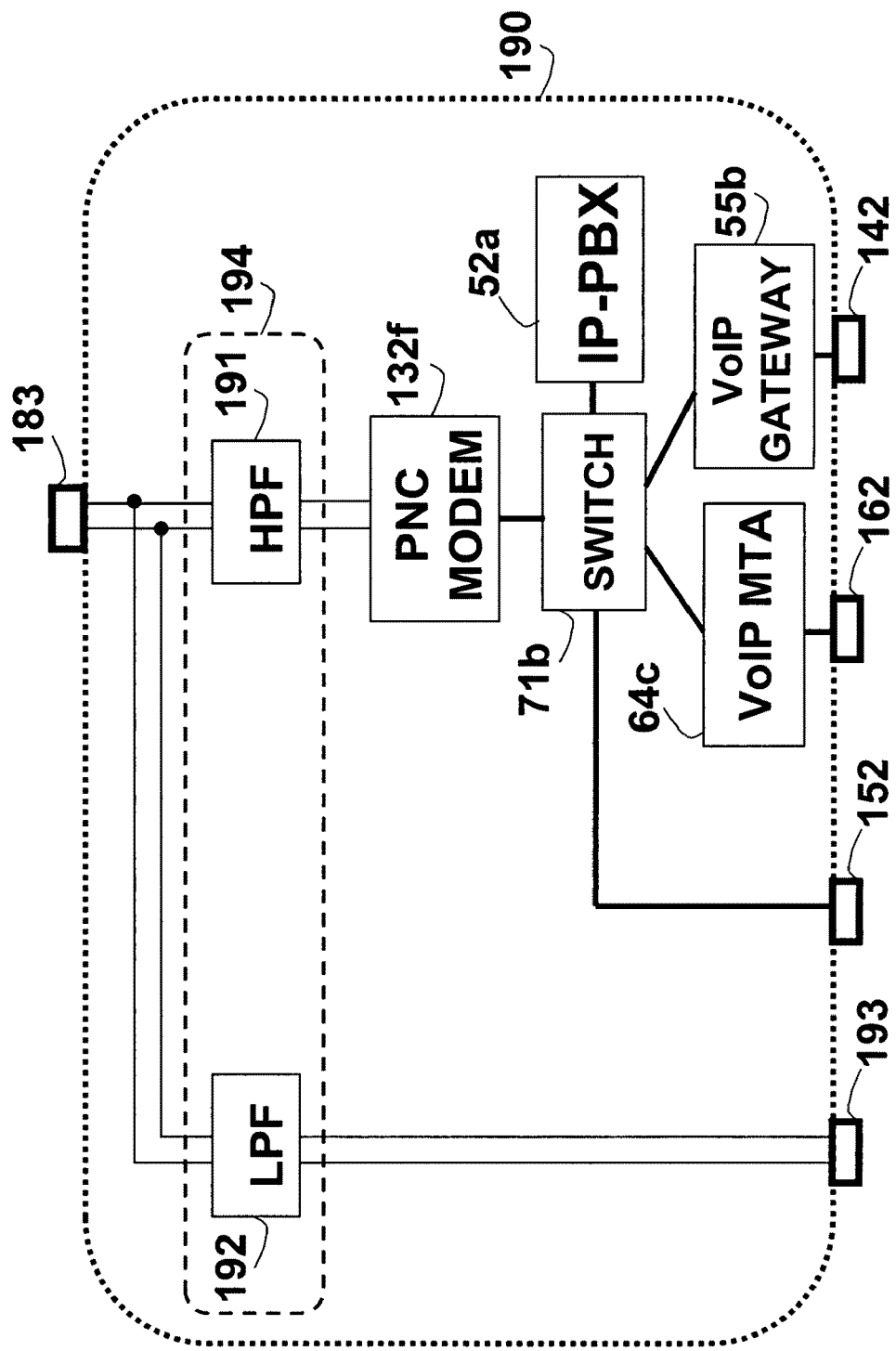
FIG. 19 shows a telephone outlet according to the present invention further allowing for non-IP telephone connection.

As explained above, the telephone wire pair can also be used to carry analog POTS telephone in the lower part of the frequency spectrum, in addition to serving as a medium for the data network. Outlet 180 described above does not provide any access to such POTS signal. In order to couple to this signal, outlet 180 should be modified to outlet 190 shown in FIG. 19. Such an outlet 190 comprises all the functions of outlet 180. However, the PNC modem 132f is not directly connected to the telephone wire pair via port 183, but rather via a high pass filter (HPF) 191, allowing passing of a signals above the POTS telephony spectrum. A low pass filter (LPF) 192 is added, also connected to the telephone wiring port 183. Such LPF 192 allows only the POTS telephony signal to pass through to port 193. In a basic embodiment, HPF 191 is implemented as an in-series capacitor and LPF 192 is implemented as an in-series connected inductor. This set 194 of filters HPF 191 and LPF 192 serves as coupling unit and is known to allow carrying of both POTS telephony and digital data signals over the telephone wire pair. A POTS telephone set 17 can be connected to the POTS telephone service via port 193. Furthermore, the POTS connection can be used for 'life-line' using switches (relays) known in the art, which routes the POTS signal into port 162 in the case of power outage or any other lack of telephone service availability through port 162.

In the case wherein the medium used for data networking is other than telephone wiring, the PNC modem 132f, the coupling unit 194 and the connector 193 should be modified accordingly. For example, in the case of powerline as the networking medium, the PNC modem 132f should be substituted with PLC modem 82 and the filters in the coupling unit 194 should be modified to pass the power mains (60 Hz in North America, 50 Hz in Europe) to a power socket that replaces the telephone connector 193. Similarly, the HPF 191 should be substituted with HPF operative to pass the data signals but block the power mains signal. In the case of coaxial cable medium, other set of filters (such as Band Pass Filter BPF) may be used.

Figure 20:
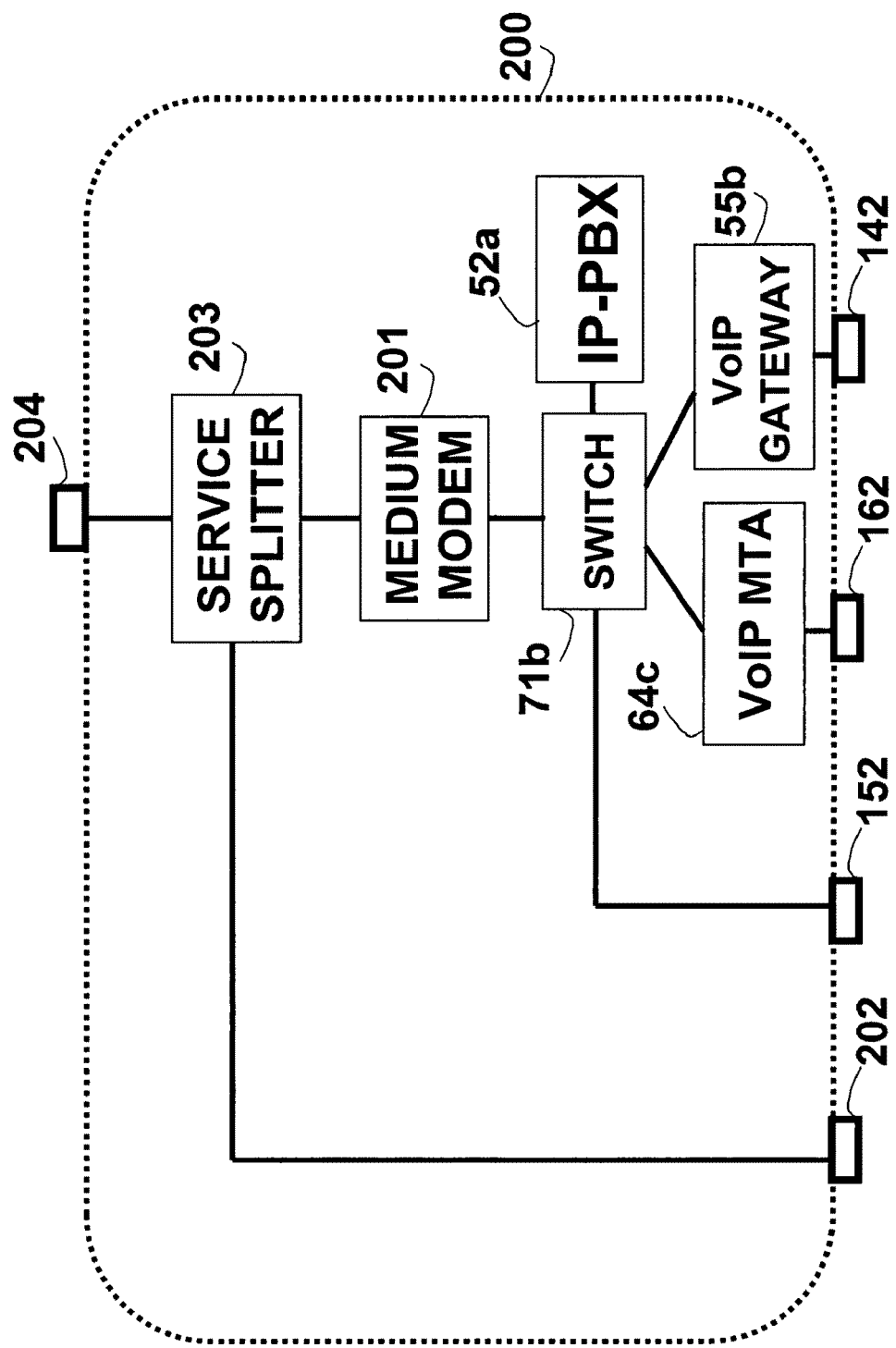
FIG. 20 shows a general outlet according to the present invention.

A general schematic structure of an outlet 200 supporting dual service wiring is shown in FIG. 20, coupled to a wiring via port 204. The regular service signal, being POTS telephony, mains power, CATV or any other signal is conveyed via the service splitter 203 to the standard service socket 202, being telephone, power or CATV connected respectively. A modem 201 adapted for use with the medium of choice (e.g. PNC modem 132f) supports transmission over the wiring, and is coupled to the wiring connection 204 (e.g. in-wall telephone wiring connection 183) via the service splitter 203 (e.g. coupling unit 194). The service splitter 203 is operative to allow the two signals to be conveyed over the wiring with minimum interference with each other.

While the above outlet description related to existing in-home wiring, the invention can be equally applied to 'structured-wiring' networks such as network 110 of FIG. 11. In such a configuration, outlet 72 will be modified to comprise VoIP gateway 55b. In addition, VoIP MTA 64, switch 71 (if required) and IP-PBX 52 functionalities can also be integrated into the outlet. In general, outlet 180 applies to such a configuration with the exception of obviating the need for PNC modem 132f, since the wiring can be directly connected to the in-outlet switch.

Cellular

Figure 21:
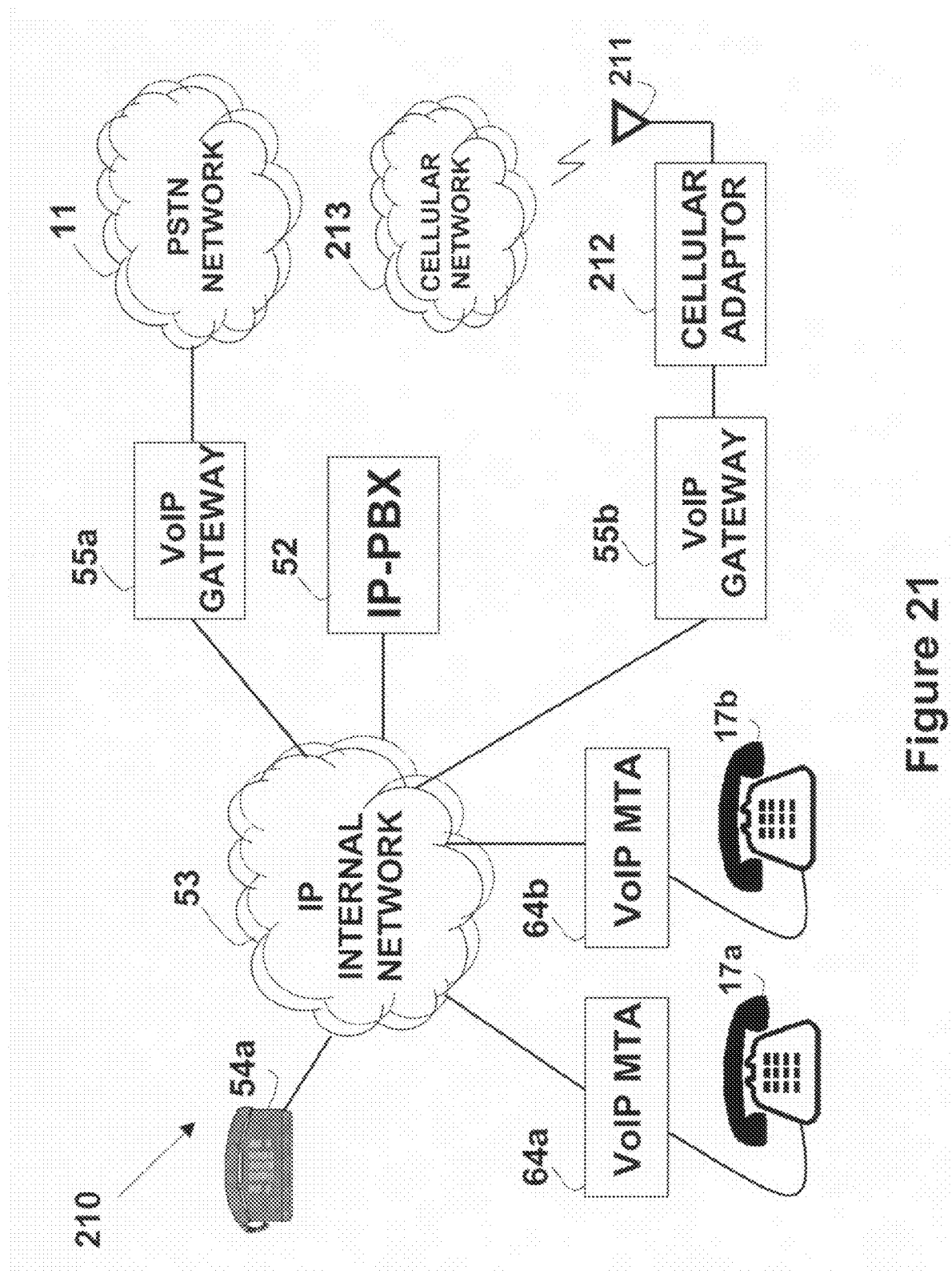
FIG. 21 shows a general VoIP network according to the present invention connected to PSTN and cellular networks.

The system 100 in FIG. 10 according to the invention involves external telephone line originated via CATV network 91. However, it is apparent that the invention equally applies to any telephone line connection to premises, either terrestrial or via the air. The cellular network in known to carry telephone calls over the air to cellular telephones. As such, the cellular network can also be the originating network of the telephone line, as shown in FIG. 21 describing network 210 as a substitute to the CATV network 91 of system 100 the cellular network 213 is used. The coupling to such a network 213 usually requires antenna 211, connected to a cellular adapter 212. Such adapters are known in the art to provide POTS telephone line originated by the cellular network 213. This POTS telephone line is converted to digital by the VoIP Gateway 55b and connects to the network 53. Other non-limiting examples of non-wired networks can be based on infrared and Radio Frequency, such as IEEE802.11, LMDS, MMDS, satellite or Bluetooth.

Figure 22:
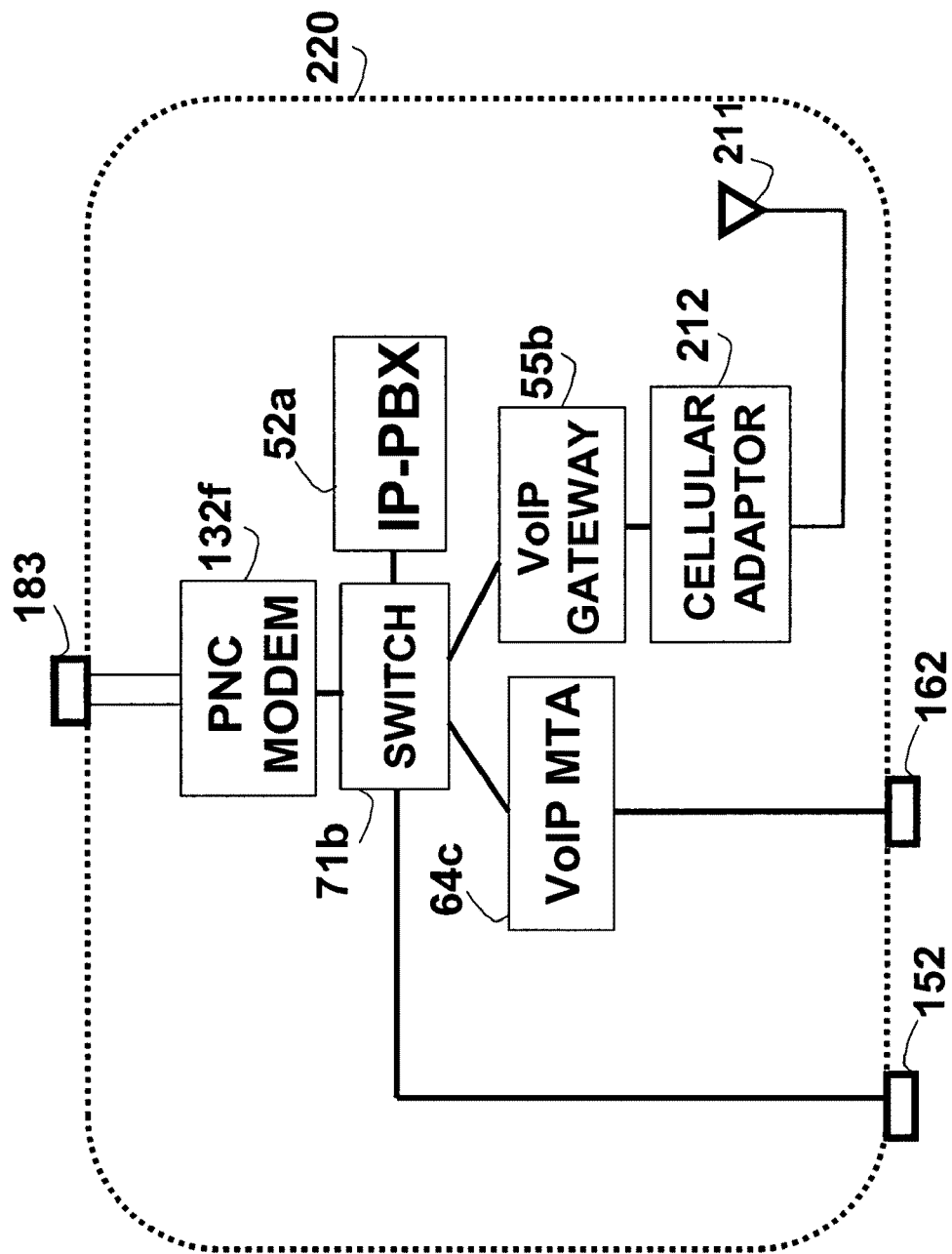
FIG. 22 shows a telephone outlet according to the present invention comprising cellular adapter.
Figure 23:
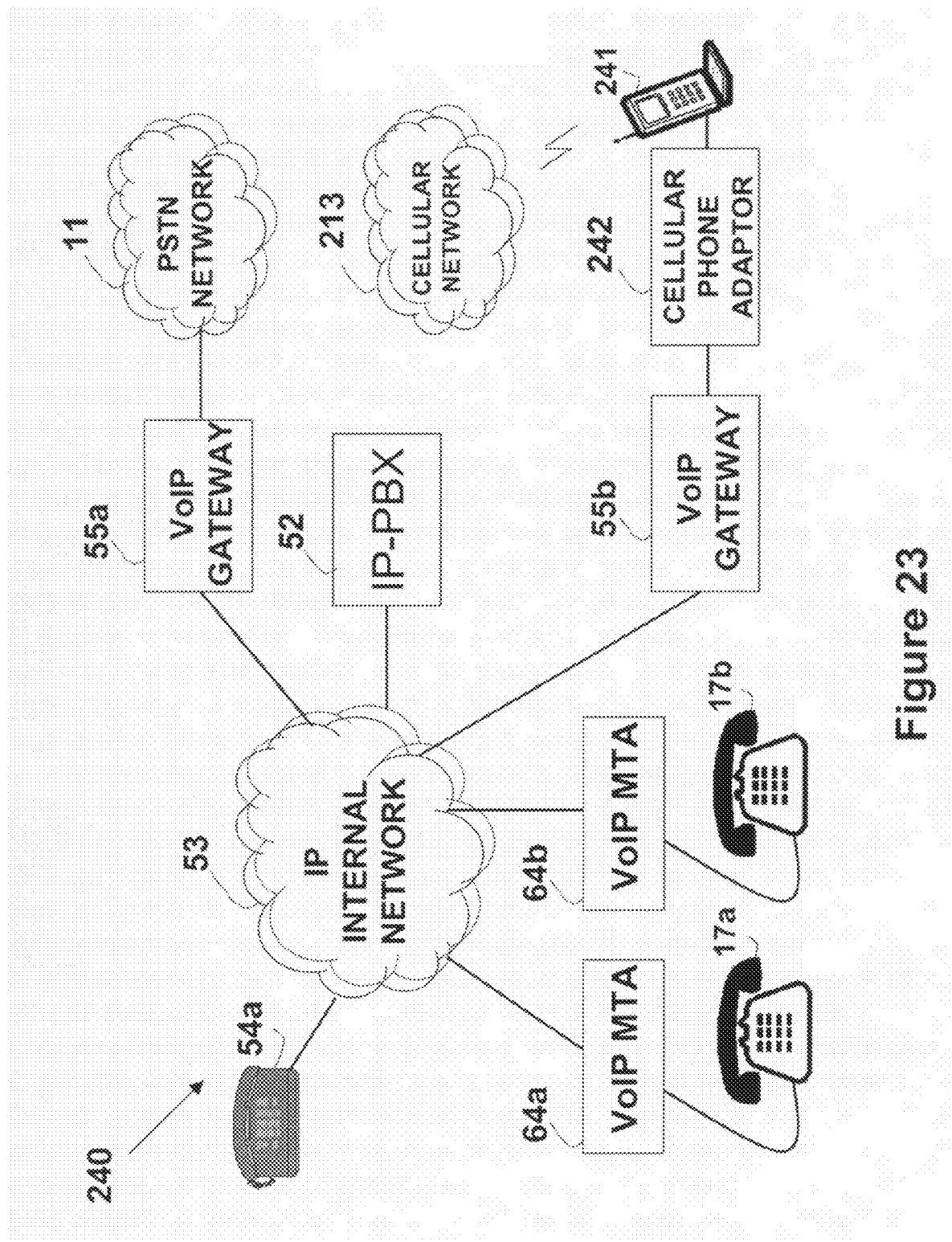
FIG. 23 shows a general VoIP network according to the present invention connected to the cellular network via cellular telephone.

In general, any of the outlets described above equally applies to such scenario, just by coupling the cellular adapter 212 to port 142 of the relevant outlet. However, in such case it will be appreciated that there is benefit in integrating the cellular adapter 212 and the antenna 211 into the outlet, obviating the need for external and stand-alone devices. Such outlet 220 is shown in FIG. 22.

As an alternative to the cellular adapter 212 and the antenna 211, a standard cellular telephone 241 together with known in the art cellular phone adapter 242 can be used in order to access the cellular network, as shown in network 240 in FIG.

23. An example of cellular phone adapter 242 is CellSocket™ from WHP Wireless, Inc. of Melville, N.Y., USA.

Figure 24:
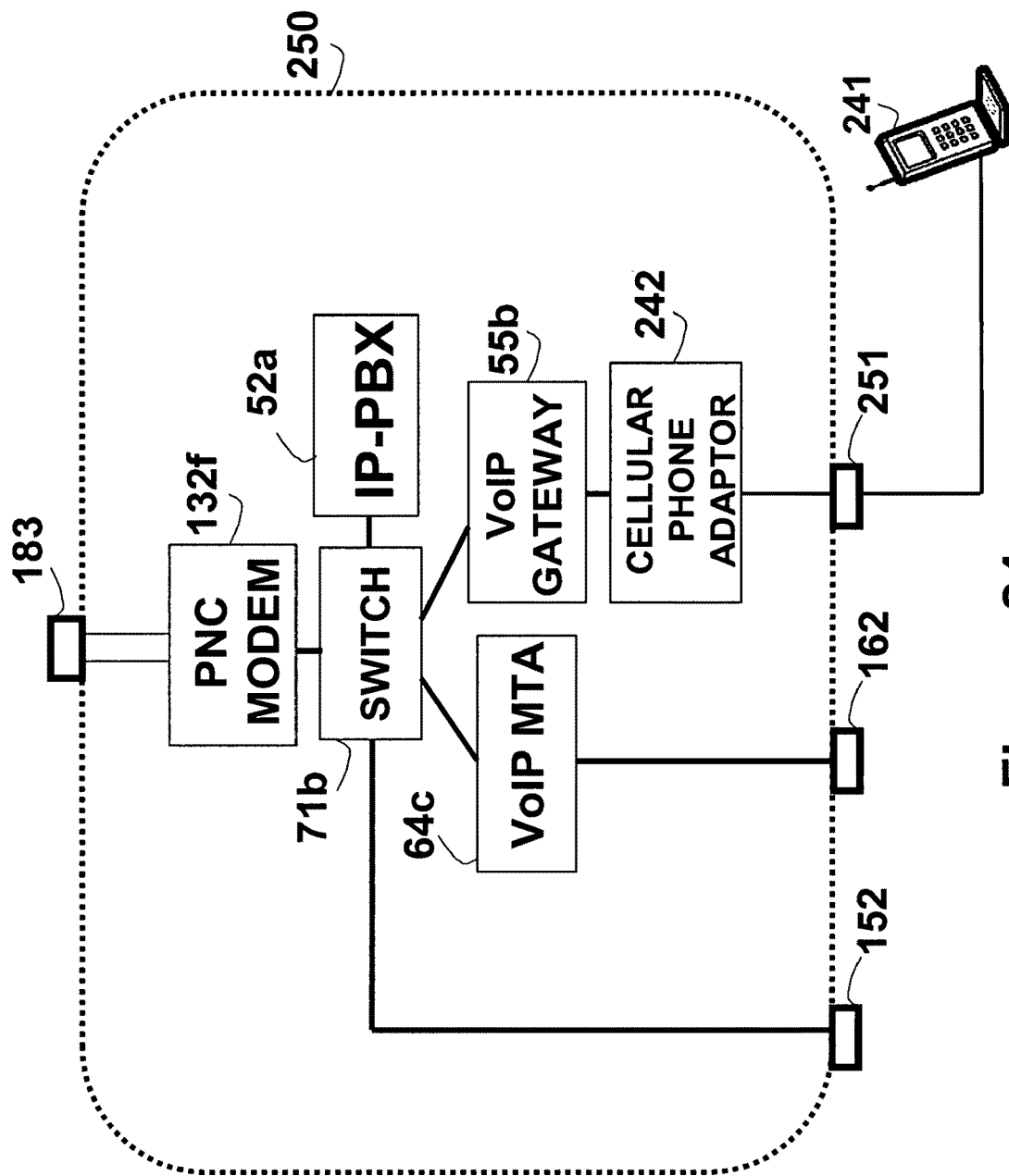
FIG. 24 shows a telephone outlet according to the present invention comprising cellular phone adapter.
Figure 25A:
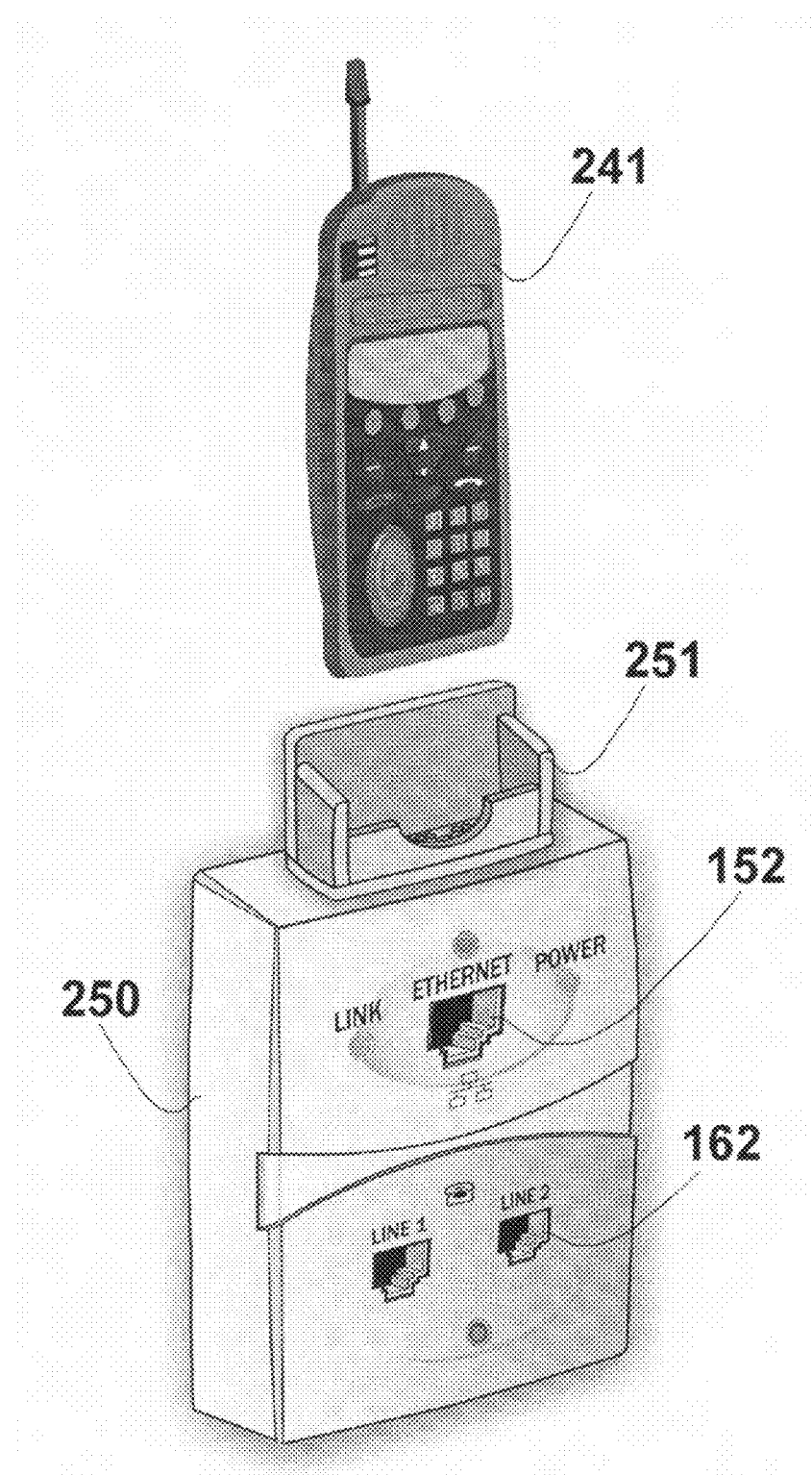
FIG. 25a shows a pictorial view of an outlet according to the present invention having cellular telephone adapter and detached cellular telephone.
Figure 25B:
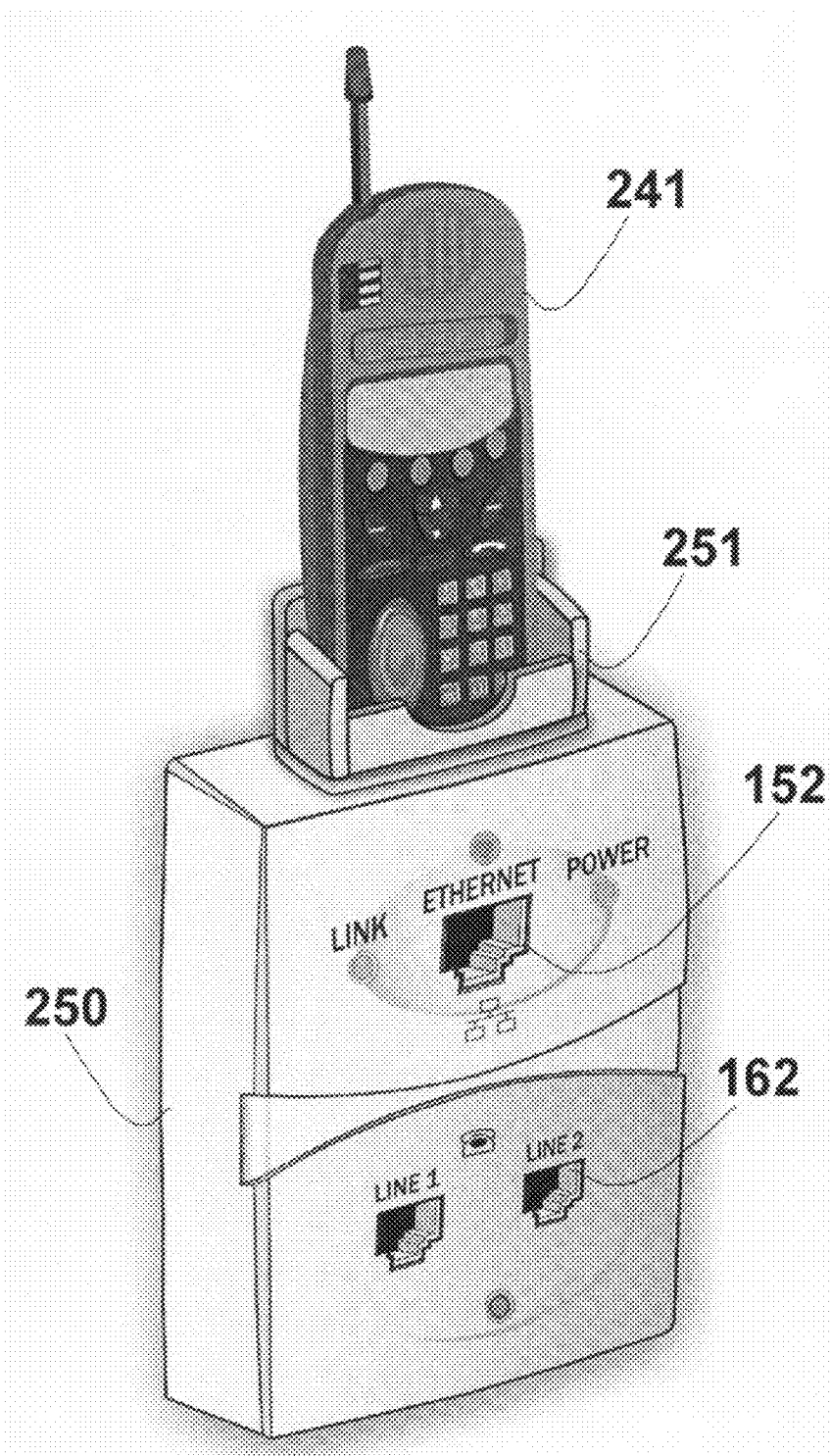
FIG. 25b shows a pictorial view of an outlet according to the present invention having cellular telephone adapter and cellular telephone attached thereto.

In another embodiment of the present invention referring to network 240, the outlet 250 shown in FIG. 24 comprises the cellular phone adapter 242, and provides a port 251 for connection to the cellular telephone 241. While the connection between the telephone 241 and port 251 of outlet 250 can use a cable, in a preferred embodiment the cellular telephone 241 can plug-in both mechanically and electronically to an outlet. This configuration, shown in FIG. 24, allows for the cellular telephone 241 user to choose between either carrying it and utilizing its mobility or plugging it into the outlet. In the latter case, an incoming telephone call can be routed via the network 53 to one or more of the non-mobile telephone sets connected to the network. A pictorial view of outlet 250 is shown in FIGS. 25a and 25b. The outlet 250 shown is based on outlet 180 shown in FIG. 18a, wherein a cradle adapter 251 is added, comprising a mechanical cradle adapter and electrical connector for housing, securing and connecting to cellular telephone 241 shown. FIG. 25a shows the cellular telephone 241 detached from the outlet 250, while FIG. 25b shows the cellular telephone 241 inserted into the outlet 250.

Although the invention has been so far described as relating to Ethernet/IP-based home networking, the invention can be similarly applied to any type of data network. Furthermore, although packet networks are the most common for local area networks and wide area networks, the invention is not restricted to packet networks only, and can be applied to any digital data network, where network entities are identified uniquely by addresses.

Furthermore, although the invention has been described as relating to networks based on continuous electrical conducting medium (telephone, CATV, or electrical power), and the relevant modem and associated circuitry are connected in parallel to the wiring infrastructure, the invention can be applied equally to the case wherein the wiring is not continuous, but is in discrete segments. Such an arrangement is disclosed in WO 0007322 published Feb. 10, 2000 and entitled "Local Area Network of Serial Intelligent Cells" in the name of the present inventor and assigned to the present assignee, which is incorporated by reference for all purposes as if fully set forth herein.

While the invention has been described with respect to a home network, it will be appreciated that the invention equally applies to any in-house network connected to an external network. Local area networks (LAN) within offices, factories or enterprises can equally use the invention.

While the invention has been described with respect to a limited number of embodiments, it will be appreciated that many variations, modifications, derivatives, combinations and other applications of the invention may be made.

What is claimed is:

1. A system in a building for connecting a telephone set to an Internet Protocol (IP)-based telephone network other than a Public Switched Telephone Network (PSTN) via a home network, for use with a PSTN suitable for providing Plain Old Telephone Service (POTS), the PSTN being operated by a first telephone service provider and comprising a local loop connecting the building to the PSTN, the IP-Based telephone service network being external to the building for carrying Voice over IP (VoIP) packets and being operated by a second telephone service provider different from said first telephone service provider, said system comprising:

an AC power wiring that forms a part of the home network, is at least in part in walls of the building, and is accessible at an outlet cavity or outlet opening, said AC power wiring being connected to carry an AC power signal at an AC power frequency and to concurrently carry a digital data signal in a digital data frequency band that is distinct from and higher than, the AC power frequency, the digital data signal containing one or more digitized telephone signals;

a gateway connected to said AC power wiring at a first connection point, said gateway being couplable to the PSTN and to the IP-Based telephone service network, said gateway being operative to pass a first one of the digitized telephone signals between the IP-Based telephone service network and said AC power wiring and to pass a second one of the digitized telephone signals between the PSTN and said AC power wiring; and a first adapter housed in a single enclosure connected to said AC power wiring at a second connection point distinct from said first connection point and connectable to a first analog telephone set, said first adapter being operative for converting between analog and digital telephone signals and for coupling one of the first and second ones of the digitized telephone signals carried over said AC power wiring to the first analog telephone set.

2. The system according to claim 1, further comprising a second adapter connected to said AC power wiring at a third connection point distinct from said first and second connection points and connectable to a second telephone set, said second adapter being operative for converting between analog and digital telephone signals and for coupling a digitized telephone signal carried over said AC power wiring to the second telephone set.

3. The system according to claim 1, wherein said first adapter is further operative to couple a second digitized telephone signal contained in the digital data signal carried over said AC power wiring to a second telephone set.

4. The system according to claim 1, wherein the digital data signal to be carried over said AC power wiring substantially conforms to HomePLUG specifications.

5. The system according to claim 1, wherein the local loop is connected for carrying a Digital Subscriber Loop (DSL) signal.

6. The system according to claim 5, wherein the DSL signal is an ADSL signal.

7. The system according to claim 1, wherein the IP-Based telephone service network is concurrently a cable television (CATV) network for delivering video and comprises coaxial cabling.

8. The system according to claim 1, wherein the IP-Based telephone service network is coupled to the gateway over the air via satellite.

9. The system according to claim 1, wherein the IP-Based telephone service network is connected to conduct communications over power lines.

10. The system according to claim 1, wherein the IP-Based telephone service network is coupled to the gateway over the air using radio frequency signals.

11. The system according to claim 10, wherein the IP-Based telephone service network is based on one of the following protocols: cellular; LMDS; MMDS; IEEE802.11; and Bluetooth.

12. The system according to claim 1, wherein the IP-Based telephone service network is connected to conduct communications over fibers.

13. The system according to claim 12, wherein the IP-Based telephone service network is connected to the gateway over a fiber using Fiber To The Home (FTTH) technology.

14. The system according to claim 1, wherein the IP-based telephone network or the telephone service provided by the second telephone service provider is based on one or more of:

Session Initiation Protocol (SIP); IETF RFC 3261; Media Gateway Control Protocol (MGCP); ITU-T H.323; IETF RFC 2705; and any variant thereof.

15. The system according to claim 1, wherein said system is further connectable to multiple telephone sets, and said system further provides an IP-PBX functionality for routing telephone calls between the multiple telephone sets and external telephone service connections.

16. The system according to claim 1, wherein said gateway is further operative to convert between a digitized telephone signal carried over the IP-Based telephone service network and a POTS signal.

17. The system according to claim 1 wherein said single enclosure is mountable into the outlet cavity or outlet opening.

18. The system according to claim 1, wherein said single enclosure is constructed to have at least one of the following:
   a form substantially similar to that of a standard AC power outlet;
   wall mounting elements substantially similar to those of a standard AC power wall outlet;
   a shape allowing direct mounting in an AC power outlet opening or cavity; and
   a form to at least in part substitute for a standard AC power outlet.

19. The system according to claim 1, wherein said first adapter is pluggable into an existing AC power outlet.

20. A device for coupling a digitized telephone signal carried over an existing AC power wiring to an analog telephone set, the AC power wiring being at least in part in walls of a building and being accessible at an outlet cavity or outlet opening, and the AC power wiring being coupled to a Public Switched Telephone Network (PSTN) via a local loop, the PSTN being suitable for providing Plain Old Telephone Service (POTS) and being operated by a first telephone service provider, the AC power wiring further being connected to carry an AC power signal at an AC power frequency and for concurrently carrying a digital data signal in a digital data frequency band that is distinct from, and higher than, the AC power frequency, the digital data signal containing one or more digitized telephone signals coupled to an IP-Based telephone service network external to the building and connected for carrying Voice over IP (VoIP) packets, the IP-Based telephone service network being operated by a second telephone service provider different from the first telephone service provider, said device comprising:
   an AC power plug for connecting to the AC power wiring;
   a powerline modem operable for bidirectional digital data communication with one or more additional modems of the same type as said powerline modem over the AC power wiring;
   a high pass filter coupled between said powerline modem and said AC power plug for substantially passing only signals in the digital data frequency band;
   a telephone connector for connecting to the analog telephone set;
   a unit coupled to pass a digitized telephone signal between said telephone connector and said powerline modem;
   a converter for converting between analog and digital telephony signals coupled between said telephone connector and said unit; and
   a single enclosure in the building housing said powerline modem, said high pass filter, said telephone connector, said unit and said converter,
   wherein said device is operative to connect the telephone set to a telephone service provided by the second telephone service provider.

21. The device according to claim 20, wherein the AC power wiring is connected to further carry a second digitized telephone signal, and said device is further operative to couple the second digitized telephone signal carried over the AC power wiring to a second telephone set.

22. The device according to claim 21, further being connectable to multiple telephone sets, said device further providing an IP-PBX functionality for routing telephone calls between the multiple telephone sets and external telephone service connections.

23. The device according to claim 20, wherein the digital data signal carried over the AC power wiring substantially conforms to HomePLUG specifications, and said telephone line modem is a HomePLUG modem.

24. The device according to claim 20, wherein the IP-based telephone network or the telephone service provided by the second telephone service provider is based on one or more of: Session Initiation Protocol (SIP); IETF RFC 3261; Media Gateway Control Protocol (MGCP); ITU-T H.323; IETF RFC 2705; and any variant thereof.

25. The device according to claim 20, wherein said single enclosure is mountable into the outlet cavity or outlet opening.

26. The device according to claim 20, wherein said single enclosure is constructed to have at least one of the following:
   a form substantially similar to that of a standard AC power outlet;
   wall mounting elements substantially similar to those of a standard AC power wall outlet;
   a shape allowing direct mounting in a AC power outlet opening or cavity; and
   a form to at least in part substitute for a standard AC power outlet.

27. The device according to claim 20, wherein said device is pluggable into an existing AC power outlet.

28. Apparatus in a building for connecting a telephone set in the building to an Internet Protocol (IP)-Based telephone service network other than a Public Switched Telephone Network (PSTN) via a home network that includes an AC power wiring, for use with a PSTN suitable for providing Plain Old Telephone Service (POTS), the PSTN being operated by a first telephone service provider and comprising a local loop connected to the building, the IP-Based telephone service network being external to the building, being connected for carrying one or more digitized Voice over IP (VoIP) telephone signals and being operated by a second telephone service provider different from the first telephone service provider, the AC power wiring being at least in part in walls of the building and being accessible at an outlet cavity or outlet opening, and being connected for carrying an AC power signal at an AC power frequency and for concurrently carrying a digital data signal in a digital data frequency band that is distinct from, and higher than, the AC power frequency, and the digital data signal containing one or more digitized VoIP telephone signals, said apparatus comprising:
   an AC power plug for connecting to the AC power wiring in the building;
   a powerline modem coupled to said AC power plug for transmitting digital data to, and receiving digit data from, the AC power wiring;
   a port adapted to be connected to the IP-Based telephone service network external to the building and to be coupled to one or more digitized telephone signals;
   a connector for connection to the PSTN, the connector being connected to said powerline modem for passing PSTN signals between the PSTN and said powerline modem; and a second modem coupled to said port for transmitting digital data to, and receiving digital data from, the IP-Based telephone service network.

wherein: said powerline modem and said second modem are connected together for passing digital data therebetween, and said apparatus is operative to pass the one or more digitized telephone signals between the IP-Based telephone service network and the AC power wiring.

29. The apparatus according to claim 28, wherein the digital data signal carried over the AC power wiring substantially conforms to HomePLUG specifications.

30. The apparatus according to claim 28, wherein the local loop is connected for carrying a Digital Subscriber Loop (DSL) signal.

31. The apparatus according to claim 28, wherein the IP-Based telephone service network is concurrently a cable television (CATV) network for delivering video and comprises coaxial cabling.

32. The apparatus according to claim 28, wherein the IP-Based telephone service network is connected to conduct communications via satellite.

33. The apparatus according to claim 28, wherein the IP-Based telephone service network is connected to conduct communications over powerlines.

34. The apparatus according to claim 28, wherein said IP-Based telephone service network is connected to conduct communications using radio frequency signals.

35. The apparatus according to claim 28, wherein the IP-Based telephone service network is based on one of the following protocols: cellular; LMDS; MMDS; IEEE802.11; and Bluetooth.

36. The apparatus according to claim 28, wherein the IP-Based telephone service network is connected to conduct communications over fibers.

37. The apparatus according to claim 36, wherein the IP-Based telephone service network is connected to conduct communications based on Fiber To The Home (FTTH) technology.

38. The apparatus according to claim 28, wherein the IP-based telephone network or the telephone service provided by the second telephone service provider is based on one or more of: Session Initiation Protocol (SIP); IETF RFC 3261; Media Gateway Control Protocol (MGCP); ITU-T H.323; IETF RFC 2705; and any variant thereof.

39. The apparatus according to claim 28, further being connectable to multiple telephone sets, said apparatus being operable to further provide an IP-PBX functionality for routing telephone calls between the multiple telephone sets and external telephone service connections.

40. The apparatus according to claim 28, wherein said apparatus is wall mountable.

41. A system for connecting an analog telephone set in a building to multiple Internet Protocol (IP)-based telephone networks external to the building via a home network, said system comprising:

a first IP-Based telephone service network external to the building and connected for carrying at least a first digitized telephone signal in Voice over IP (VoIP) packets and operated by a first telephone service provider;

a second distinct IP-Based telephone service network external to the building and connected for carrying at least a second digitized telephone signal in Voice over IP (VoIP) packets and operated by a second telephone service provider different from the first telephone service provider;

an AC power wiring that forms a part of the home network and that is at least in part in walls of the building and is accessible at an outlet cavity or outlet opening, the AC power wiring being coupled to said first and second IP-Based telephone service networks for concurrently carrying the first and second digitized telephone signals, said AC power wiring being connected to additionally carry an AC power signal having an AC power frequency and to concurrently carry a digital data signal in a digital data frequency band that is distinct from, and higher than, the AC power frequency; and a first adapter housed in a single enclosure and connected to said AC power wiring and connectable to the analog telephone set, said first adapter being operative for converting between analog and digitized telephone signals and to couple first analog signals obtained by conversion the first digitized telephone signal carried over said AC power wiring to the analog telephone set and to couple second analog signals obtained by conversion of the second digitized telephone signal carried over said AC power wiring to the analog telephone set.

42. The system according to claim 41, further comprising a gateway housed in a second single enclosure and connected to said AC power wiring at a first connection point, said gateway being coupled to said first and second IP-Based telephone service networks and being operative to pass the first and second digitized telephone signals between the first and second IP-Based telephone service networks and said AC power wiring.

43. The system according to claim 42, wherein said gateway is further operative to convert between a digitized telephone signal carried over said first IP-Based telephone service network and a Plain Old Telephone Service (POTS) signal.

44. The system according to claim 41, further comprising a second adapter connected to said AC power wiring and connectable to a second telephone set, said second adapter being operative for converting between analog and digital telephone signals and to couple the second digitized telephone signal carried over said AC power wiring to the second telephone set.

45. The system according to claim 41, wherein the digital data signal to be carried over said AC power wiring substantially conforms to HomePLUG specifications.

46. The system according to claim 41, wherein one of said first and second IP-Based telephone service networks connects to the building over a local loop that is connected for carrying a Digital Subscriber Loop (DSL) signal.

47. The system according to claim 46, wherein the DSL signal is an ADSL signal.

48. The system according to claim 41, wherein at least one of said first and second IP-Based telephone service networks is concurrently a cable television (CATV) network for delivering video and comprises coaxial cabling.

49. The system according to claim 41, wherein at least one of said first and second IP-Based telephone service networks is connected to conduct communications via satellite.

50. The system according to claim 41, wherein at least one of said first and second IP-Based telephone service networks is connected to conduct communications over power lines.

51. The system according to claim 41, wherein at least one of said first and second IP-Based telephone service networks is connected to conduct communications with radio frequency signals.

52. The system according to claim 51, wherein said at least one of said IP-Based telephone service networks is based on one of the following protocols: cellular; LMDS; MMDS; IEEE802.11; and Bluetooth.

53. The system according to claim 41, wherein at least one of said first and second IP-Based telephone service networks is connected to conduct communications over fibers.

54. The system according to claim 53, wherein said at least one of said first and second IP-Based telephone service networks is connected to conduct communications based on Fiber To The Home (FTTH) technology.

55. The system according to claim 41, wherein at least one of the first and second digitized telephone signals is based on one or more of: Session Initiation Protocol (SIP); IETF RFC 3261; Media Gateway Control Protocol (MGCP); ITU-T H.323; IETF RFC 2705; and any variant thereof.

56. The system according to claim 41, wherein said system is further connectable to multiple telephone sets, and said system further provides an IP-PBX functionality for routing telephone calls between the multiple telephone sets and external telephone service connections.

57. The system according to claim 41 wherein said single enclosure is mountable into the outlet cavity or outlet opening.

58. The system according to claim 41, wherein said single enclosure is constructed to have at least one of the following:
- a form substantially similar to that of a standard AC power outlet;
- wall mounting elements substantially similar to those of a standard AC power wall outlet;
- a shape allowing direct mounting in a telephone outlet opening or cavity; and
- a form to at least in part substitute for a standard AC power outlet.

59. The system according to claim 41, wherein said first adapter is pluggable into an existing AC power outlet.

60. The system according to claim 1, wherein said gateway is configured to pass the first one and the second one of the digitized telephone signals simultaneously.

61. The apparatus according to claim 28, wherein said powerline modem is operative to pass both the PSTN signals and the digital data simultaneously.

* * * * *